(12) United States Patent
Fitzsimmons, Jr.

(10) Patent No.: US 7,214,065 B2
(45) Date of Patent: May 8, 2007

(54) SYSTEM AND METHODS OF INTERACTIVE TRAINING FOR RECALL AND IDENTIFICATION OF OBJECTS IN THE REAL WORLD

(76) Inventor: John David Fitzsimmons, Jr., 4447 Norma Jean La., North Las Vegas, NV (US) 89031-2214

( * ) Notice: Subject to any disclaimer, the term of this patent is extended or adjusted under 35 U.S.C. 154(b) by 817 days.

(21) Appl. No.: 10/387,172

(22) Filed: Mar. 11, 2003

(65) Prior Publication Data

US 2003/0175667 A1    Sep. 18, 2003

Related U.S. Application Data

(60) Provisional application No. 60/363,258, filed on Mar. 12, 2002.

(51) Int. Cl.
*G09B 19/00* (2006.01)
(52) U.S. Cl. .................................... 434/236
(58) Field of Classification Search ................ 434/236
See application file for complete search history.

(56) References Cited

U.S. PATENT DOCUMENTS

| | | | |
|---|---|---|---|
| 2,026,082 A | | 12/1935 | Darrow |
| 3,759,521 A | | 9/1973 | Breslow et al. |
| 4,012,045 A | | 3/1977 | Vail |
| 4,039,192 A | | 8/1977 | Magiera |
| 4,714,255 A | | 12/1987 | Henry et al. |
| 4,887,291 A | | 12/1989 | Stillwell |
| 4,993,059 A | | 2/1991 | Smith et al. |
| 5,278,539 A | | 1/1994 | Lauterbach et al. |
| 5,912,947 A | | 6/1999 | Langsenkamp et al. |
| 5,955,952 A | * | 9/1999 | Bergman et al. ......... 340/573.1 |
| 6,034,605 A | * | 3/2000 | March .................. 340/573.1 |

(Continued)

FOREIGN PATENT DOCUMENTS

| | | |
|---|---|---|
| CA | 1067920 | 12/1979 |
| FR | 2619020 | 2/1989 |
| GB | 2227420 | 8/1990 |

OTHER PUBLICATIONS

White, Daniel R., America's Most Wanted, Oct. 1989, ABA Journal, p. 14-18.*

(Continued)

*Primary Examiner*—Robert E. Pezzuto
*Assistant Examiner*—Cameron Saadat

(57) ABSTRACT

Systems and methods for recognition learning of objects and their characteristics. The invention is a comprehensive system comprising methods and means of data access, nature assignment, and presentation. The user is able to automatically, selectively, and continually access a plurality of enhanced data sources comprising sex offender, terrorist, criminal, missing children, missing pet and other data. Following access to these data, the user may assign respective natures to object data that will affect presentation. The invention's means of automated presentation and entertaining rehearsal of object data results in recognition of objects wherein social utility is achieved. One example would be a child being able to recognize and avoid a threatening person such as a sex offender or criminal. Another example would be recognition of a missing child based on the methods of the invention. The systems operate with any means of information processing such as notebook computers, personal digital assistants, cell phones, and watches. Through the systems and methods of the invention, the objective of automated, learned recognition of socially relevant objects of interest is realized.

17 Claims, 44 Drawing Sheets

U.S. PATENT DOCUMENTS 6,084,510 A     7/2000   Lemelson et al.
6,449,611 B1 *  9/2002   Frankel et al. ................. 707/6
6,491,297 B1   12/2002   Cardoso
6,971,881 B2 * 12/2005   Reynolds .................... 434/236

OTHER PUBLICATIONS

Greenman, Catherine, Ancient Egypt with a Pager as Your Guide, Jul. 19, 2001, New York Times, p. 11-12.*

Trigoboff, Dan, Giving it up in Colorado, Jan. 29, 2001, Broadcasting & Cable, p. 1-5.*

Intelligent Sex Offender Registry ("ISOR").

"Stop It!" Sex Offender Database Software.

Technology to Recover Abducted Kids ("TRAK").

"The Creep Beeper" as reported by ABC News.

* cited by examiner

SYSTEM AND METHODS OF INTERACTIVE TRAINING FOR RECALL AND IDENTIFICATION OF OBJECTS IN THE REAL WORLD

CROSS-REFERENCE TO RELATED APPLICATIONS

This application is entitled to the benefit of Provisional Patent Application ser. No. 60/363,258 filed Mar. 12, 2002.

BACKGROUND

1. Field of Invention

This invention relates to systems of learning and recognition, specifically methods and systems for computer based learning and games which combine means of rehearsal and entertainment with social utility.

2. Description of Prior Art

Following the events of Sep. 11, 2001, security has become of paramount importance to all people. The world can be a dangerous place, with the presence of terrorists, criminals, sex offenders and other undesirable individuals. Government has spent billions attempting to increase our security, such as creating new organizations like the Department of Homeland Security and increasing funding to police and intelligence organizations. However, day after day we turn on the news and are greeted with a high terrorist threat or other threats to our well being. A sex offender just molested another child. A terrorist escaped apprehension. Another person is missing. A vehicle was stolen. The barrage is endless. The average citizen cannot help but think more can and must be done.

Megan's Law and Sex Offender Registries

Megan's Law is an example of government attempts to increase security. In 1995, a convicted child molester was arrested for the rape and murder of 7-year-old Megan Kanka. The offender lived right across the street from Megan. However, the police were not allowed to disclose the presence of this child molester because release of this information was prohibited. Since this tragic event, the laws have been changed to permit the release of this type of information to the public. In remembrance of Megan Kanka, President Clinton signed Megan's Law on May 8, 1996. This law was implemented to allow potential victims to protect themselves and allow parents to protect their children. Many states and private groups now provide sex offender data, such as photographs and physical characteristics on the internet.

Although Megan's Law sounds effective on the surface, the actual results fall short of the intent. The Associated Press reported on Feb. 6, 2003 that states are losing sex offenders. Laura Ahern, from the organization of Parents for Megan's Law, summed up the situation, "They're implementing Megan's Law, then turning their backs on it." States on average are unable to account for about one quarter of sex offenders. California alone was revealed to have lost track of over 33,000 sex offenders based on an Associated Press investigation. These offenders are required to notify authorities of their address once a year, yet they are not, and our police organizations are stretched thin already. Something is needed to make Megan's Law more effective.

Not all states currently have the sex offender internet registries. Let us assume that a state has an internet registry that has nearly all of its sex offenders properly registered. That information is of little use if the public doesn't have access to the internet, know which internet site to access, and is able to download pertinent data and review it.

The existing sex offender registries lack features to ensure users are protected. The existing methods require a person to log on to the internet, find the appropriate websites, manually download data, and review the information. Unfortunately, the concerned citizen will find no uniformity amongst sex offender and other databases. Additionally, accessing these data sources manually can require large amounts of time. If a parent wants to ensure a child is protected from a criminal, the parent must ensure the child recognizes the visual image or characteristics of the criminal. This involves overseeing the child at the computer or printing hard copies of the data, then manually reviewing the data.

How many parents review the sex offender images with their children? How many parents do it repetitively and whenever a new offender moves to their area? And, how many separate presentations of the visual and characteristic data are required to ensure recognition? Parents cannot be with their children twenty-four hours a day. Although police are given the task of notifying people and organizations of high risk offenders in their area, we know that our police forces are stretched thin and one quarter of offenders aren't living where they are supposed to.

Government Versus Public Access

Supply and demand are two factors in any exchange. In this case, the prior art on the supply side (law enforcement and governmental agencies) is more developed than the demand side (the general population). In searches of existing systems, several database and tracking software systems were uncovered on the supply side of law enforcement. Such systems as Intelligent Sex Offender Registry (ISOR), Technology to Recover Abducted Kids (TRAK), and "Stop It!" sex offender software were developed for government agencies. As one of the companies states in its advertisement, the system is "designed for law enforcement, by law enforcement." These systems are not available to the public—the inventor was not able to order a brochure on these products without being a government agency.

Expensive Alerting Systems With Limited Success

U.S. Pat. No. 5,912,947 to Langenskamp, et al. (1999) discloses a public notification system with automated calls delivering a recorded message prompting the callee to provide input into the phone. Based on the callee input, the system may provide data on convicted criminals close to the callee's address. Unfortunately, the barrage of telemarketing has put most people on notice to telephone intrusions into the home. This is a push type of system, compared to a pull system responding to a person's desire for information when they desire it. Use of the phone to convey information through recorded messages is limited, and graphical and other characteristic data such as hardcopy is wanting.

U.S. Pat. No. 6,084,510 to Lemelson, et al. (2001) discloses an emergency response and danger warning system using GPS location signals used with various surveillance systems to detect dangerous situations. Information concerning dangerous situations which exist or may develop and threaten people is transmitted to a command control center which, in-turn, relays broadcast warning messages via satellites and/or communication networks to remote warning devices. This system is quite elaborate, requiring surveillance platforms, command centers, and individual GPS beepers to respond to a situation occurring or about to occur. If one were stuck in a traffic jam and alerted by beeper about that traffic jam, the warning would not be of much use.

More examples of emergency alerting systems are found in U.S. Pat. No. 5,278,539 to Lauterbach, et al. (1994); U.S.

Pat. No. 4,993,059 to Smith, et al. (1991); and U.S. Pat. No. 4,887,291 to Stillwell (1989). These various systems make use of facility alarm sensors that are used to relay warning signals to appropriate control centers via transmission links. Cellular radio links are often used for such emergency communications. These systems do little to prevent incidents and they are expensive after the fact attempts to address the security problem.

There are many more elaborate devices attempting to provide security. Such existing systems as facial recognition software, video surveillance, Global Positioning System (GPS) wireless locator systems, and others require expensive systems that are out of reach of the average citizen. Even with the government and industry procuring these devices, the average taxpayer must eventually shoulder the burden.

The following prior art reference put a little levity into a sober topic. The device's scientific name is "The Creep Beeper" and it is strapped onto sex offenders. With such a device name, it would have to be strapped on.

"It looks just like a wristwatch. But this would-be Rolex measures changes in pulse rate, skin temperature and adrenaline. Just think of it like those 1970sera mood rings— only this accessory really says if you are about to blow your top. When the sex offender becomes agitated, an alarm signals authorities, and presumably, they can go out after the guy with their butterfly nets.

'This is a chance to help a troubled person, just when he needs it most,'says inventor Dr. Eike Winckler of the Berlin Institute for Stress Research. 'At the same time, the community will be safer.'"

Despite its interesting name, this device has serious limitations in addition to cost and having a "scarlet letter" strapped to an unwilling person. As one researcher noted, "Unfortunately, everyone encounters normal day-to-day stress. Until further testing, it's unclear whether this gadget will go off each time a sex offender opens his Visa bill." Frequent false alarms combined with other limitations make this device an impractical, entertaining oddity.

Entertainment and Games

Television is one entertainment avenue of reaching a large audience to present information of a person or object of interest. Some television programs, such as "America's Most Wanted," distribute information about fugitives and also about missing children. However, given the high cost of television, only limited time can be spent on any one person, which reduces chances for recognition of featured individuals. After the program has aired, recognition of individuals relies solely on this limited exposure to the audience. Additionally, a television program is a push type medium, aired at rigid times without audience control. If a person is at work or has another commitment, the information will be missed. Even if the person is available to watch television, there are literally hundreds of other programs on to distract the viewer.

Radio is another well-known medium that has no ability to distribute the visual data crucial for recognition. In recent times, radio is reaching a smaller audience as other forms of entertainment vie for audience share. For these reasons, radio in its current state is not suited for identifying people and objects of interest.

U.S. Pat. No. 6,491,297 to Cardoso (2002) discloses a method for locating individuals by providing pictures of the sought individuals on lottery game cards. Unfortunately, this method combines the potential vice of gambling with the altruistic motive of locating people. For that matter, one could place a picture of a missing child on a pack of cigarettes or a bottle of beer. It is another example of information overload on an overwhelmed, unsympathetic public.

U.S. Pat. No. 4,012,045 to Vail (1977) discloses a question and answer game involving the field of criminal justice. U.S. Pat. No. 4,039,192 to Magiera (1977) discloses a card and board game apparatus for simulating the stages of the legal process of a criminal case. U.S. Pat. No. 4,714,255 to Pope (1987) discloses a question and answer game involving criminal justice. British patent number GB 2,227,420 to Smith (1990) discloses an apparatus for playing a game that relates to the successful undertaking of criminal tasks. French patent number FR 2,619,020 relates to a law-based game corresponding to civil or criminal suit cases and bearing corresponding judgments. Canadian patent number CA 1,067,920 discloses a card and board game apparatus for simulating the various stages of the legal process of a criminal case.

With litigation costs reaching new levels, an aspiring pro se person may use such games to acquire just enough knowledge to be dangerous. A comparison could be made to playing the game "Operation" and then considering oneself a competent surgeon. With limited utility and excitement, it is no wonder such games have not come close to the success of a game like "Monopoly."

The Public is the Key

Unfortunately, such cases as the Washington D.C. snipers indicate clearly that public knowledge and involvement are essential elements of our security. With hundreds of billions expended and our entire government, military and intelligence agencies engaged in the effort, unsettling questions arise in our war on terrorism and overriding desire for security. Could we have prevented September 11th? How many sleeper cells are lying dormant until they strike us again? When will we, the public, feel secure again? It is humbling that the raw, unchained energy of a powerful nation is unable to resolve these potent threats.

Disadvantages of the Prior Art

All of the systems, methods, and apparatus mentioned thus far suffer from one or more disadvantages:

(a) They are expensive and require extensive hardware solutions, placing them out of reach of most of the populace.

(b) They are a "push type" system—providing information rigidly and without the user's consent or input.

(c) They require an extensive amount of law enforcement involvement and effort.

(d) They combine an undesirable activity, such as gambling, with the desirable outcome of altruism and security.

(e) They are not very effective in solving the need. A haphazard "shot in the dark" image on a television may simply not reach the right person.

(f) They do not present information in such a way as it will be recalled when needed.

(g) They rely on data sources which are not being kept up to date due to lack of manpower and public interest.

(h) They are not fulfilling or entertaining enough to ensure people will use them on a continual basis.

(i) They require extensive involvement and time by the user to be effective.

(j) They are based on questionable research and science.

(k) They violate civil freedoms of certain individuals.

(l) They do not leverage the public demand side to solve problems.

It is readily apparent there is a dire need for a system that overcomes these disadvantages and provides enhanced security for all people.

SUMMARY OF THE INVENTION

Accordingly, the present invention is directed to system and methods that substantially obviate the above and other disadvantages of the prior art. Thereby, the invention is a novel synthesis of social utility, learning, and entertainment. Widespread public access to many data sources, reduced computer costs, and recent public policy such as Megan's Law have allowed the systems and methods for recognition learning to come to fruition.

In consideration of these factors, the present invention of systems and methods for recognition learning comprises means of accessing a plurality of object data sources, assigning object nature to selected data, and presenting entertaining games and schemes derived from these object data. These games and schemes provide repeated entertainment and concomitant learning of objects with social utility.

Advantages

Accordingly, several advantages of my invention are:

(a) to provide affordable, easily understood means of effecting recognition learning.

(b) to provide a means for automatic access and update of data.

(c) to provide novel entertainment value to the methods wherein public use is motivated, repeated, and enhanced.

(d) to present data repeatedly to enhance recognition learning without inducing boredom.

(e) to provide for portability of methods and adaptable application in a cost effective manner.

(f) to provide timely notification to the user of new data.

(g) to increase public interest in these data sources, which will provide greater impetus for responsible agencies to provide current, accurate, comprehensive data.

(h) to provide enhanced object data, such as video, three dimensional images, composite images, detailed characteristic data, and audio samples to improve recognition learning.

(i) to provide a "pull" system which is responsive to user needs such as time availability, geography, and other user criteria.

(j) to provide a system that reduces law enforcement requirements.

(k) to provide a system that protects individual's civil rights.

(l) to provide a reliable system that greatly increases security to an informed public.

The summary of the invention and the following detailed description should not restrict the scope of the claimed invention. The accompanying drawings, which form part of the description for carrying out the best mode of the invention, show several embodiments of the invention, and together with the description, explain the principles of the invention. Both provide examples and explanations to enable others to practice the invention. Further advantages of my invention will become apparent from a consideration of these drawings and descriptions.

DESCRIPTION OF THE DRAWINGS

All drawings are in accordance with systems and methods consistent with the invention, unless otherwise noted. In the drawings.

Figure 42:
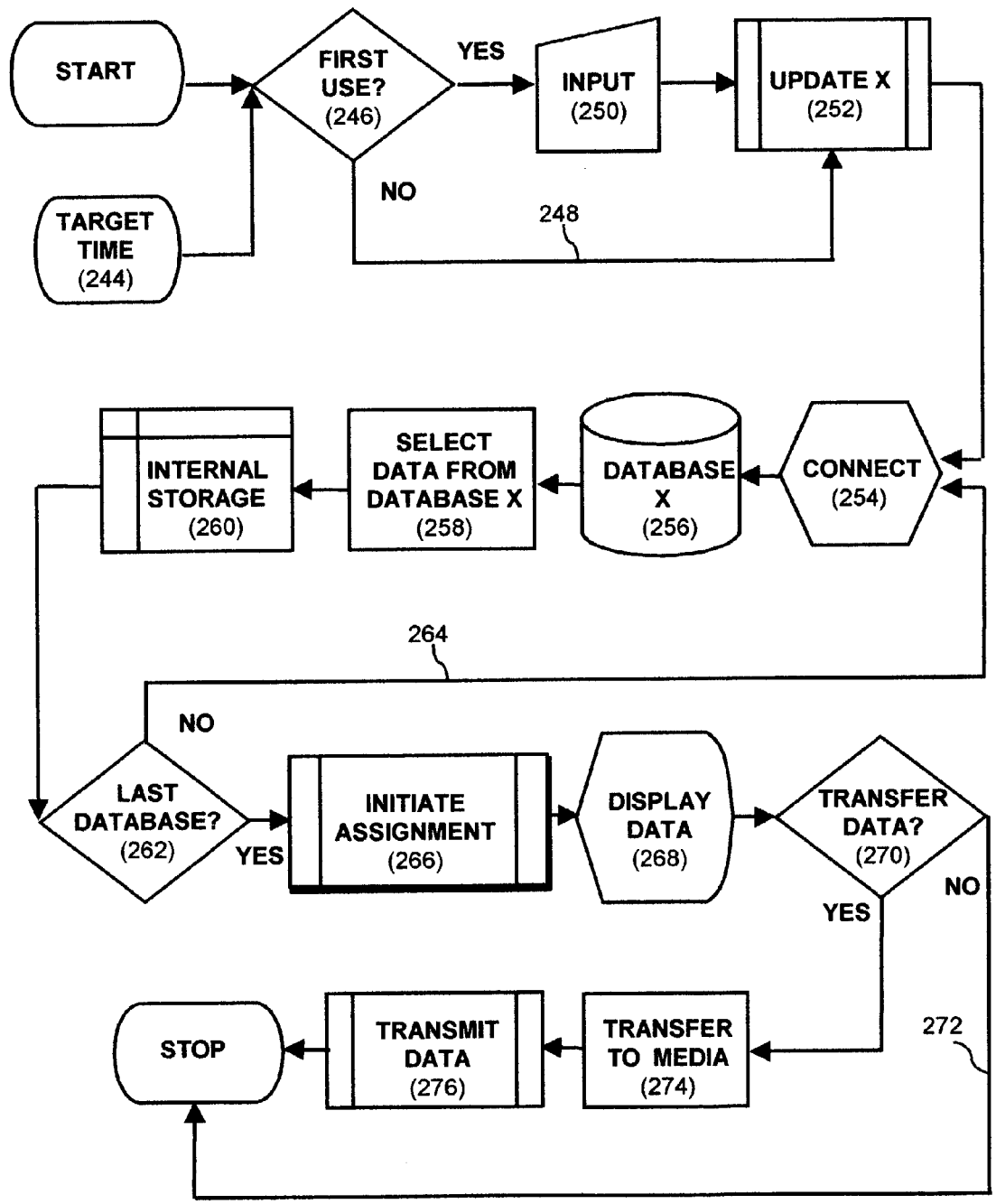
FIG. 42 illustrates the access overview flowchart for the systems and methods of recognition learning.
Figure 43:
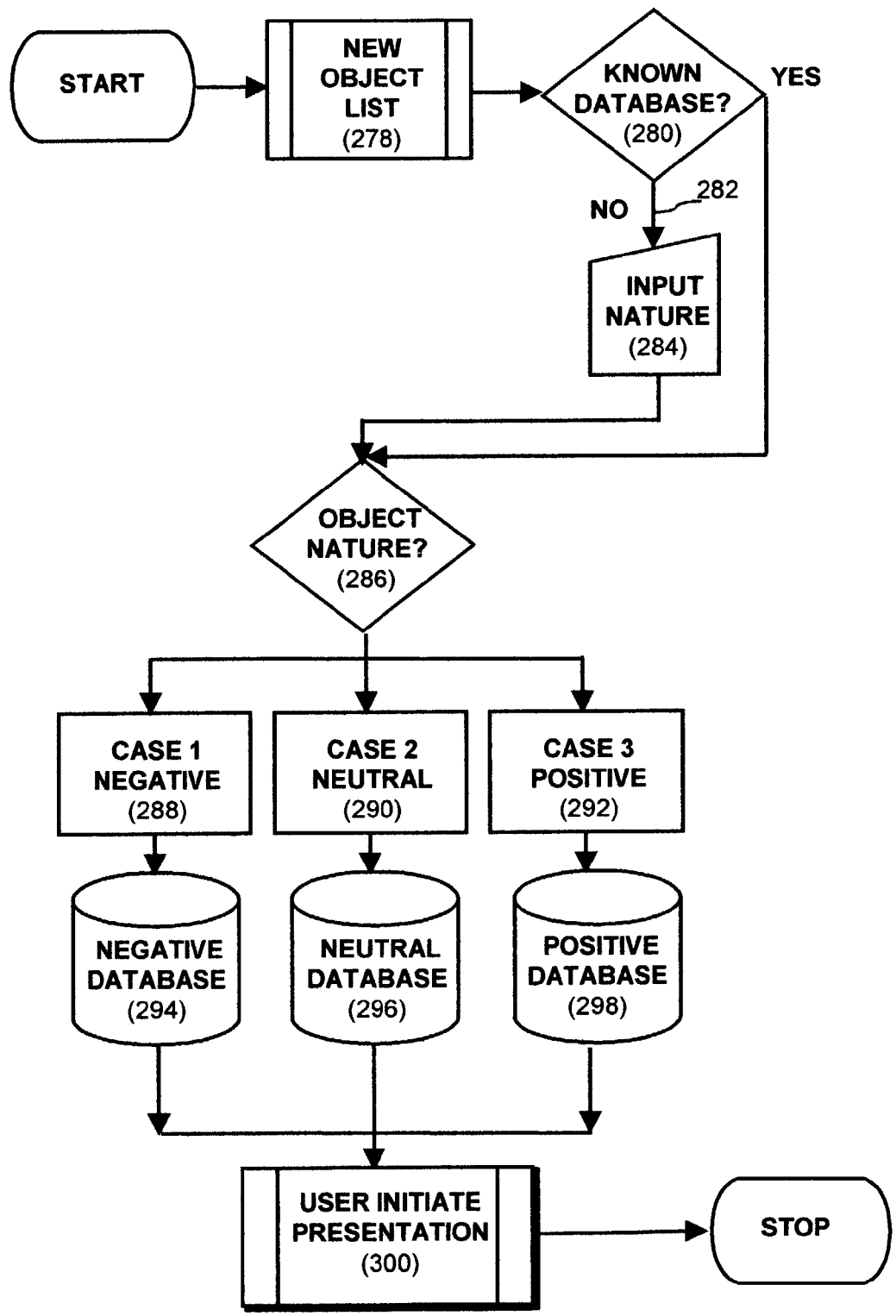
FIG. 43 illustrates the assignment overview flowchart for the systems and methods of recognition learning.
Figure 44:
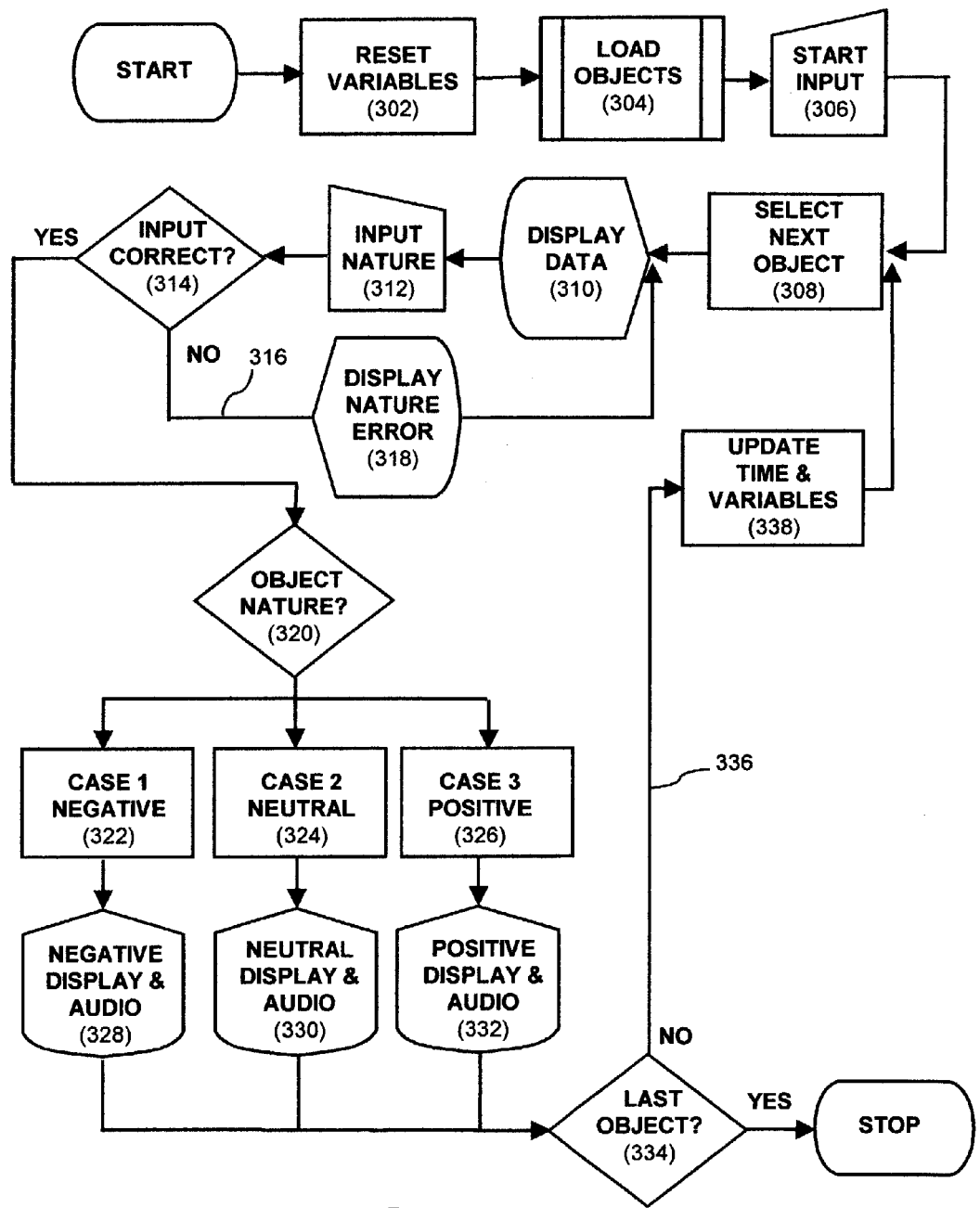
FIG. 44 illustrates the presentation overview flowchart for the systems and methods of recognition learning.

REFERENCE NUMERALS IN DRAWINGS 50 sex offender database
52 sex offender characteristic data
54 sex offender visual data
56 sex offender audio data
58 terrorist database
60 terrorist characteristic data
62 terrorist visual data
64 terrorist audio data
66 criminal database
68 criminal characteristic data
70 criminal visual data
72 criminal audio data
74 weapon database
76 weapon characteristic data
78 weapon visual data
80 weapon audio data
82 missing child database
84 missing child characteristic data
86 missing child visual data
88 missing child audio data
90 missing pet database
92 missing pet characteristic data
94 missing pet visual data
96 missing pet audio data
98 trustworthy people database
100 trustworthy person characteristic data
102 trustworthy person visual data
104 trustworthy person audio data
106 stolen items database
108 stolen items characteristic data
110 stolen items visual data
112 stolen items audio data
114 generic object database
116 generic object characteristic data
118 generic object visual data
120 generic object audio data
122 negative nature object database
124 positive nature object database
126 neutral nature object database
128 user selected database 1
130 user selected database 2
132 user selected database 3
134 user selected database 4
136 means of connectivity
138 manual upload of selected databases
140 manual download of selected databases to desired devices
142 personal digital assistant
144 watch apparatus
146 cell phone
148 notebook computer
150 systems and methods of automated data download and upload
152 intermediate systems and methods of data transfer
154 satellite data transfer
156 ground transmission
158 telephone
160 magnetic and optical storage means
162 hard copy
164 device equivalence
166 new object display
168 new object image 170 new object nature input prompt
172 new positive object selected
174 positive object presentation
176 positive object audio presentation
178 new negative object selected
180 negative object presentation
182 negative object audio presentation
184 presentation of objects comprising interactive display, audio and user input
186 presentation display of score and time to enhance user motivation
188 user input feedback comprising a pointing icon
190 input device
192 user
194 positive object correctly designated by user
196 negative object correctly designated by user
198 object not yet designated by user
200 presentation audio output
202 partitioned object image being reassembled by user input
204 separated partitioned image pieces
206 user reassembled object image
208 three dimentional presentation
210 enhanced data source
212 composite image generation
214 kinermatic modeling
216 comprehensive data sources
218 environmental object
220 environmental object auditory characteristics
222 recall of learned object characteristics and comparison to environmental object
224 data search input and display
226 search results summary display
228 display of object match with environmental object
230 audio sample from selected object data
232 user recognition of learned object supported by means of data search and presentation
234 flowchart legend
236 access for the systems and methods of recognition learning detailed in FIG. 42
238 assignment for the systems and methods of recognition learning detailed in FIG. 43
240 presentation for the systems and methods of recognition learning detailed in FIG. 44
242 looping to other functions
244 automated start of access functions at specified times or events
246 first use input from user
248 not first use bypass of user inputs
250 user inputs data pertinent to the systems and methods of the invention
252 update of x definition of databases and sources accessed
254 means of connection to database and source x
256 access of database and source x
258 selection of data from source x based on user inputs
260 internal storage on users device of selected data
262 decision to branch for additional databases and sources
264 branching to connect for additional databases and sources
266 initiation of assignment module detailed in FIG. 43
268 display of data accessed
270 decision for transfer of accessed data based on user or predetermined inputs
272 stop due to no transfer of data
274 transfer of data to any appropriate means
276 transmission of data
278 new object data and list
280 decision based on database and objects being known
282 branching when data is from unknown source or nature is unknown
284 user input object nature selected from the group comprising one of negative, neutral, and positive
286 branching decision based on object nature
288 negative object assignment and routines
290 neutral object assignment and routines
292 positive object assignment and routines
294 object data stored and correlated to negative object database
296 object data stored and correlated to neutral object database
298 object data stored and correlated to positive object database
300 user discretion to initiate presentation module detailed in FIG. 44
302 initialize module variables
304 load either randomized, comprehensive, recent, or user selected object data
306 user input to begin
308 select next object and correlated data
310 display screened object data requiring user input of object characteristic data
312 user input object nature or object data missing from display
314 decision of user input correctness
316 branch when user is incorrect
318 display error notification
320 branching based on object nature
322 negative object nature logic path
324 neutral object nature logic path
326 positive object nature logic path
328 negative object cautionary display and correlated audio
330 neutral object display and correlated audio
332 positive object reinforcing display and correlated audio
334 decision of last object in list
336 branch when more objects remain
338 update time, score and associated variables

DETAILED DESCRIPTION OF THE INVENTION

Reference will now be made in detail to embodiments of the invention, examples of which are illustrated in the accompanying drawings. Wherever possible, the same reference numbers will be used throughout the drawings to refer to the same or like parts.

Figure 1:
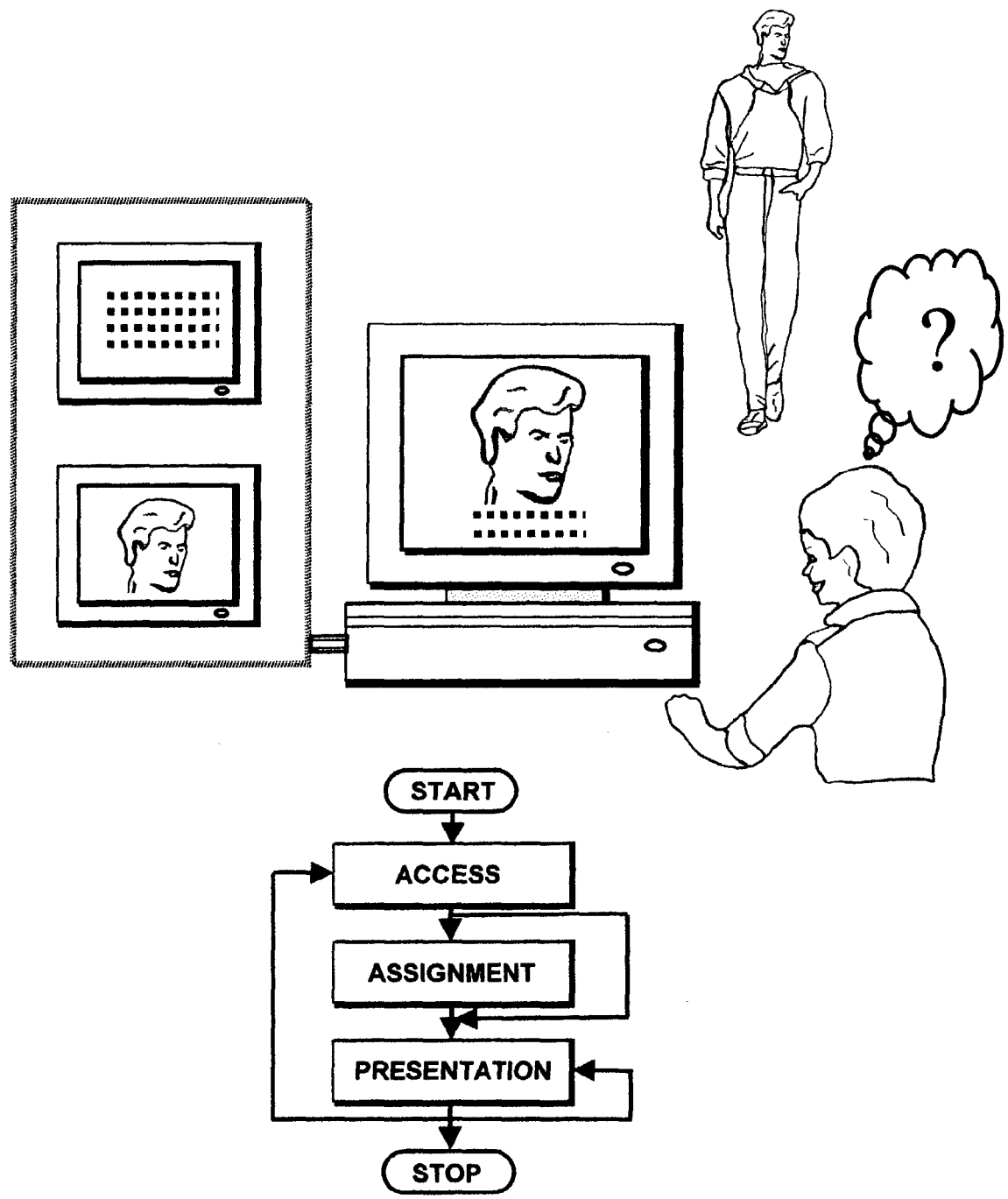
FIG. 1 illustrates an overview and summary flowchart of the systems and methods of the present invention.

An embodiment and overview of the present invention is illustrated in FIG. 1. The systems and methods for recognition learning are effected through means of data access, nature assignment, and data presentation. The flowchart illustrates what is occurring above with the child at the computer. Having accessed a plurality of data sources, object nature is assigned selected from the group comprising one of negative, neutral, and positive. In this case, characteristic, visual, and audio data has been accessed and assigned a negative nature for a sex offender. The means of aversive, cautionary presentation of negative data in the invention have effected recognition learning for the child, who recognizes said sex offender in the real world and can act appropriately. Security is enhanced.

Description—FIGS. 2 through 10

FIGS. 2 through 10 illustrate a plurality of candidate data sources that may be accessed by means of the present invention. Some of these candidate data sources may already exist, such as visual and characteristic data on sex offenders in certain states. Other data sources, such as audio sample data and databases of certain objects, may not currently exist and can be considered within the scope of the appended claims.

Within the scope of the invention, data can pertain to any object of interest. An object is any person or thing that the method is accessing information on. Although the introductory paragraphs cite security and recognition of undesirable objects of interest, the spirit of the invention is recognition learning of any object of interest. This could comprise desirable or neutral objects of interest as well.

Figure 2:
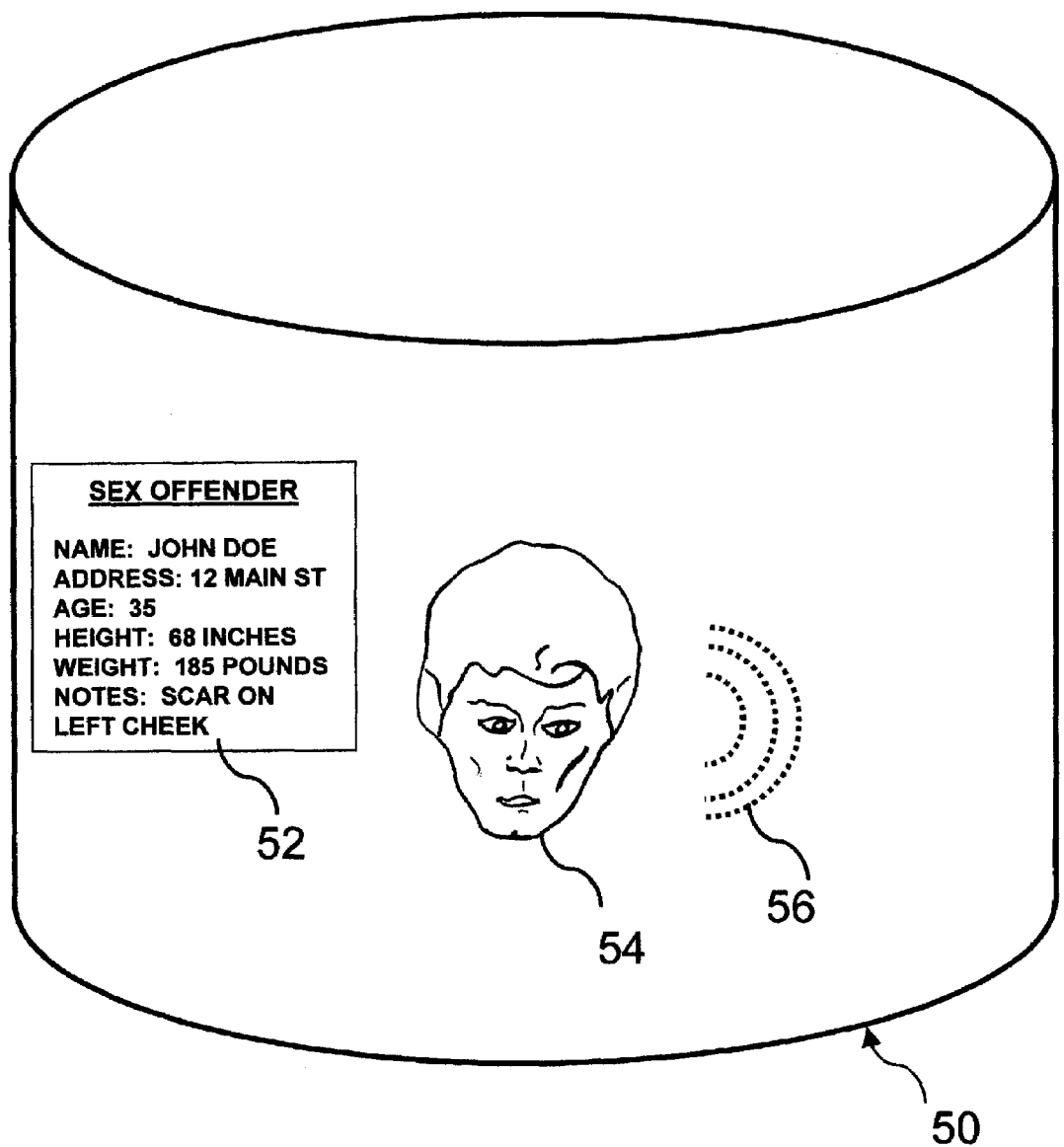
FIG. 2 illustrates a means of storing data on sex offenders in a database comprising characteristic data, visual data, and auditory data.
Figure 3:
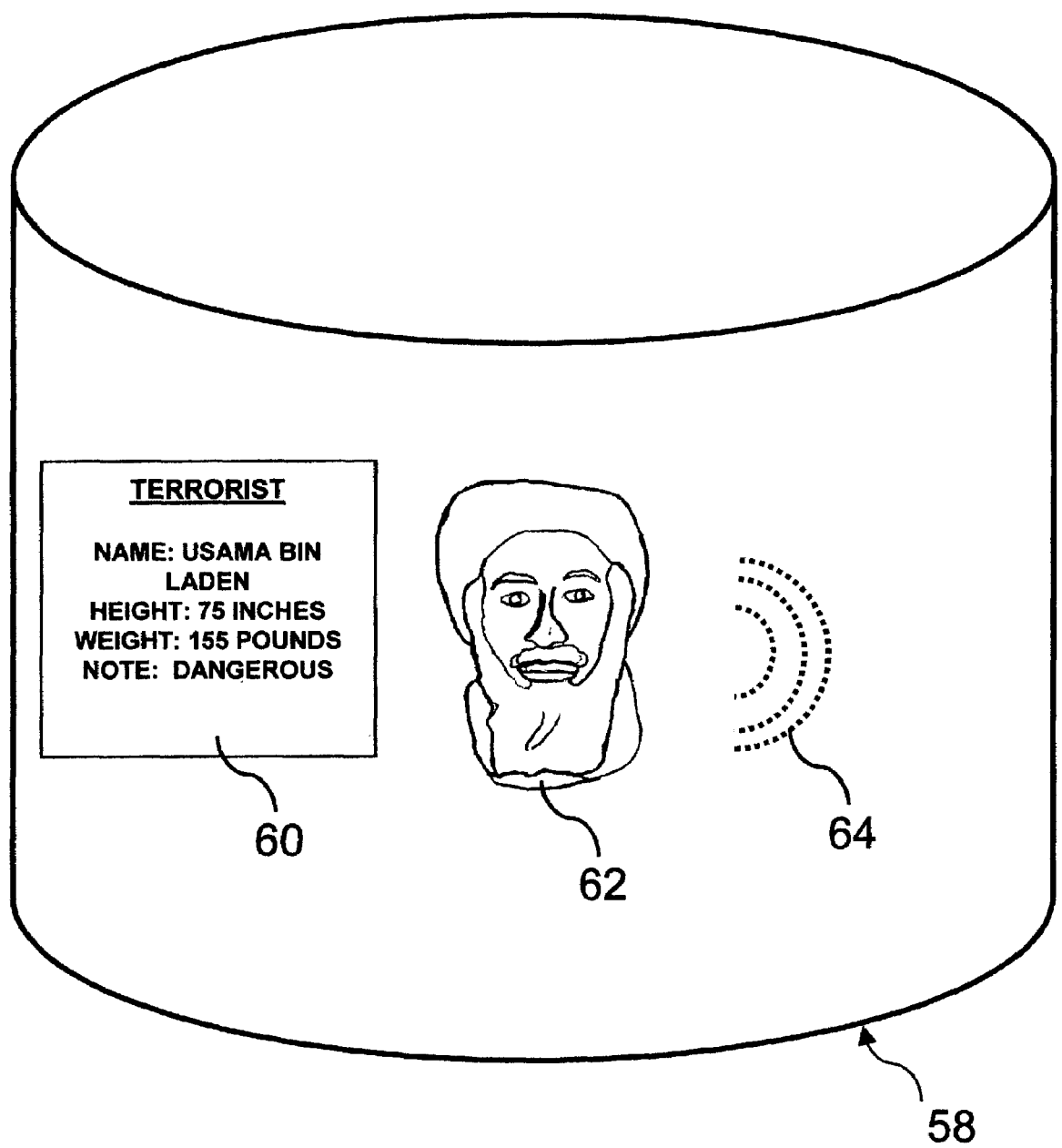
FIG. 3 illustrates a means of storing data on terrorists in a database comprising characteristic data, visual data, and auditory data.
Figure 4:
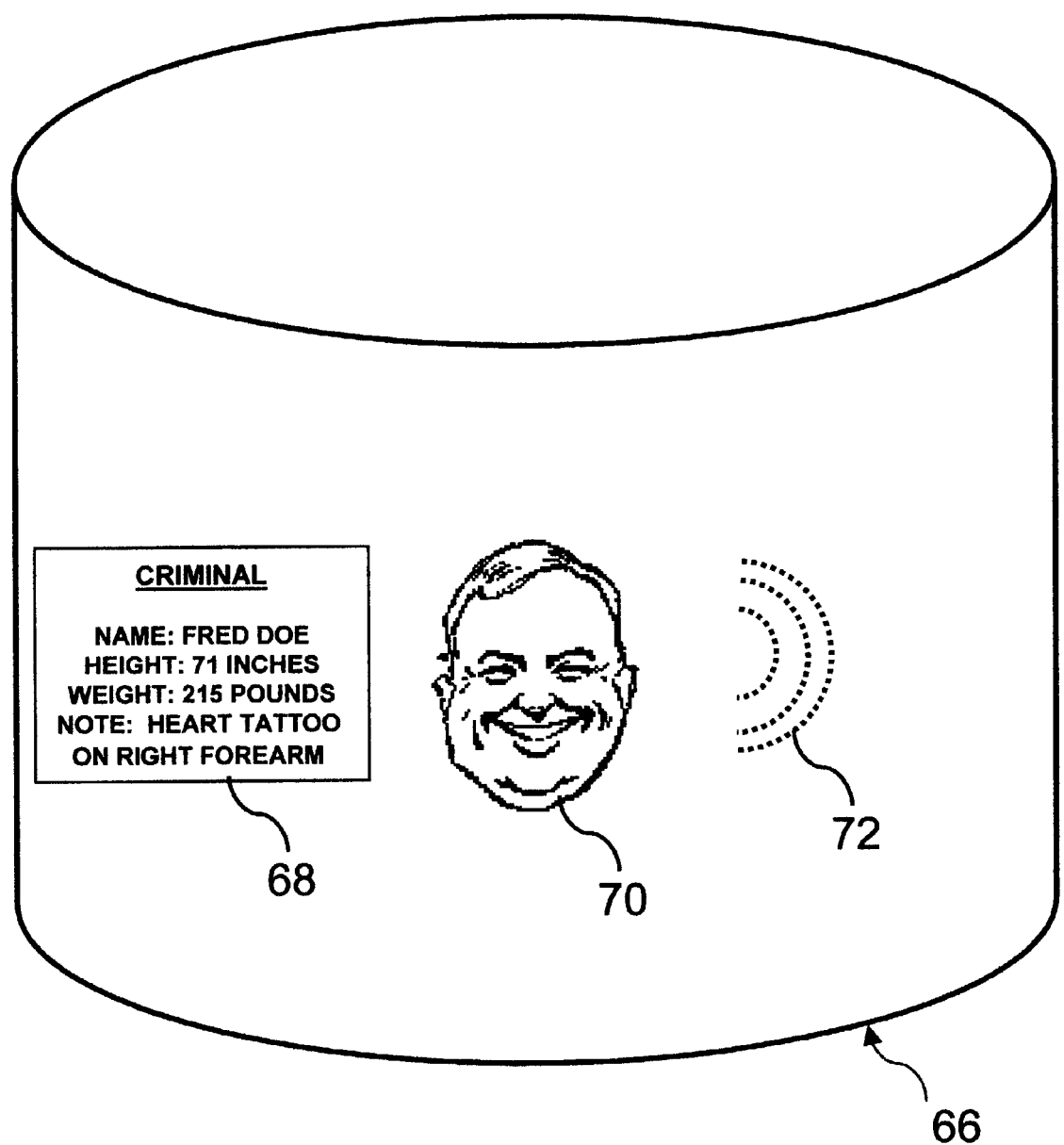
FIG. 4 illustrates a means of storing data on criminals in a database comprising characteristic data, visual data, and auditory data.
Figure 5:
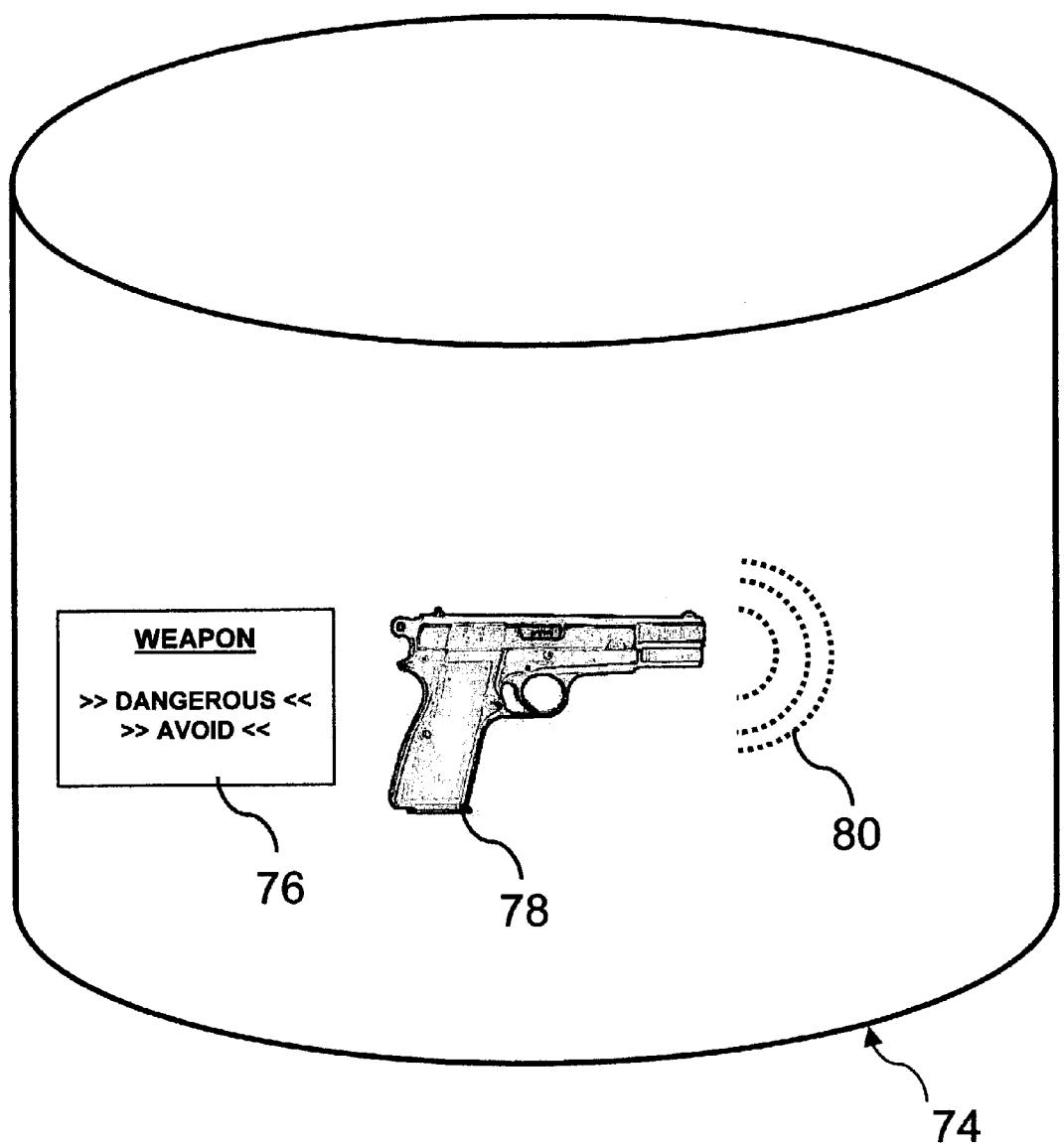
FIG. 5 illustrates a means of storing data on weapons in a database comprising characteristic data, visual data, and auditory data.
Figure 6:
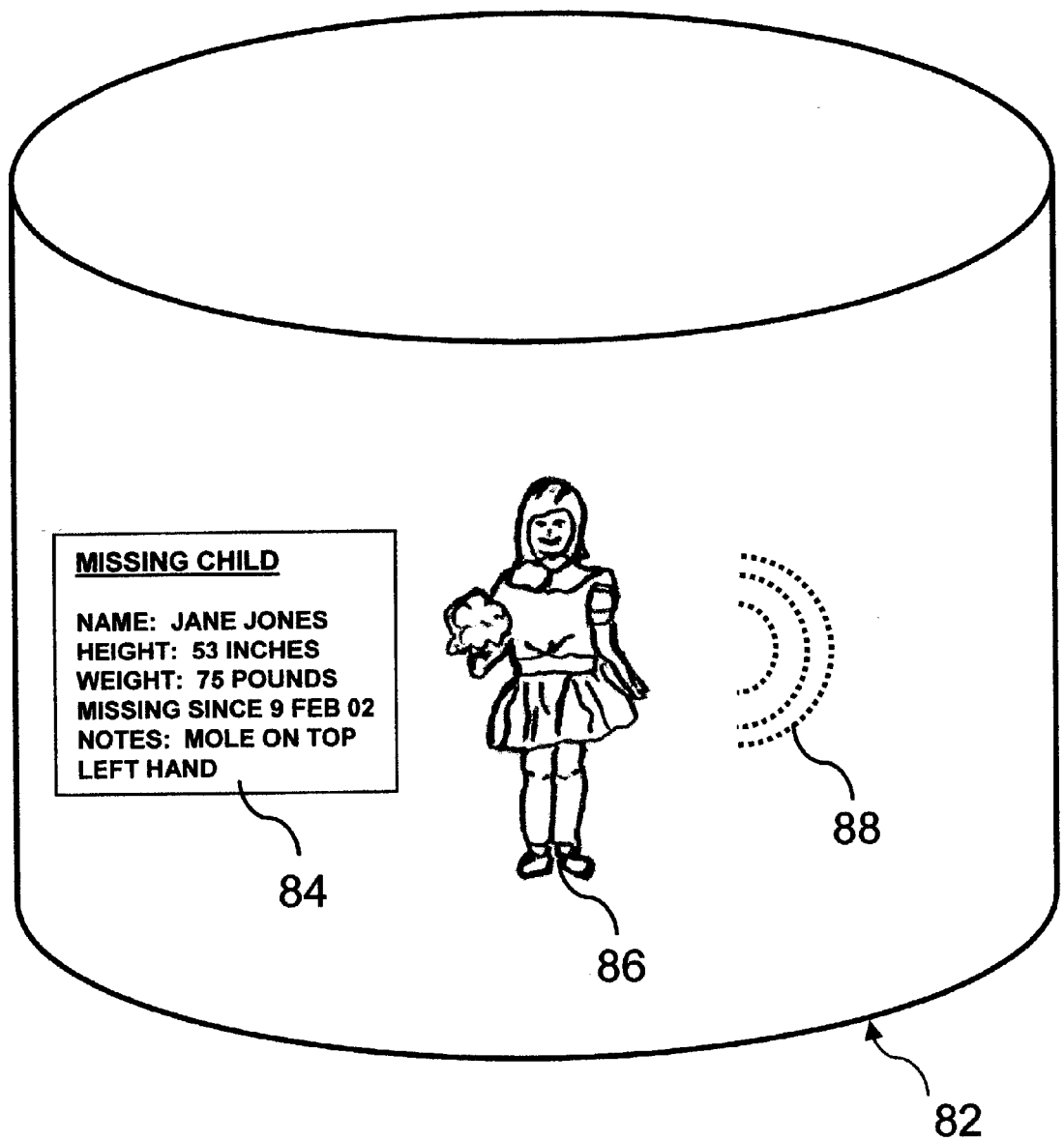
FIG. 6 illustrates a means of storing data on missing children in a database comprising characteristic data, visual data, and auditory data.
Figure 7:
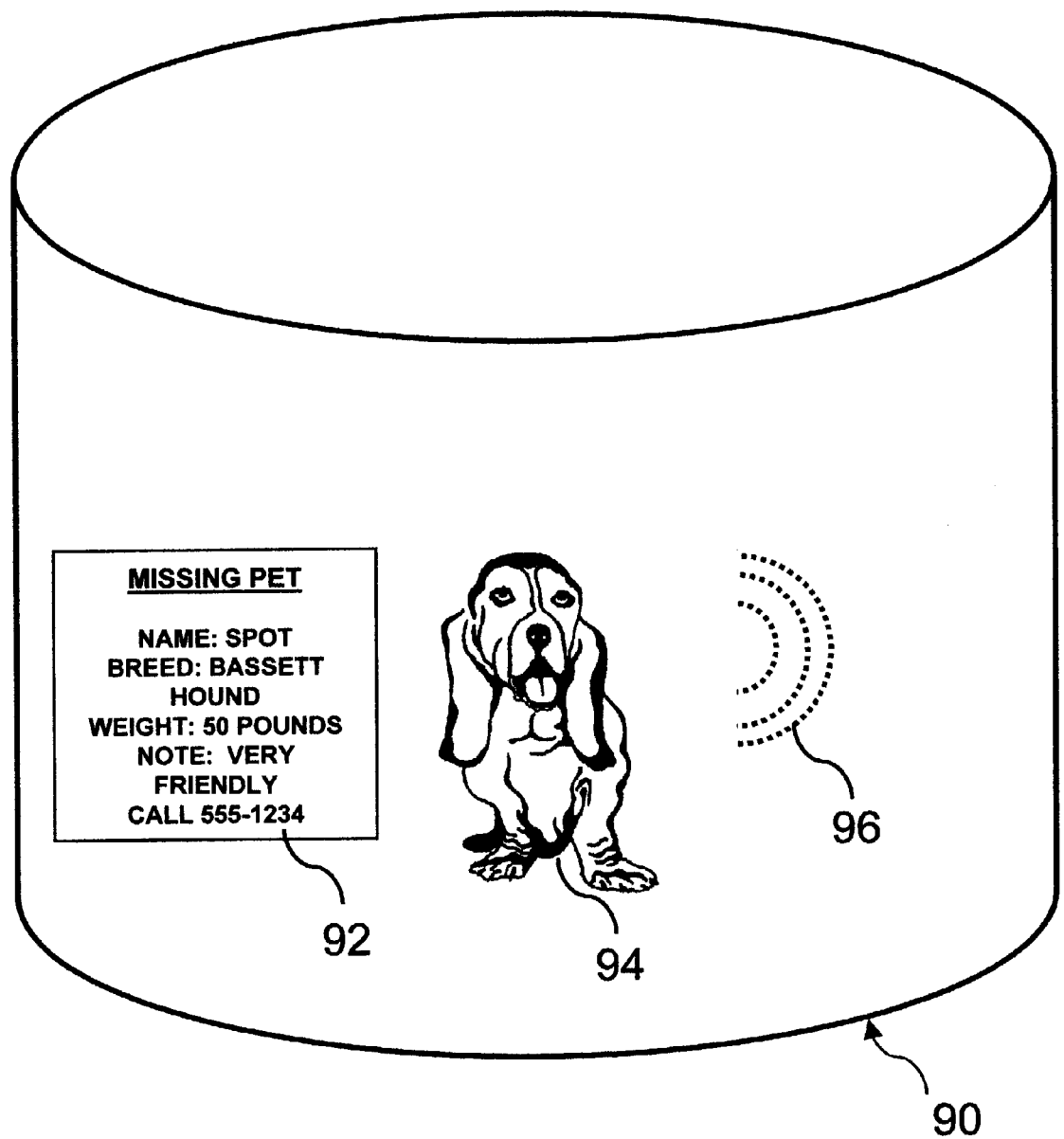
FIG. 7 illustrates a means of storing data on missing pets in a database comprising characteristic data, visual data, and auditory data.
Figure 8:
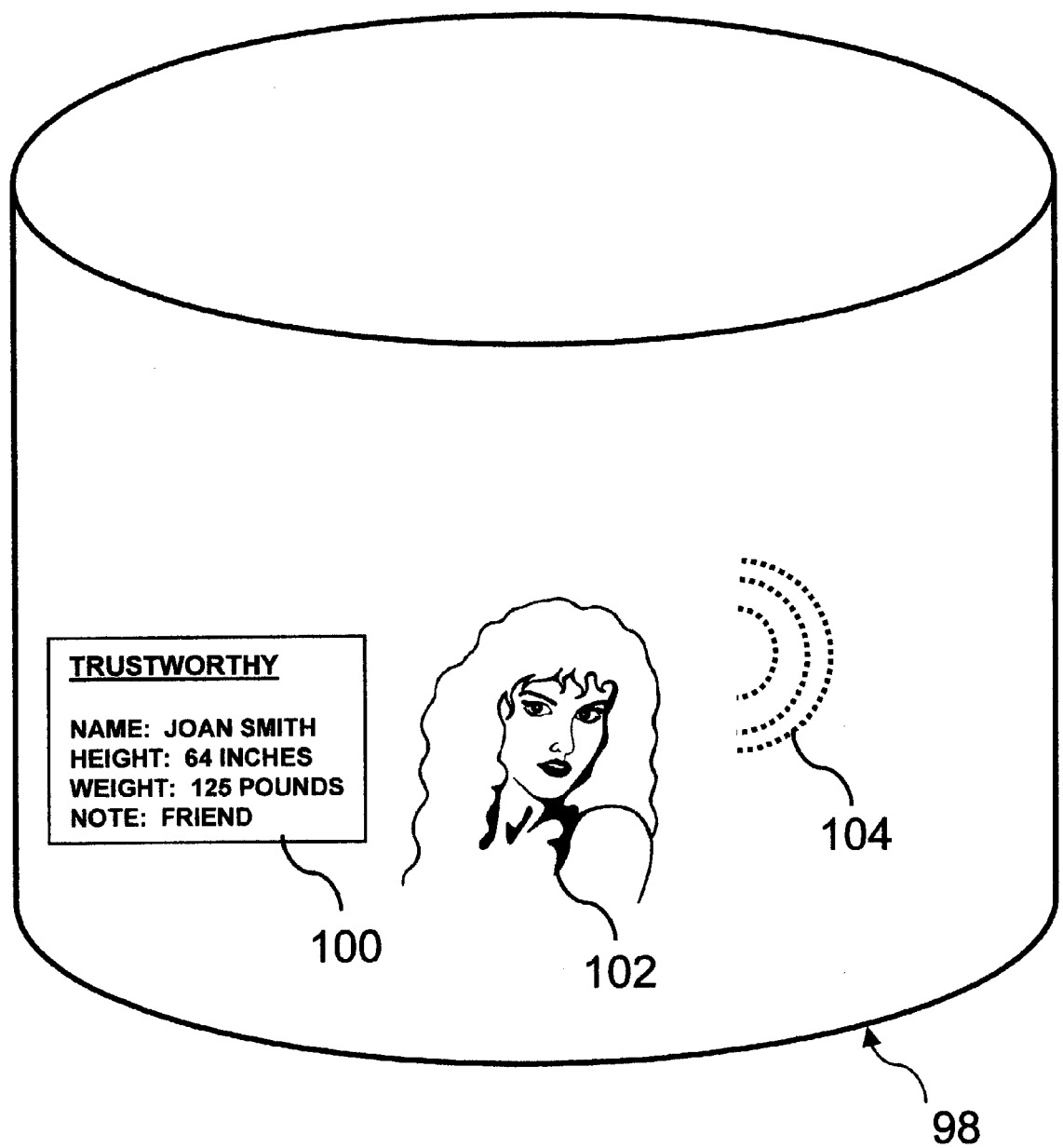
FIG. 8 illustrates a means of storing data on trustworthy people in a database comprising characteristic data, visual data, and auditory data.
Figure 9:
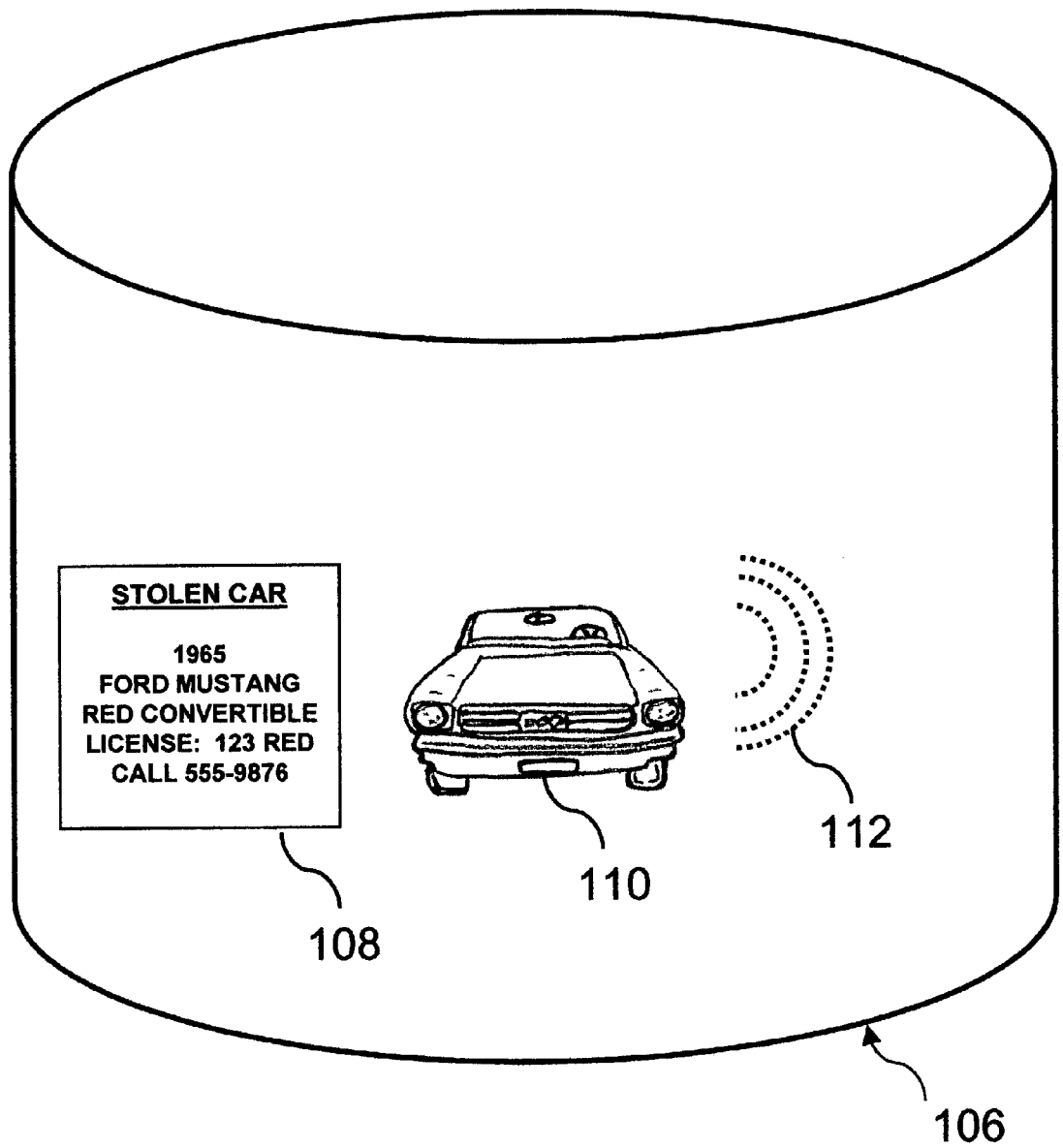
FIG. 9 illustrates a means of storing data on stolen items in a database comprising characteristic data, visual data, and auditory data.

FIG. 2 illustrates a means of storing data on sex offenders in a database 50 comprising characteristic data 52, visual data 54, and audio data 56. About half of the states in the US have internet sex offender registries with some of this data accessible to the public.

Figure 10:
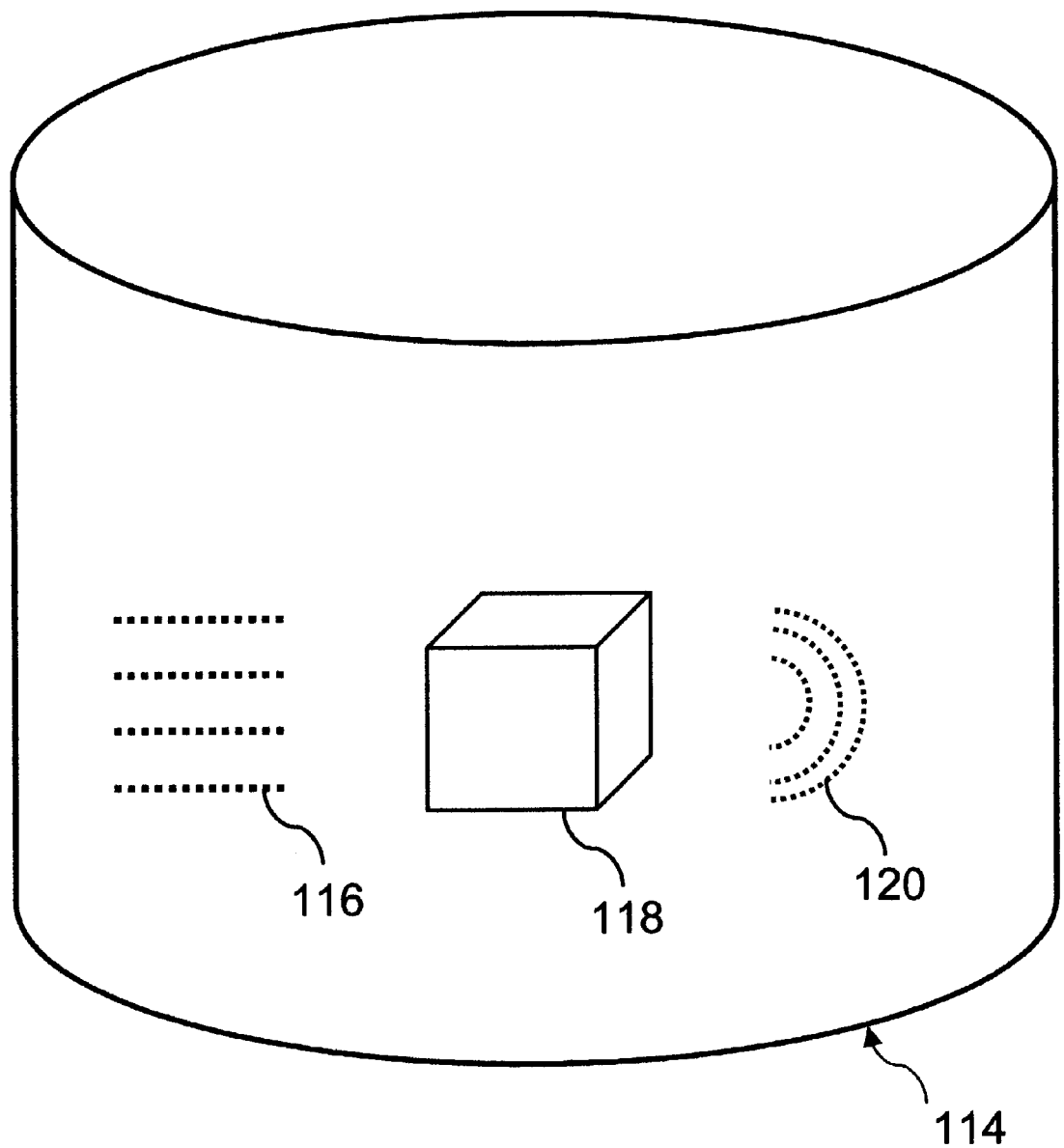
FIG. 10 illustrates a means of storing data on any desired object in a database comprising characteristic data, visual data, and auditory data.

FIGS. 3–10 illustrate means of storing data on terrorists 58 (FIG. 3), criminals 66 (FIG. 4), weapons 74 (FIG. 5), missing children 82 (FIG. 6), missing pets 90 (FIG. 7), trustworthy people 98 (FIG. 8), stolen items 106 (FIG. 9), and any desired objects 114 (FIG. 10). This plurality of data sources is not an exhaustive list of object data candidates. As FIG. 10 illustrates, any object and associated data can be incorporated into the systems and methods of the present invention.

Audio Data

Object audio data has not been observed in any publicly accessible internet registries or databases and is considered one of the novel claims of the present invention. The objective is to effect recognition learning and an audio sample of an object of interest would increase recognition probabilities. An example might be a criminal who had changed his appearance. In a situation where this visual data was lacking or that person's visual appearance had changed, the audio voice data would make all the difference—a child might avoid a predator just by recognizing the voice. For other objects like weapon audio 80 (FIG. 5), missing pet audio 96 (FIG. 7), or stolen car audio 112 (FIG. 9), said audio data would have reinforcing semantic value for a younger user and may not be directly associated with that specific object.

Visual Data

Visual data 54 (FIG. 2), 62 (FIG. 3), 70 (FIG. 4), 78 (FIG. 5), 86 (FIG. 6), 94 (FIG. 7), 102 (FIG. 8), 110 (FIG. 9), and 118 (FIG. 10) are an essential element of recognition learning. The invention's methods extend this visual element by including enhanced, comprehensive visual information comprising still images, full length images, three dimensional computer generated composite images (FIG. 33), and video when available. The invention's paradigm of enhanced data sources applies as it did with audio sources—the more data and variety, the greater the probability of recognition learning. If parents had a missing child, they could provide multiple images and video of the child for inclusion in the missing children database 82.

Figure 33:
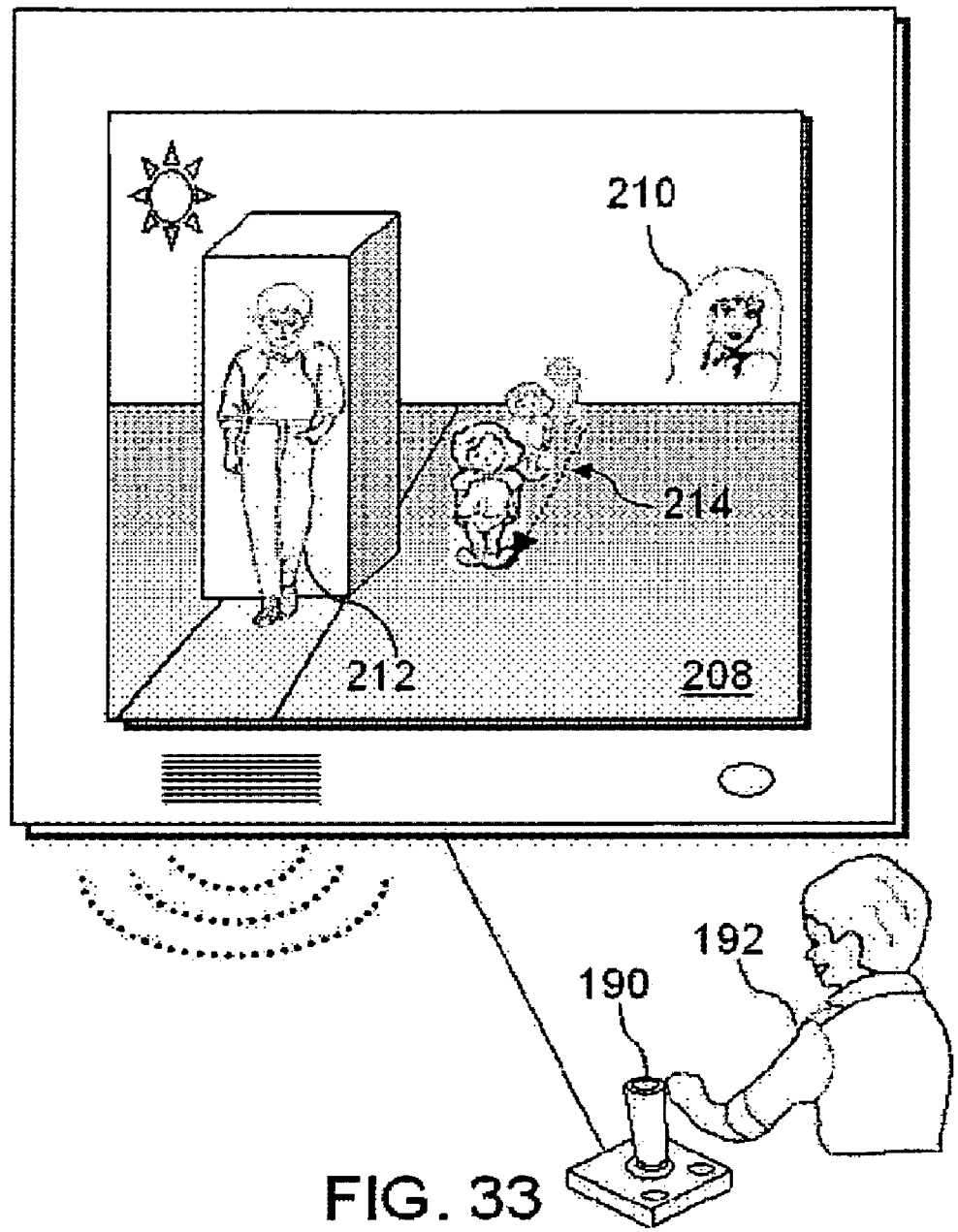
FIG. 33. illustrates another possible embodiment comprising enhanced data sources, composite image generation and kinematic modeling in a three dimensional computer generated presentation.

The invention's means of incorporating composite image generation into recognition learning would be a powerful tool, integrating existing images into a three dimensional rendering. The user would be able to view an object from any perspective and vantage point (FIG. 33). Although the face is considered tantamount to recognition of a person, additional perspectives can only enhance recognition probabilities. With an embodiment of the invention comprising video of an object, there could be kinematic tags or clues to aid recognition learning (FIG. 33). An example is object video of a missing child playing wherein the child has a mannerism or walks differently. The additional data associated with the child could be sufficient for someone to recognize her. Further, video availability increases the interest of the user beyond the static facial images on current missing children internet sites. Given the prevalence of video recorders with the public, availability of these data has increased. For other objects such as sex offenders, criminals, and terrorists, these video sources could be generated when that person was in custody or made available from public surveillance.

Some current data sources employ age progression for persons whose visual data is dated. These age progression algorithms are of value and could be incorporated into the systems and methods of the present invention as well.

Characteristic Data

Characteristic data 52 (FIG. 2), 60 (FIG. 3), 68 (FIG. 4), 76 (FIG. 5), 84 (FIG. 6), 92 (FIG. 7), 100 (FIG. 8), 108 (FIG. 9), and 116 (FIG. 10) are associated, descriptive object data in text format. These data give object identifiers such as "missing child" or "weapon" that facilitate assignment and presentation means of the invention. Said data help categorize objects while giving physical and semantic descriptions. The name, height, weight, and hair color of a missing child, sex offender, and criminal are germane. For many objects, contact information is relevant so that people know whom to notify in the event of object recognition. For other objects such as the weapon, characteristic data 76 (FIG. 5) provides a semantic caution or advisory that alludes to object nature assignment.

Figure 11:
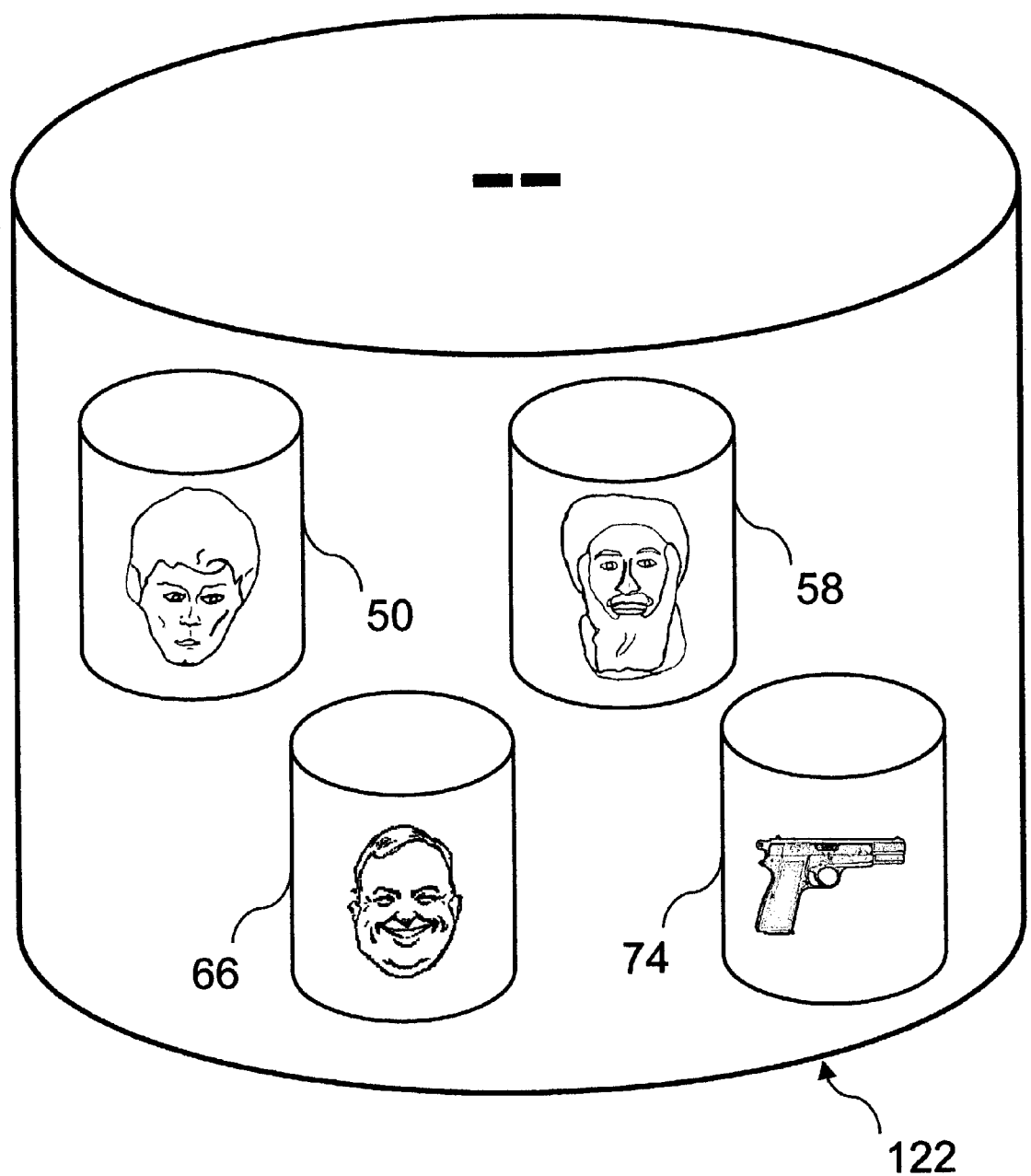
FIG. 11 is a diagram of object nature assignment wherein the sex offender, terrorist, criminal, and weapon are assigned a negative object nature.
Figure 12:
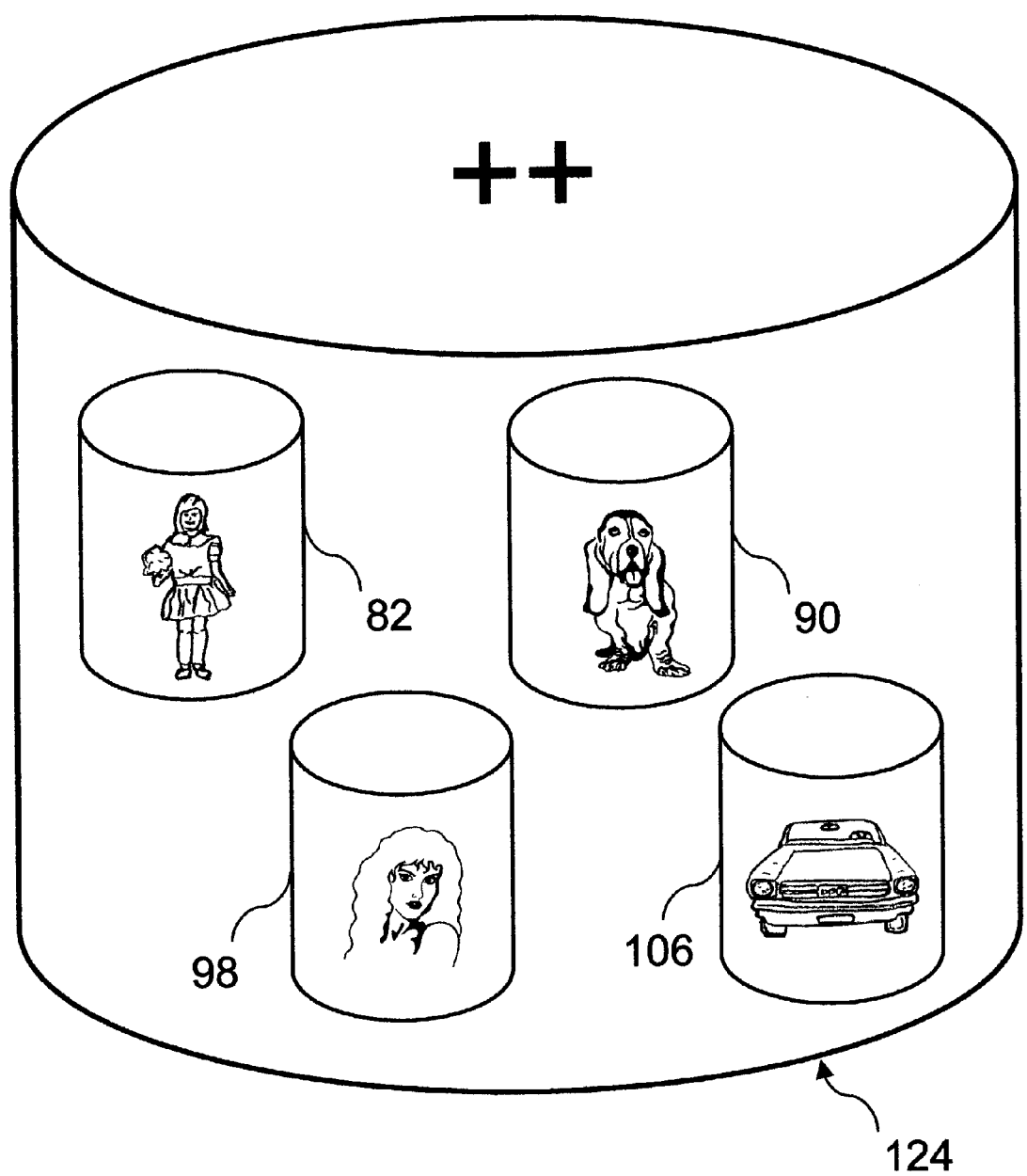
FIG. 12 is a diagram of object nature assignment wherein the missing child, missing pet, trustworthy person, and stolen car are assigned a positive object nature.
Figure 13:
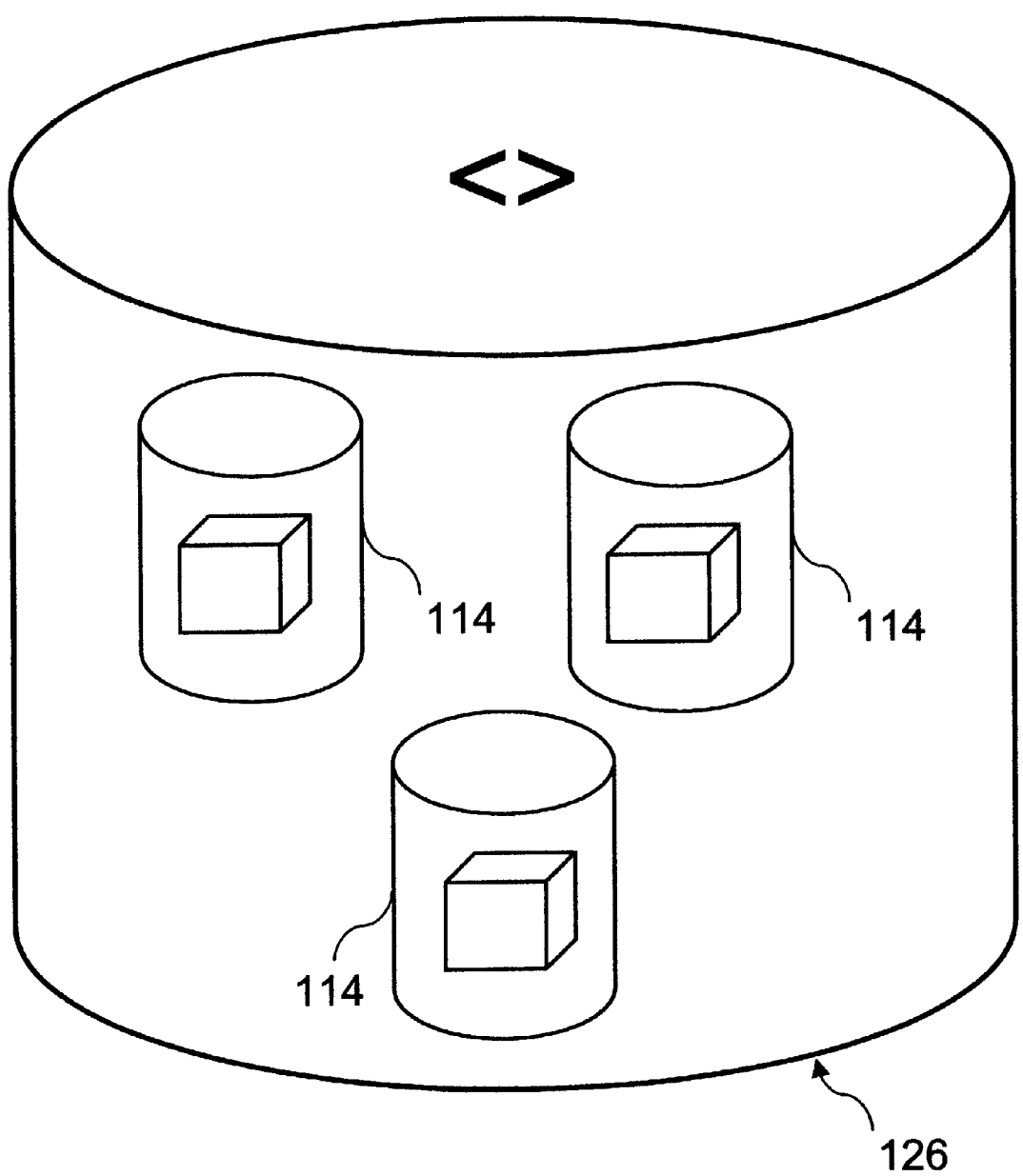
FIG. 13 is a diagram of object nature assignment wherein any desired objects are assigned a neutral object nature.

Nature Assignment—FIGS. 11–13

After desired data sources have been accessed, the invention comprises methods and means of object nature assignment (FIGS. 11–13). In straightforward terms, nature assignment is a subjective process that tags an object as either positive ("good"), neutral, or negative ("bad"). Said nature assignment will affect the means of data presentation and rehearsal in the present invention.

FIG. 11 illustrates a negative nature object database 122 comprising sex offenders 50, terrorists 58, criminals 66, and weapons 74 in accordance with systems and methods consistent with the invention. While nature assignment is a subjective process based on user criteria, certain objects will tend towards certain natures. An example is that terrorists, unless the user is one, are generally considered bad/negative. Similar logic applies for sex offenders, criminals, and weapons. Negative objects can be considered objects we do not want ourselves in contact or proximity with. However, a law enforcement unit would be interested in apprehending a criminal and might select a different object nature. Again, the negative nature object database 122 can be populated with whichever objects the user selects based on relevant cultural, intellectual, and security factors.

FIG. 12 illustrates a positive nature object database 124 comprising missing children 82, missing pets 90, trustworthy people 98, and stolen items 106 in accordance with systems and methods consistent with the invention. Good/positive nature assignment does not mean an object in and of itself is good, but may indicate a possessive or attractive impulse. We want to find the missing child; therefore, we are drawn to the child in order to reclaim her for her parents. We are attracted or drawn to a missing pet to return it to its owners. The same logic applies to trustworthy people—we may feel drawn to their company. A stolen car would not be considered a good thing, but the nature assignment of positive connotes we are drawn to this object to reclaim it and return it to its proper owner. One could think of nature assignment as a type of associated electrical charge, wherein we are repulsed from a negative object and attracted to a positive object. As in negative nature assignment, the means of positive nature assignment are subjective and within the user's control.

FIG. 13 illustrates a neutral nature object database 126 comprising generic objects 114, in accordance with systems and methods consistent with the invention. Neutral nature objects may be incorporated into the presentation means of the invention without the cautionary, aversive elements of negative objects or the reinforcing, attractive elements of positive objects. Neutral objects may simply be objects we want to learn about or recognize without any associated connotation or security concerns. An example might be recognition of a species of bird for an academic examination. If the user desires, the invention's recognition learning may comprise methods of presentation without relative nature assignment. In essence, certain features can be turned off and the invention can effect objective, factual learning. Additionally, neutral objects can be presented with negative and positive objects. In this sense, neutral objects could be a decoy or additional element to enhance thought process and recognition of negative or positive objects.

Figure 14:
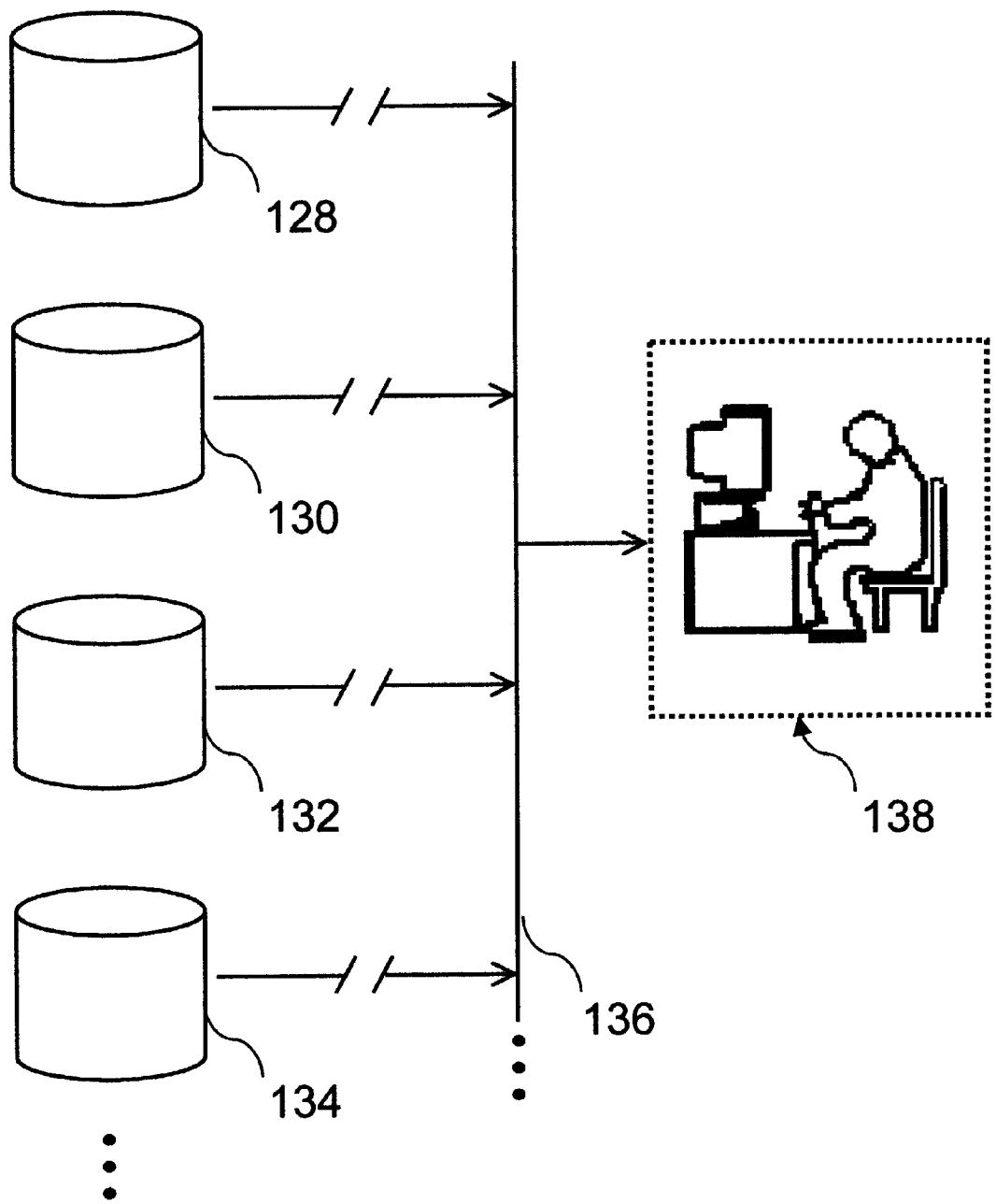
FIG. 14 illustrates prior art of a user manually uploading and integrating data from any desired databases and data sources.
Figure 15:
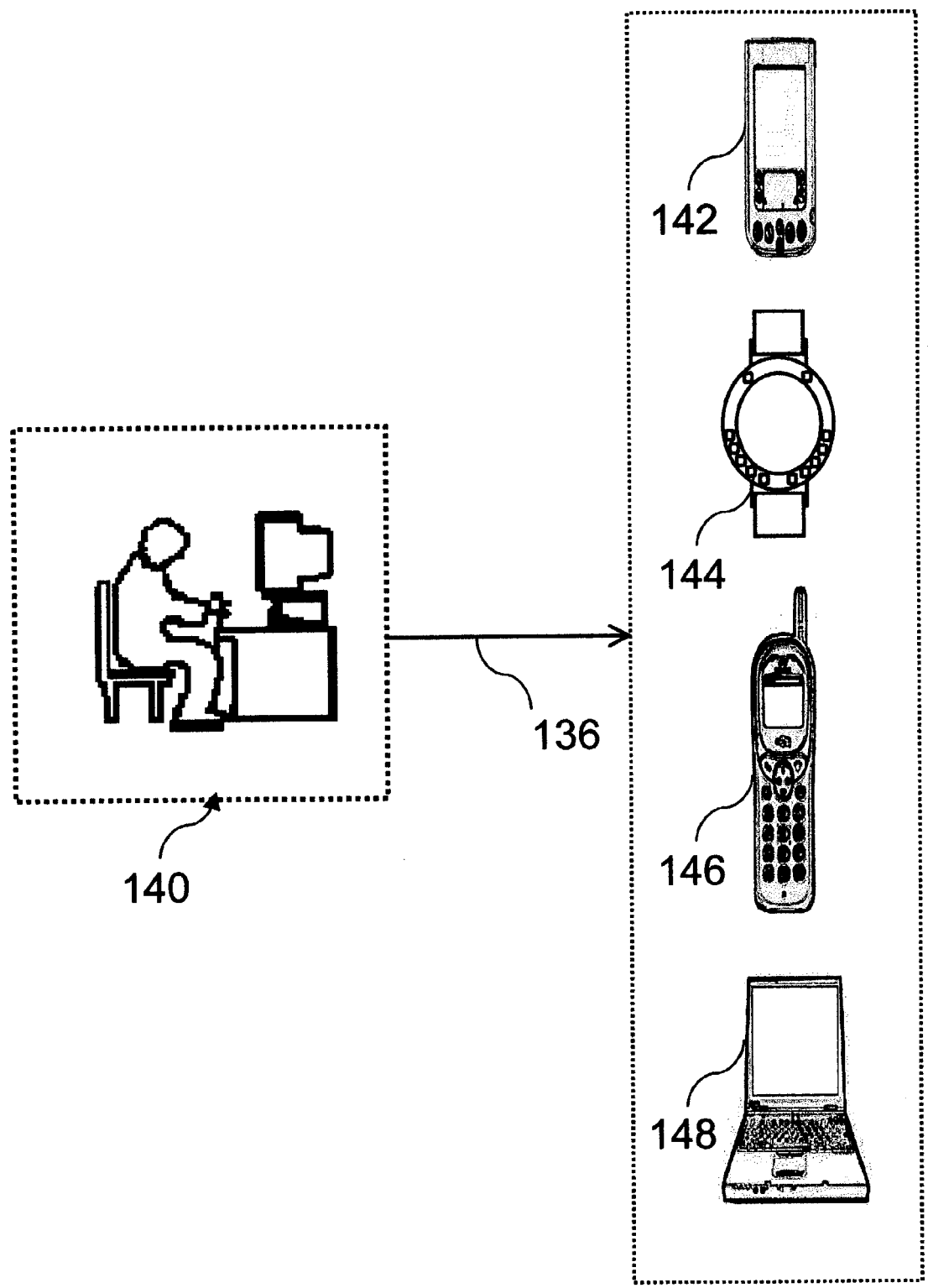
FIG. 15 illustrates prior art of a user manually downloading said data from any desired databases and data sources to a plurality of information processing devices, such as a personal digital assistant, a wristwatch, a cellular phone, and a notebook computer.

Prior Art Manual Data Access—FIGS. 14–15

As discussed, existing methods of data access are limited and require extensive effort and time by the user. Manual data upload (FIG. 14) and manual data download (FIG. 15) can only be described as arduous. The existing databases such as sex offender registries lack necessary features: they require a person to log on to the internet 138 using existing means of connectivity 136, find the appropriate databases 128, 130, 132, 134, manually search, upload selected data by copying and pasting, and review the information. Then, manual downloading 140 to another device 142, 144, 146, 148 may or may not be possible given existing means of connectivity 136. Accessing these data sources manually can require huge amounts of time. Who has that kind of time?

It would be a great improvement if data were automatically, continually accessed and transferable to a plurality of information processing devices in accordance with systems and methods consistent with the invention.

Automation and Portability—FIGS. 16–19

Figure 16:
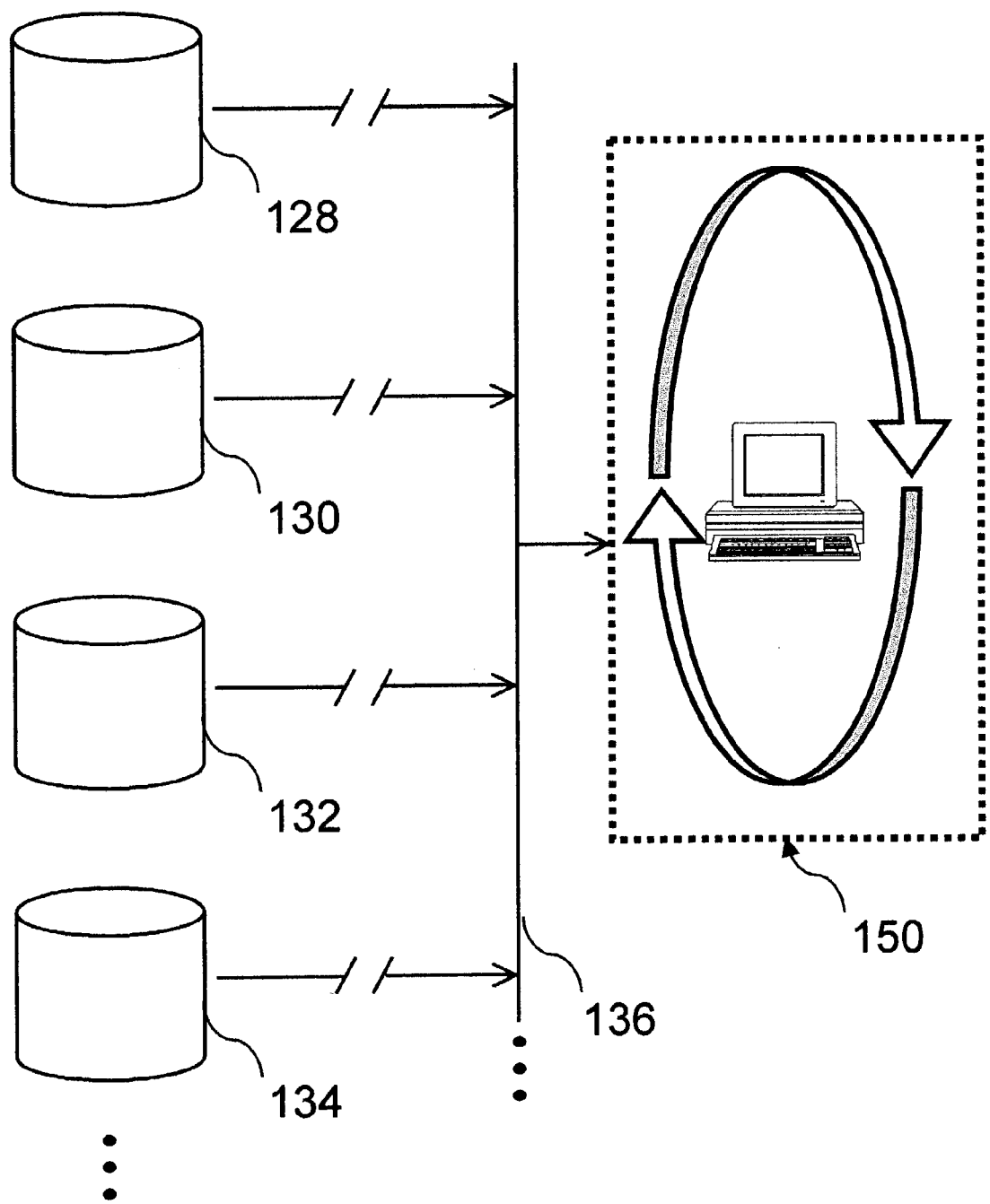
FIG. 16 illustrates means of automated data upload and integration at the user's information processing device.

FIG. 16 illustrates means of automated data upload at the user's information processing device 150, in accordance with systems and methods consistent with the invention. The user-selected databases 128, 130, 132, 134 are automatically accessed through the means of connectivity 136. By example, the user's computer would employ the means of the invention automatically to access sex offender databases, criminal databases, missing children databases, etc. The user-selected databases would be accessed and uploaded into the user's information processing device as objects of interest. The means of access could upload data at specified intervals or whenever new object data was available within the user-selected databases.

Objects would be selected and filtered based on user criteria. By example, the user inputs his address once and the methods and means of the invention access appropriate object data sources as needed. These object data sources could comprise data on all sex offenders who reside within ten miles of the user's address, data on missing children lost in the user's state or country of residence within the last five years, and data on missing pets lost within five miles of the user's residence. User inputs could comprise variation of any or all of these object selection criteria. By example, the sex offender data could comprise all offenders who reside within one hundred miles of the user's address. Additionally, the user's input could comprise de-selection of missing pet data. The result in the invention is personalization and relevance of all data sources as desired.

Figure 17:
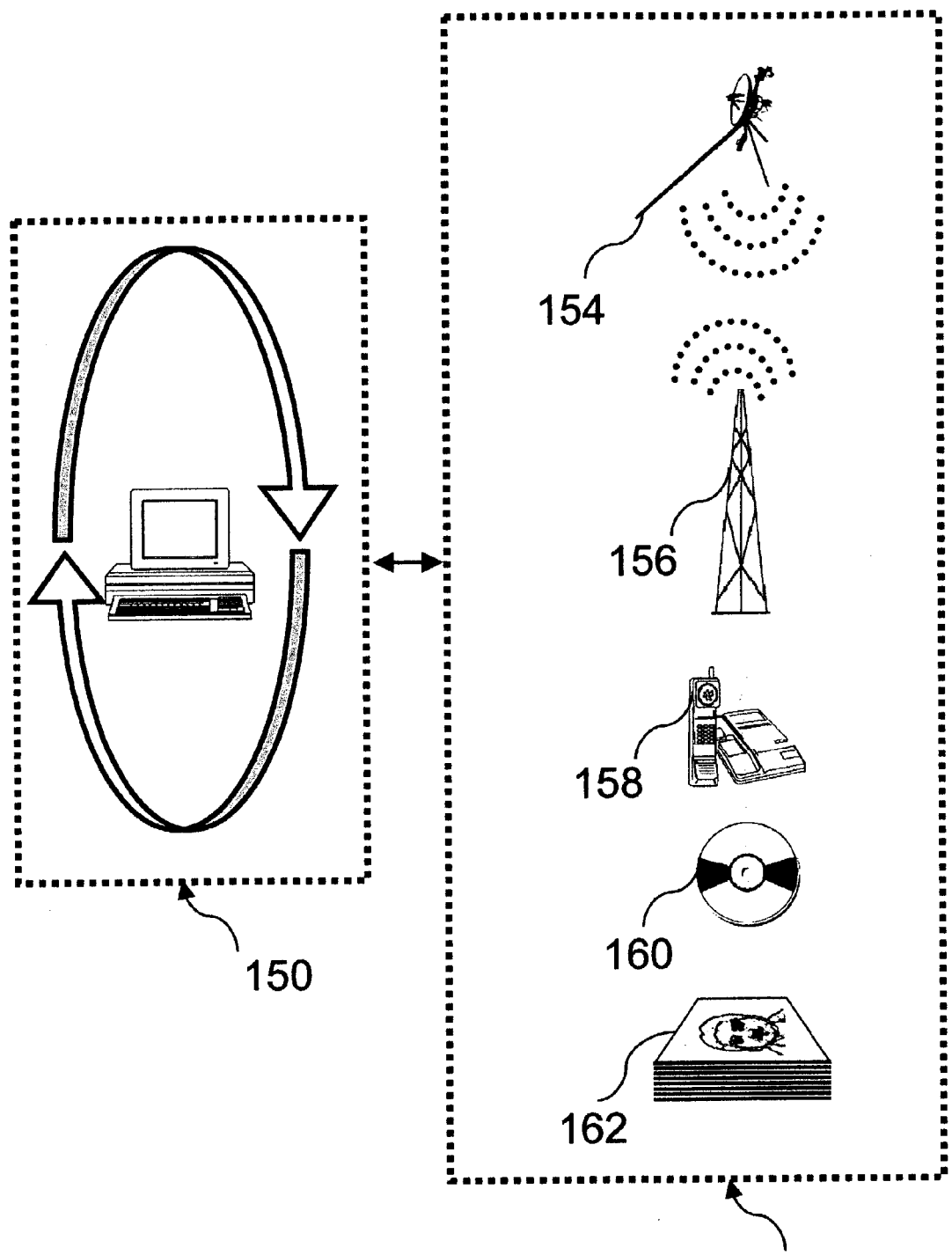
FIG. 17 illustrates a plurality of means for intermediate data integration and transfer comprising satellite transmission, tower transmission, terrestrial lines, physical storage media, and hardcopy.

There are various possibilities for intermediate means of connectivity 152. FIG. 17 illustrates a plurality of said means of connectivity to and from the user's information processing device 150 comprising satellite transmission 154, tower transmission 156, terrestrial lines 158, physical storage media 160, and hardcopy 162. A wide variety of methods and means are contemplated for data access in the invention, including, but not limited to, electromagnetic transmission, internet transmission, physical storage media, and telephone links. These varied means of connectivity comprise alternate embodiments of the systems and methods for recognition learning.

Figure 18:
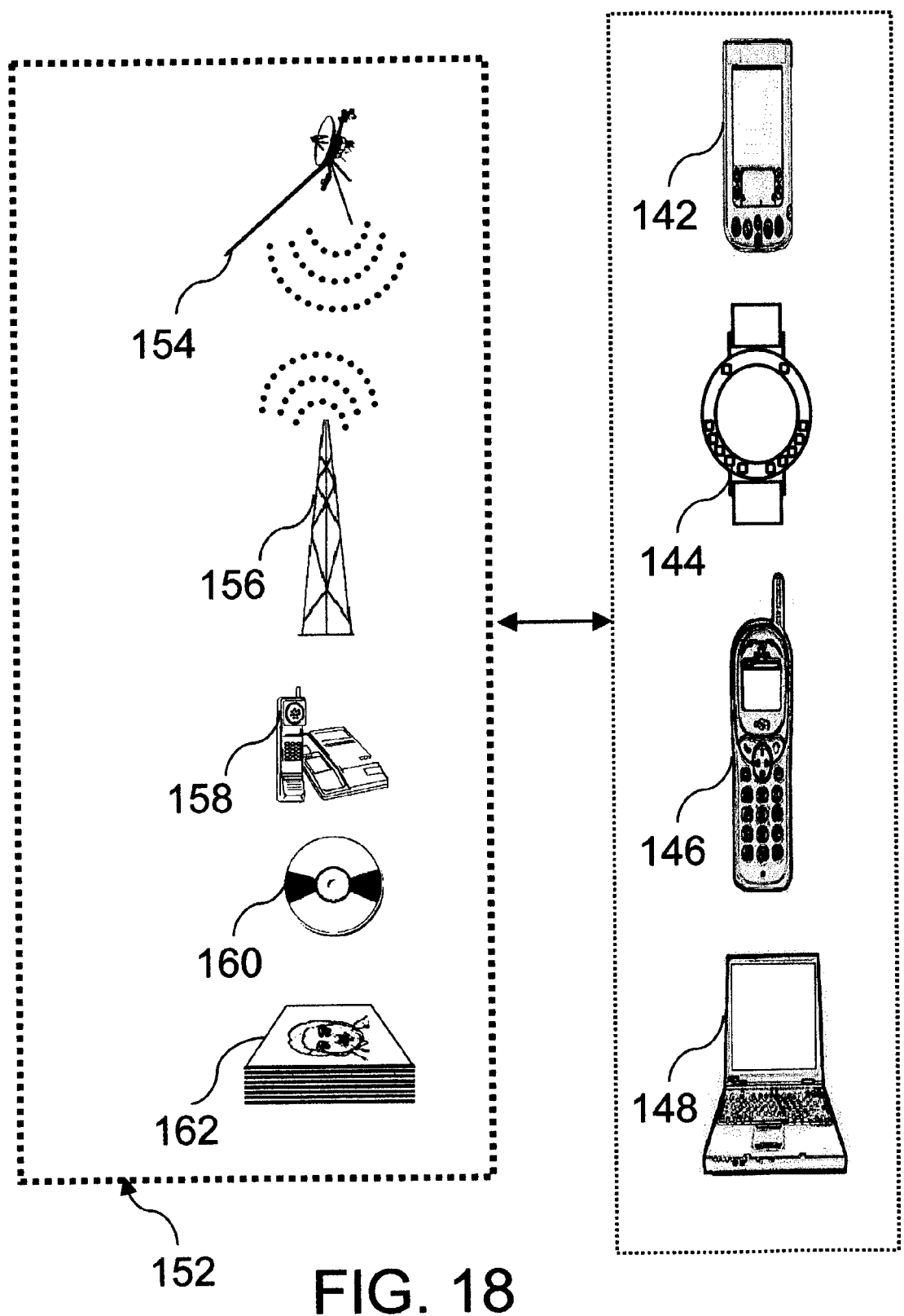
FIG. 18 illustrates said plurality of means for intermediate data integration and transfer to any information processing device comprising personal digital assistants, wristwatches, cell phones, and notebook computers.

There are a large number of possible embodiments for the invention. FIG. 18 illustrates varied means of intermediate connectivity 152 combined with a large variety of information processing devices comprising personal digital assistants 142, wristwatches 144, cell phones 146, and notebook computers 148. Portability of the systems of the invention enhances effectiveness.

Figure 19:
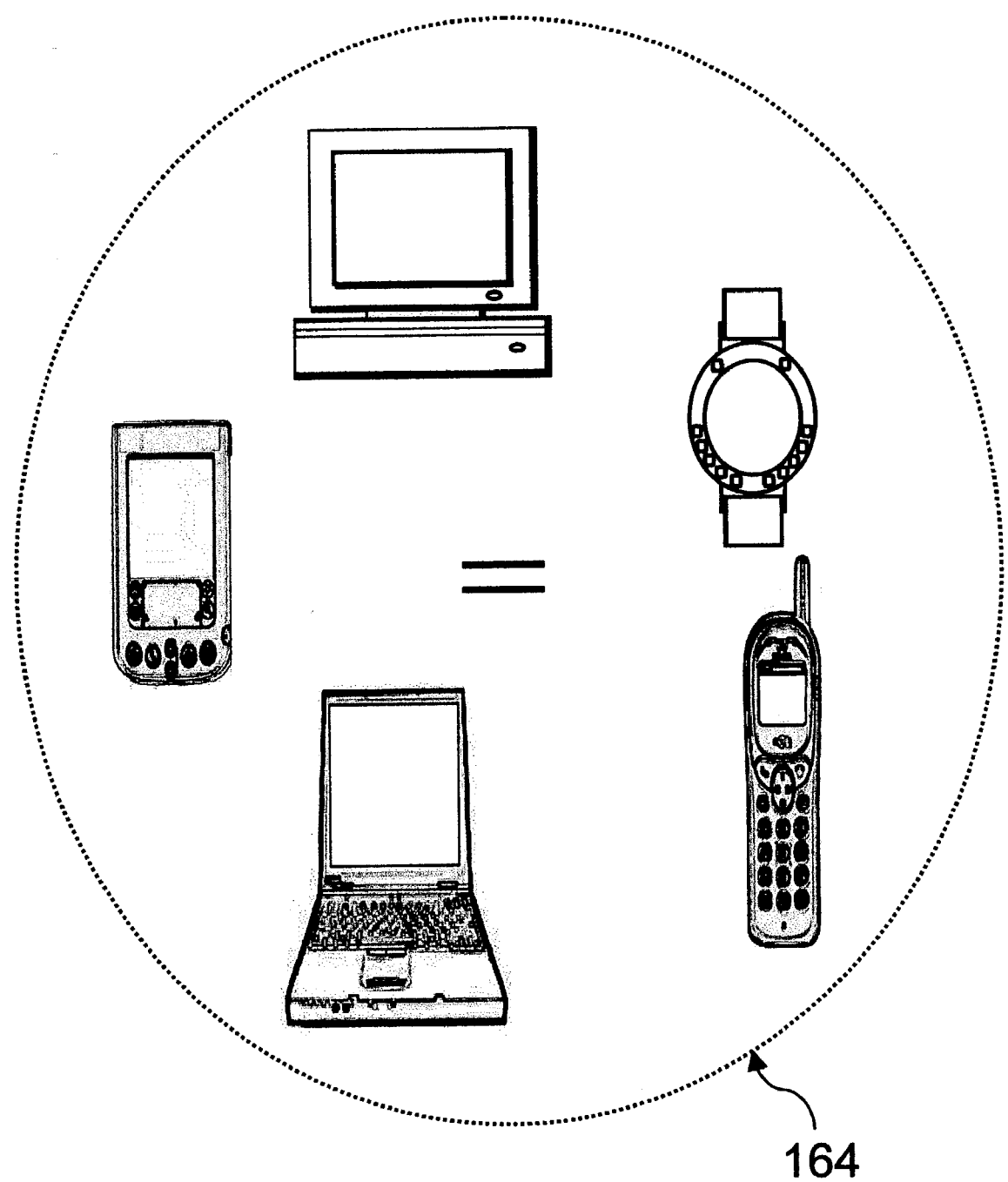
FIG. 19 portrays device equivalence in the present invention, wherein depiction of any information processing device in the figures could have any other compatible information processing device substituted.

FIG. 19 portrays device equivalence in the present invention, whereby any information processing device depicted in the figures could have any other compatible information processing device substituted and is a candidate for the methods and means of the invention. A candidate device comprises a memory able to store object data, a display operatively connected to said memory, an input means, and a processing means. The term "computer" will imply any appropriate information processing device.

Implementing Recognition Learning—FIGS. 20–27

FIGS. 20 through 33 depict implementation of the systems and methods for recognition learning. In these figures, object data has already been accessed and is residing on the user's information processing device.

Figure 20:
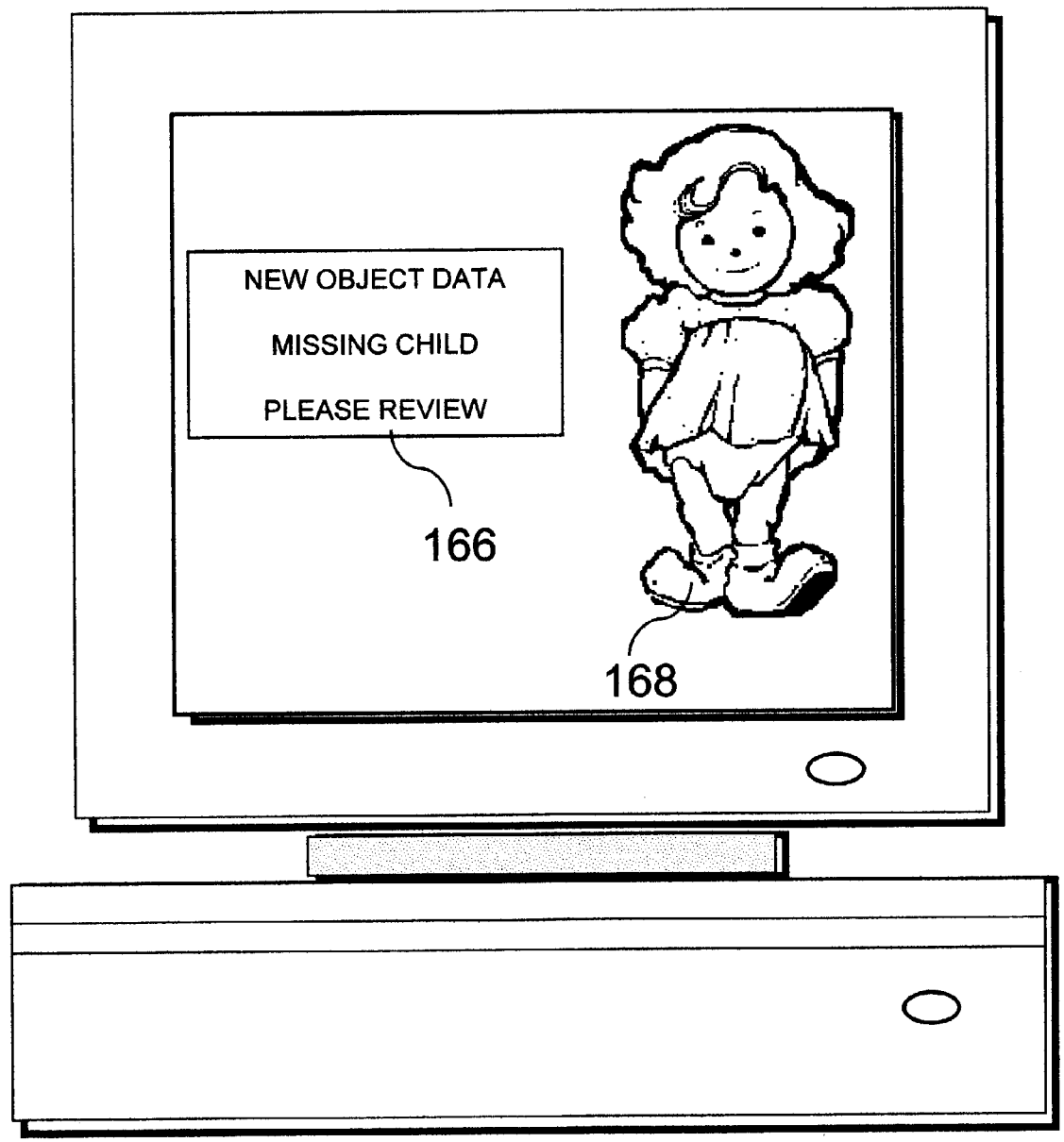
FIG. 20 illustrates a means for notification of new objects wherein the information processing device presents data to the user, a missing child in this example.

FIG. 20 illustrates a means for notification of new objects wherein the computer presents data to the user, a missing child in this example. A new object image 168 of a missing child is displayed through a new object display 166 notifying the user of the new object and some of its associated characteristic data.

Figure 21:
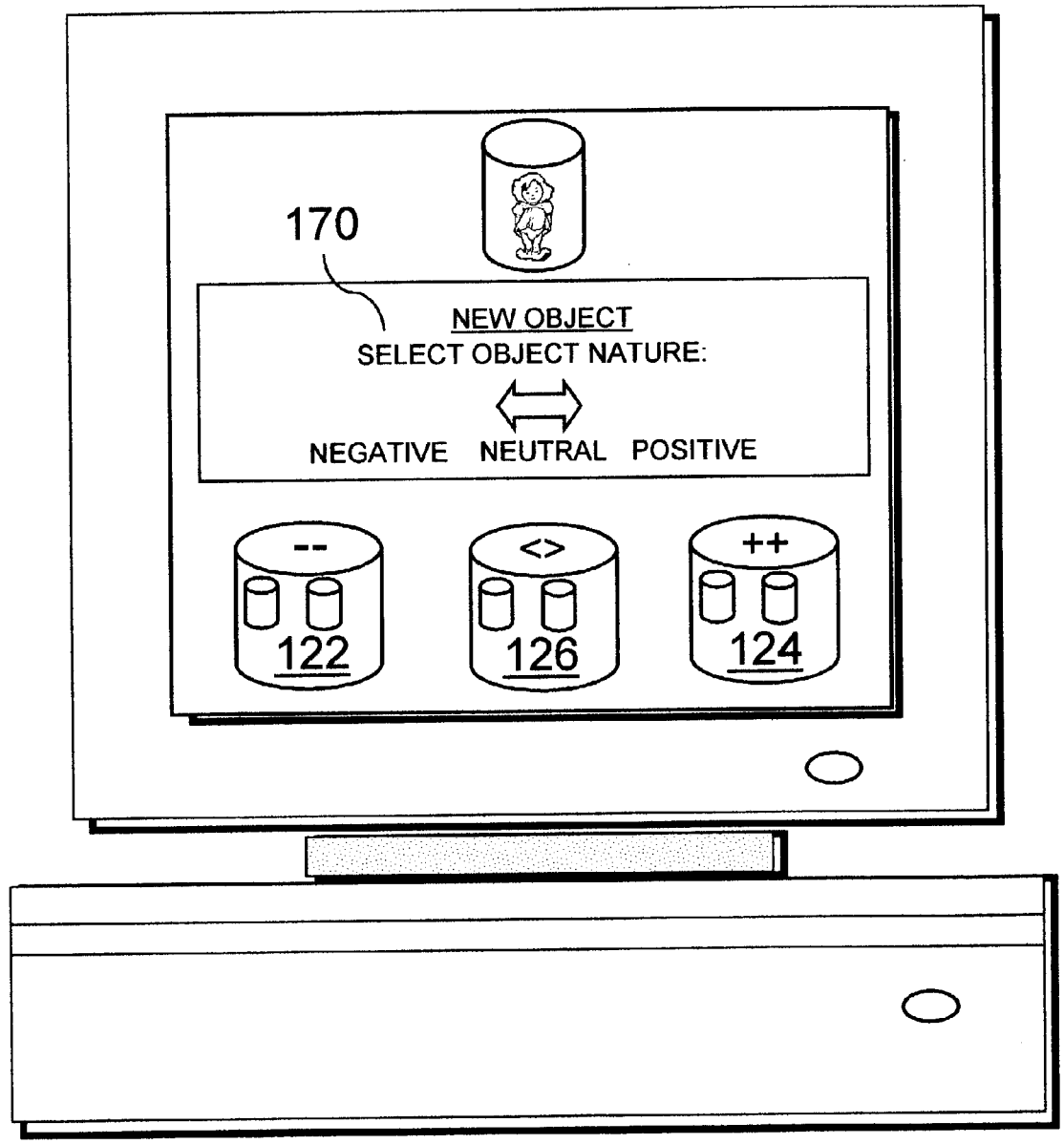
FIG. 21 illustrates a means for user selection of new object nature, comprising one of negative, neutral, and positive, wherein the information processing device prompts inputs from the user.
Figure 22:
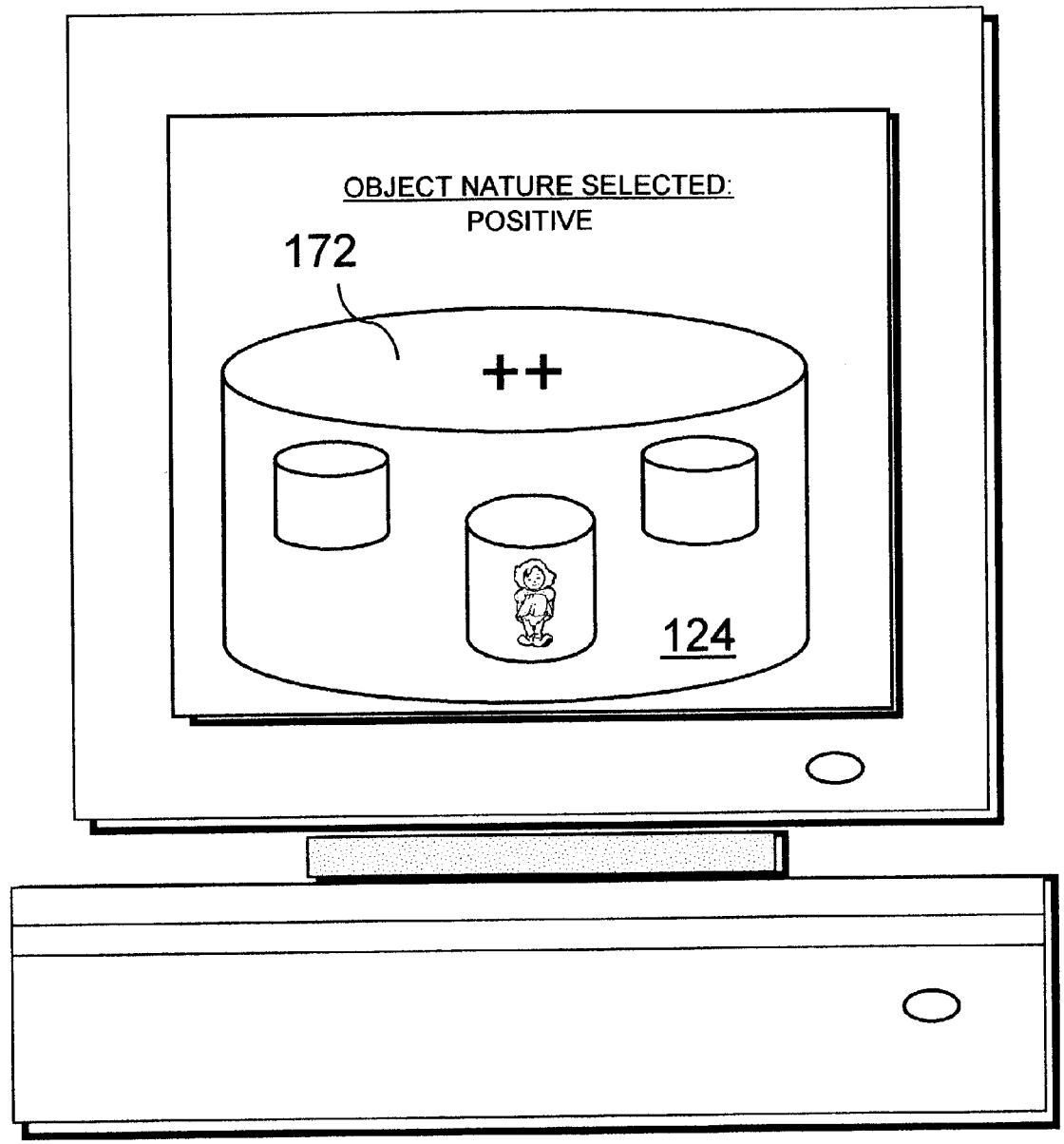
FIG. 22 illustrates further means for user selection of new object nature, in this case the missing child is selected with a positive nature.
Figure 23:
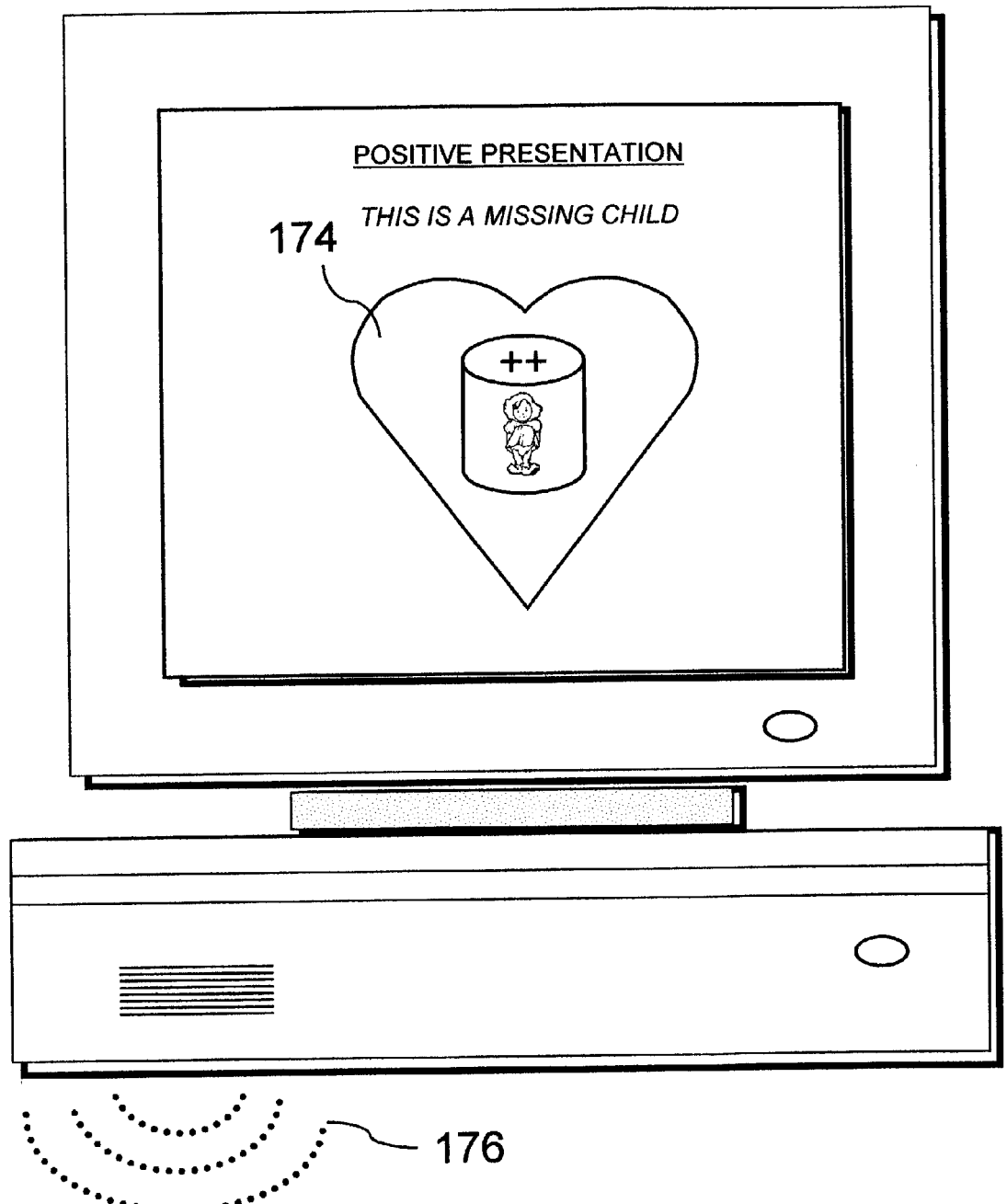
FIG. 23 illustrates the means of varied presentation of objects consistent with their nature, in this case the missing child with positive nature will be presented in a pleasant, attractive method.
Figure 24:
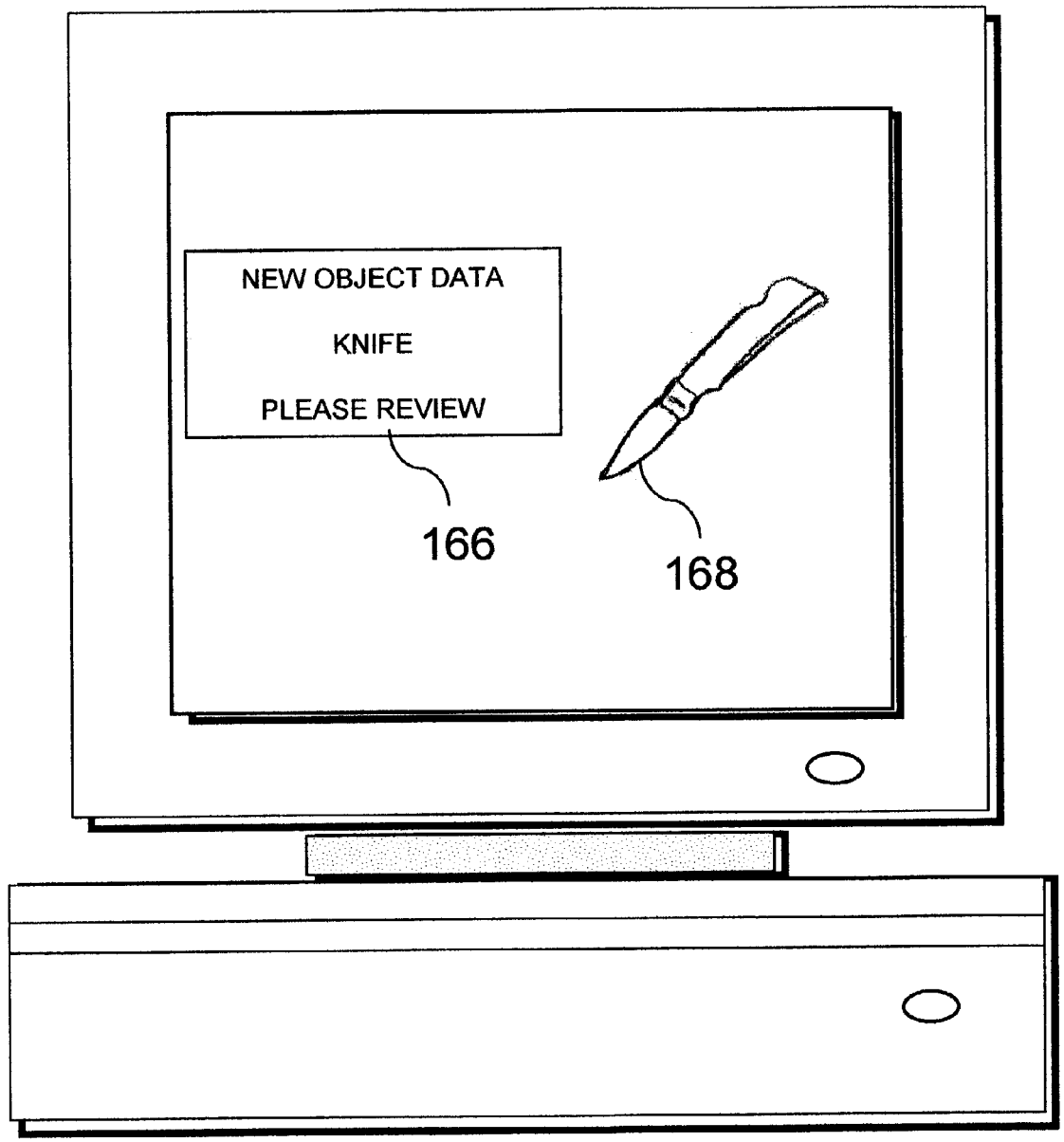
FIG. 24 illustrates further the means for notification of new objects wherein the information processing device presents data to the user, a knife in this example.
Figure 25:
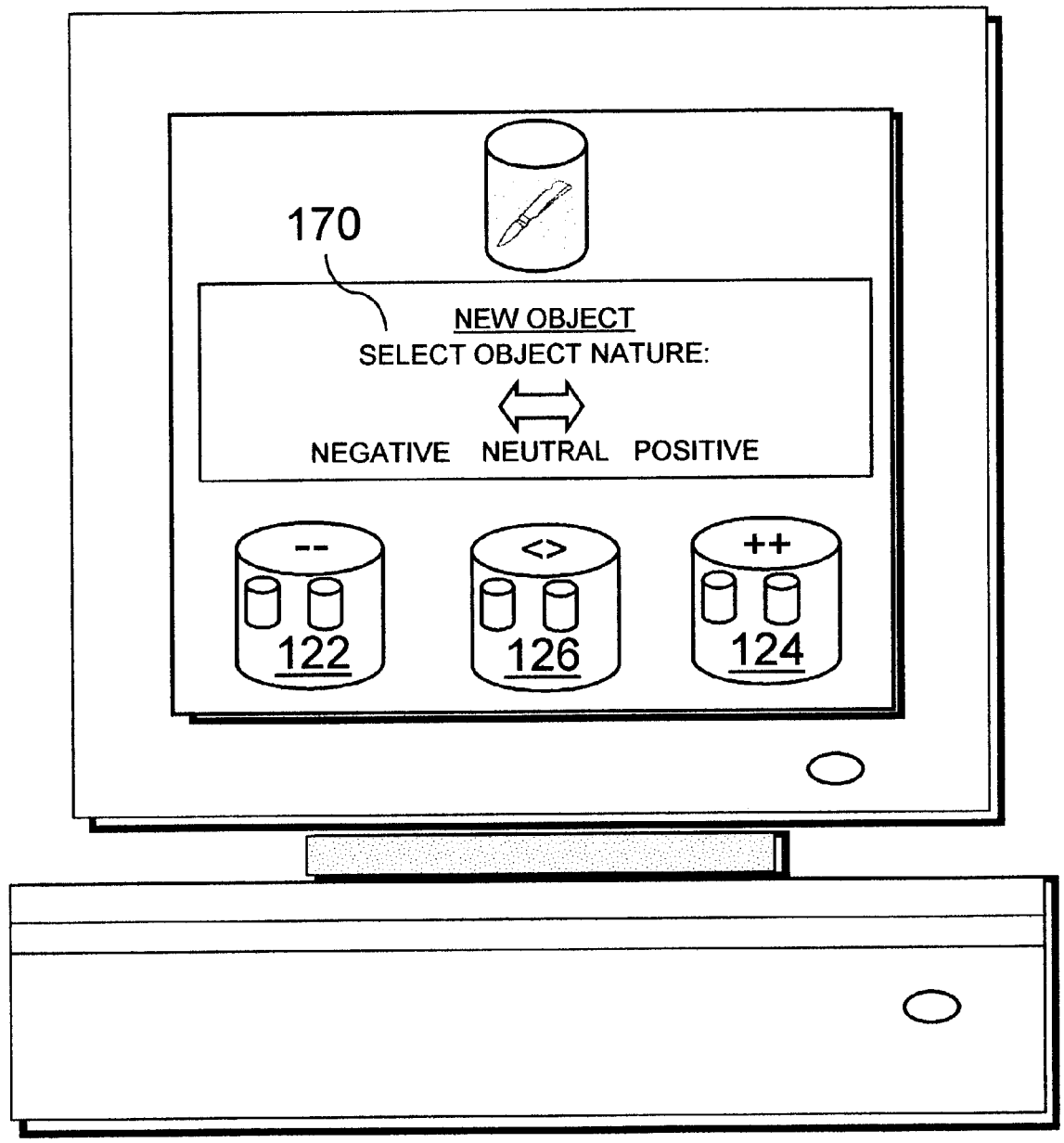
FIG. 25 illustrates further the means for user selection of new object nature, comprising one of negative, neutral, and positive, wherein the information processing device prompts inputs from the user.

FIGS. 21 through 23 illustrate the mechanics of manual user selection of object nature or nature assignment. In FIG. 21, the new object nature input prompt 170 allows the user to select object nature selected from the group consisting of negative nature 122, neutral nature 126, and positive nature 124. Essentially, the user is telling the system how to "bin" or assign object nature for this type of object.

FIG. 22 illustrates the user selecting a new positive object 172 to be placed in the positive nature object database 124. Now that this object, a missing child in this case, has been assigned a positive nature, the methods of the invention will generate positive presentation illustrated in FIG. 23. Positive object presentation 174 and associated audio presentation 176 are now implemented. The user selects and refines presentation means within the invention. By example, the user may select a blue heart graphic to be superimposed on positive objects, and corresponding pleasant audio presentation 176 of a bird singing. The systems and methods of the invention would provide a great variety of graphics and audio data for the user to select from. Subsequent figures will provide greater detail into the means of object presentation.

Figure 26:
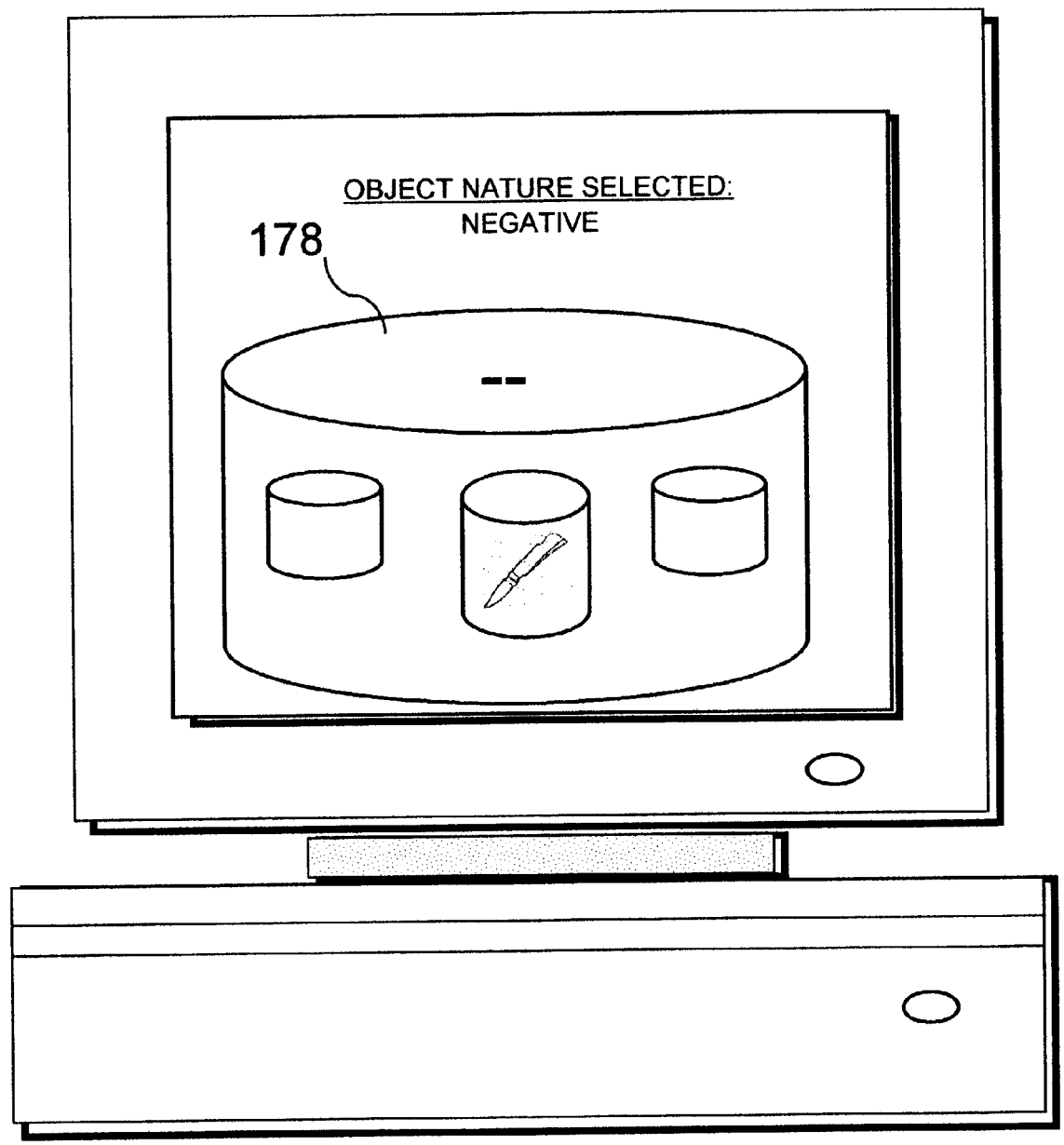
FIG. 26 illustrates further means for user selection of new object nature, in this case the knife is selected with a negative nature.
Figure 27:
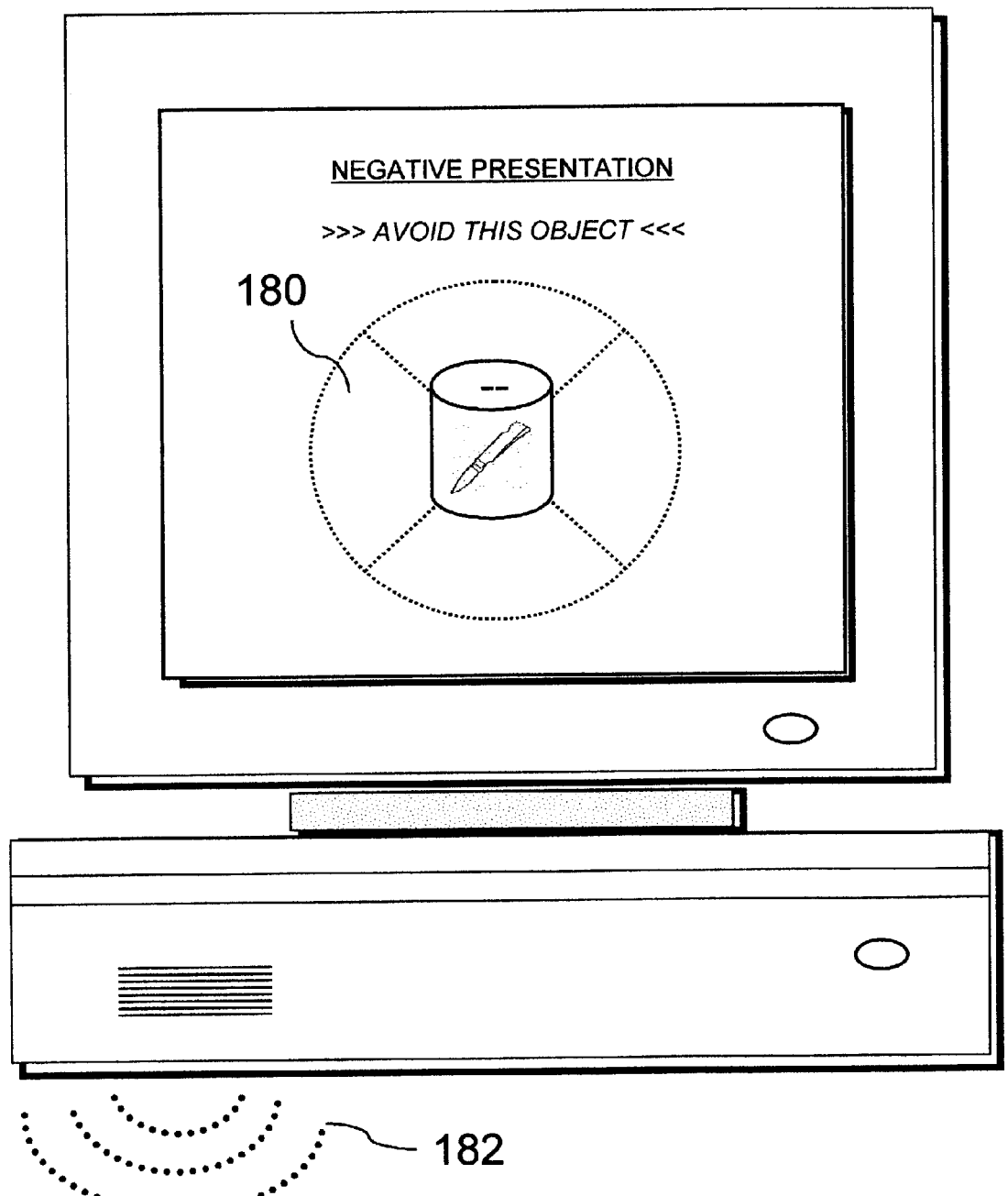
FIG. 27 illustrates the means of varied object presentation consistent with assigned nature, in this case the knife with negative nature will be presented in an unpleasant, aversive method.

FIGS. 24 through 27 illustrate similar mechanics of manual user selection of object nature or nature assignment. In these figures, the new object is a knife weapon and the user will select it as a new negative object 178 (FIG. 26). Negative object presentation 180 and associated audio presentation 182 are now implemented. As with the missing child, the user selects and refines the mechanics of negative presentation. In this example, a red "X" within a circle is superimposed over the image of the knife (FIG. 27). And if this application were written on highly-sophisticated, futuristic paper, the reader would be able to hear the audio of breaking glass 182 that the inventor selected for FIG. 27. Negative presentation may include cautionary text such as "Avoid this object" or other associated data.

Methods of the invention allow for automation of the nature assignment process for objects from know databases. By example, if the user had selected negative object nature for a sex offender, the methods of the invention would automatically assign subsequent sex offender objects as negative objects. The invention would correlate a data source or website with a previous nature assignment. If the missing child website were accessed, the invention would bin all selected object downloads based on previous user selection for a missing child. The user would not have to go through the steps depicted in FIGS. 20–27 for subsequent, similar objects. The means of data access and assignment are thereby streamlined.

Presentation for Recognition Learning—FIGS. 28–32

Data access and nature assignment are the means that culminate in means of presentation consistent with the present invention. Said presentation may comprise myriad forms with the objective of recognition learning. The figures of presentation in this application do not suffice to convey the myriad embodiments within the scope of the appended claims. Preferred embodiments of the present invention are means that are challenging, multidimensional, and at the leading edge of entertainment technology (FIG. 33).

It is envisioned that the systems and methods of the invention could be energized by the most capable of modern information processing devices and graphical generation engines. An example would be a computer generated three dimensional adventure game which the user navigates while encountering the objects of recognition learning (FIG. 33). Uploaded video and audio of objects of interest could be fused within these recognition learning "worlds."

Although FIGS. 28–33 depict a child using the invention 192, the invention can be used by any person. An infant may lack the maturity to provide input but still could benefit from certain means of presentation. Input devices 190 comprise a plurality of manual, verbal, and other devices with means of accepting input or stimuli from the user 192.

The presentation methods of the invention are designed to be entertaining with a useful outcome. The user may or may not be aware of recognition learning occurring. A child may just think he's having fun on the computer but is concomitantly learning information of value. That child may recall the image of the missing child and tell his parents he "saw the girl from the computer game today." The child may have a learned aversion to guns, which would certainly be a useful outcome in modern schools. A woman who used the invention could recognize the voice of a sexual predator and thereby avoid him if he is too friendly. The possibilities seem endless.

The means of the invention allow for a "gateway" enhancement of presentation. The invention could be a "gateway" or precursor to other computer applications. By example, parents could select the gateway presentation option wherein the invention would operate prior to logging on to the internet, using another application, or after booting the computer up. A child might be required to use the invention or "play the game" for a specified time prior to surfing the internet. This would ensure that children wouldn't spend all their time at the computer in idle pursuits, chat rooms, questionable websites, etc.

Figure 28:
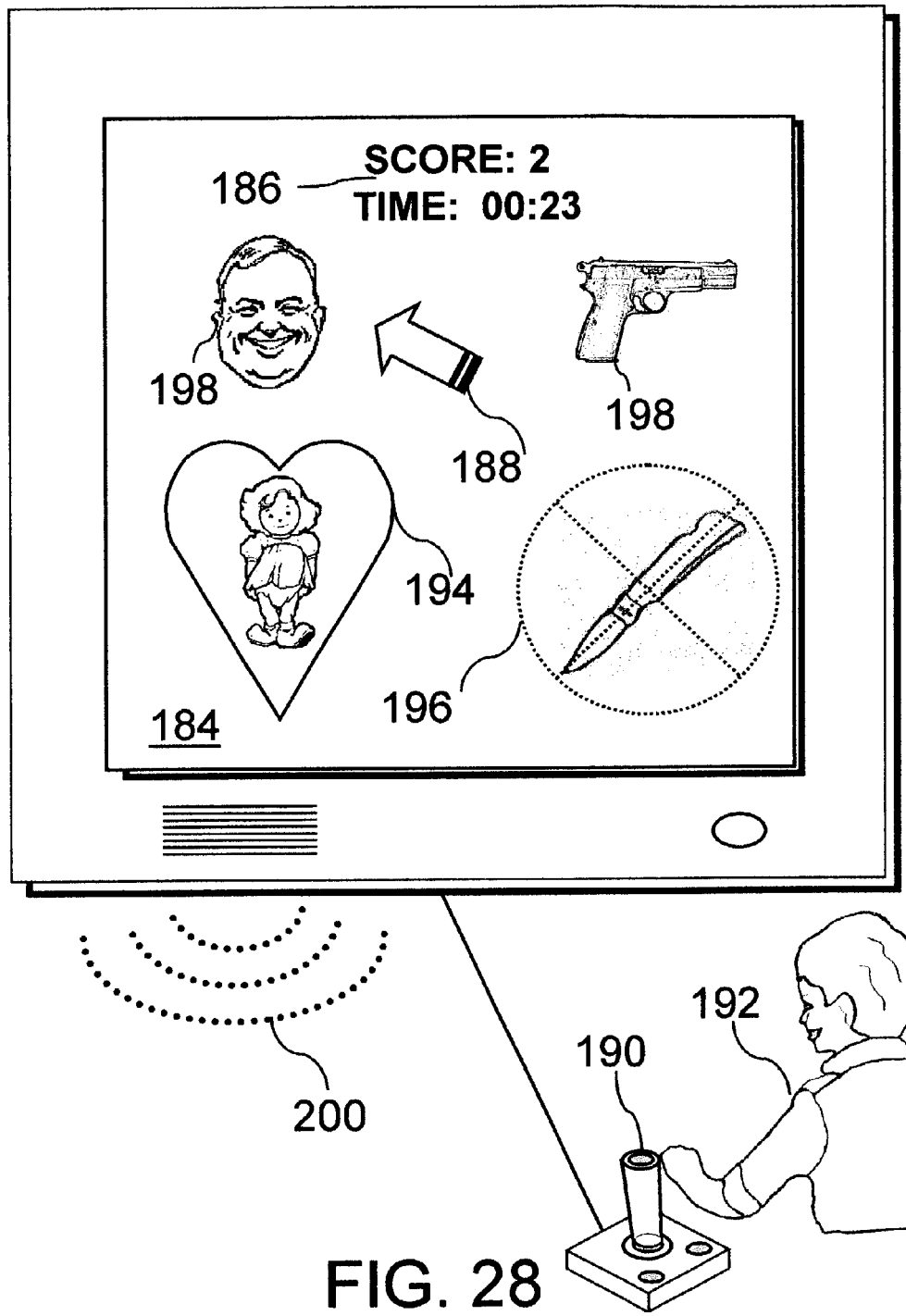
FIG. 28 is a depiction of one embodiment comprising presentation of a plurality of objects while combining elements of entertainment and rehearsal, wherein the user must designate object nature appropriately.

FIG. 28 is a depiction of one embodiment comprising interactive presentation 184 of a plurality of objects 194, 196, 198 wherein the user must designate object nature appropriately in accordance with systems and methods consistent with the invention. The missing child has been given a correct positive nature designation 194 by the user 192 with the input device 190. The knife has been given a correct negative nature designation 196 by the user. The displayed score and time enhance the means of presentation. The computer would provide feedback in the presentation if the user incorrectly designated object nature with a reduction in the displayed score and corresponding visual and auditory data 200. The user pointing icon 188 receives input from the input device 190. Essentially, the user would move the pointing icon and designate appropriate object nature using the input device.

Figure 29:
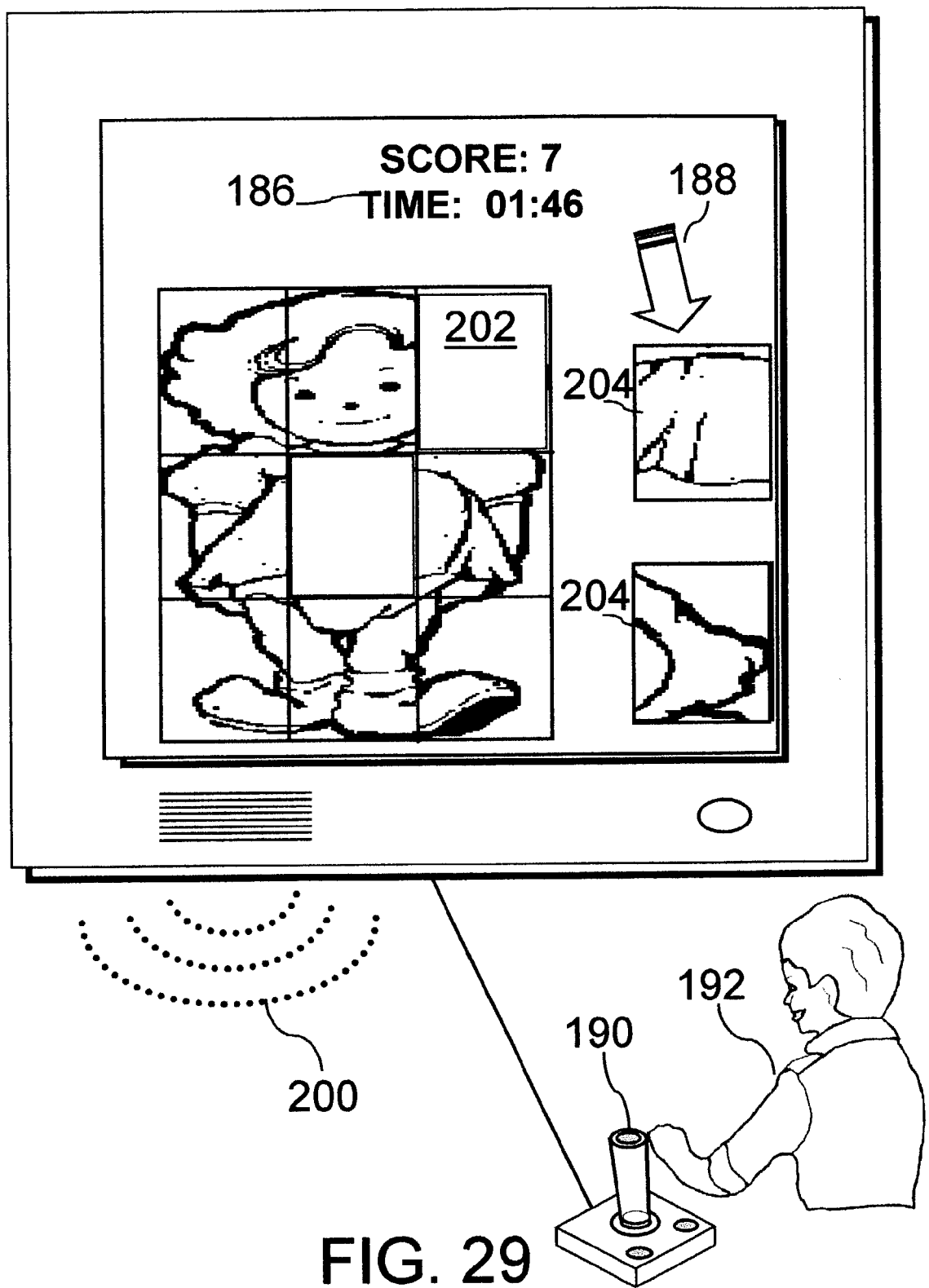
FIG. 29 is a depiction of a second embodiment comprising presentation of a selected object while combining elements of entertainment and rehearsal, wherein the user must reconstruct the image of the object.

FIG. 29 is a depiction of a second embodiment comprising interactive presentation. The user must reconstruct the partitioned object image 202 in accordance with systems and methods consistent with the invention. Separated image pieces 204 will require the user to select them with the user pointing icon 188 and move them to the appropriate region on the incomplete image. As with the previous embodiment, the computer would provide feedback if the user incorrectly placed the separated image pieces 204 by means of the displayed score and corresponding visual and auditory data 200

Figure 30:
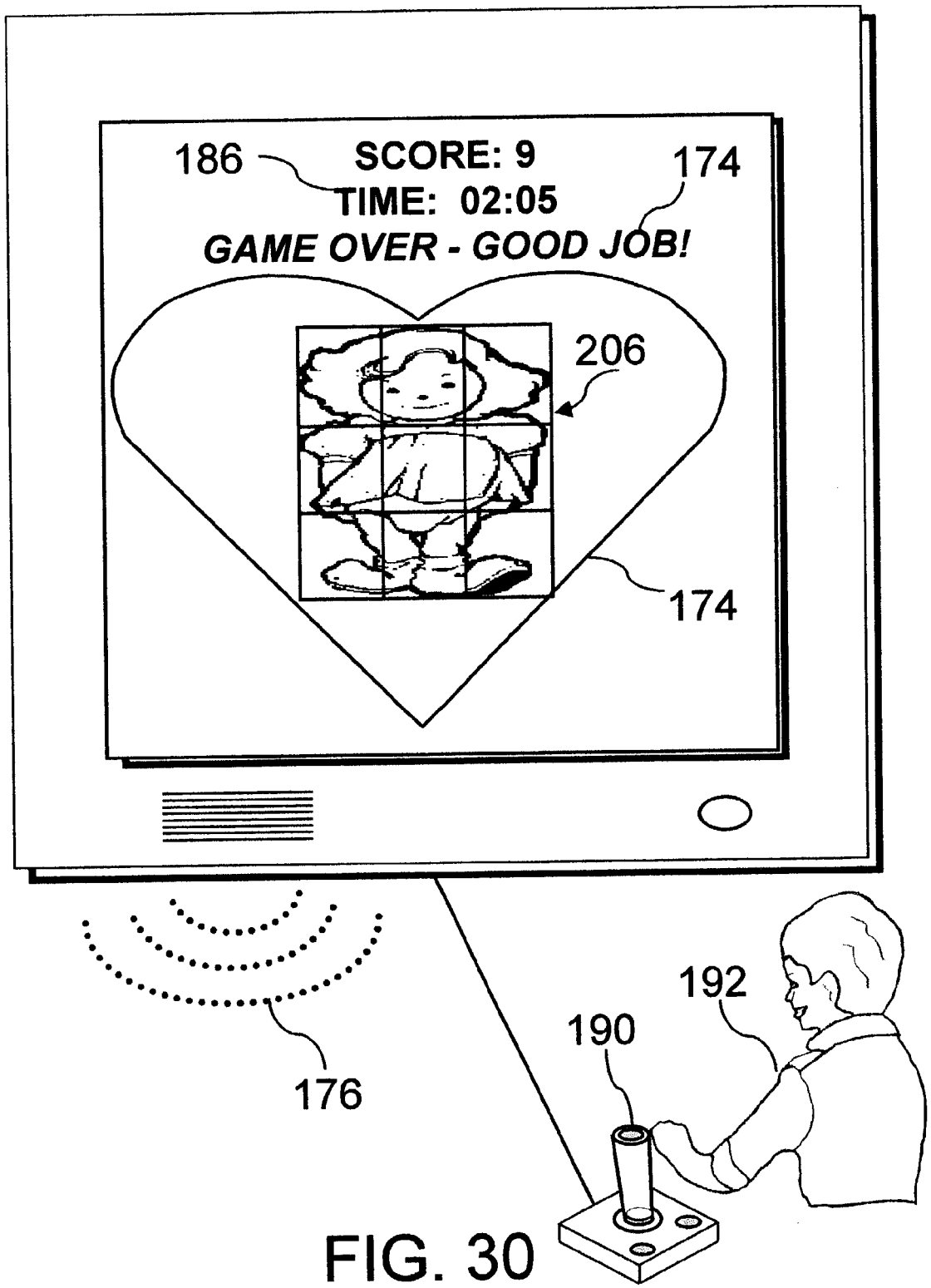
FIG. 30 is a further depiction of the second embodiment wherein the device presents reinforcing visual and auditory data correlated to positive object nature when the user has successfully reconstructed the image.

FIG. 30 illustrates successful completion 206 of the object puzzle from FIG. 29. Positive object presentation 174, 176 accompanies the completion of the game and the score and time 186 reflect that all nine separate pieces have been replaced and the game took two minutes and five seconds. In completing the game, the means of the invention have effected recognition learning. Positive nature assignment has reinforced the underlying objective of familiarity and potential acquisition of the missing child in real life.

Figure 31:
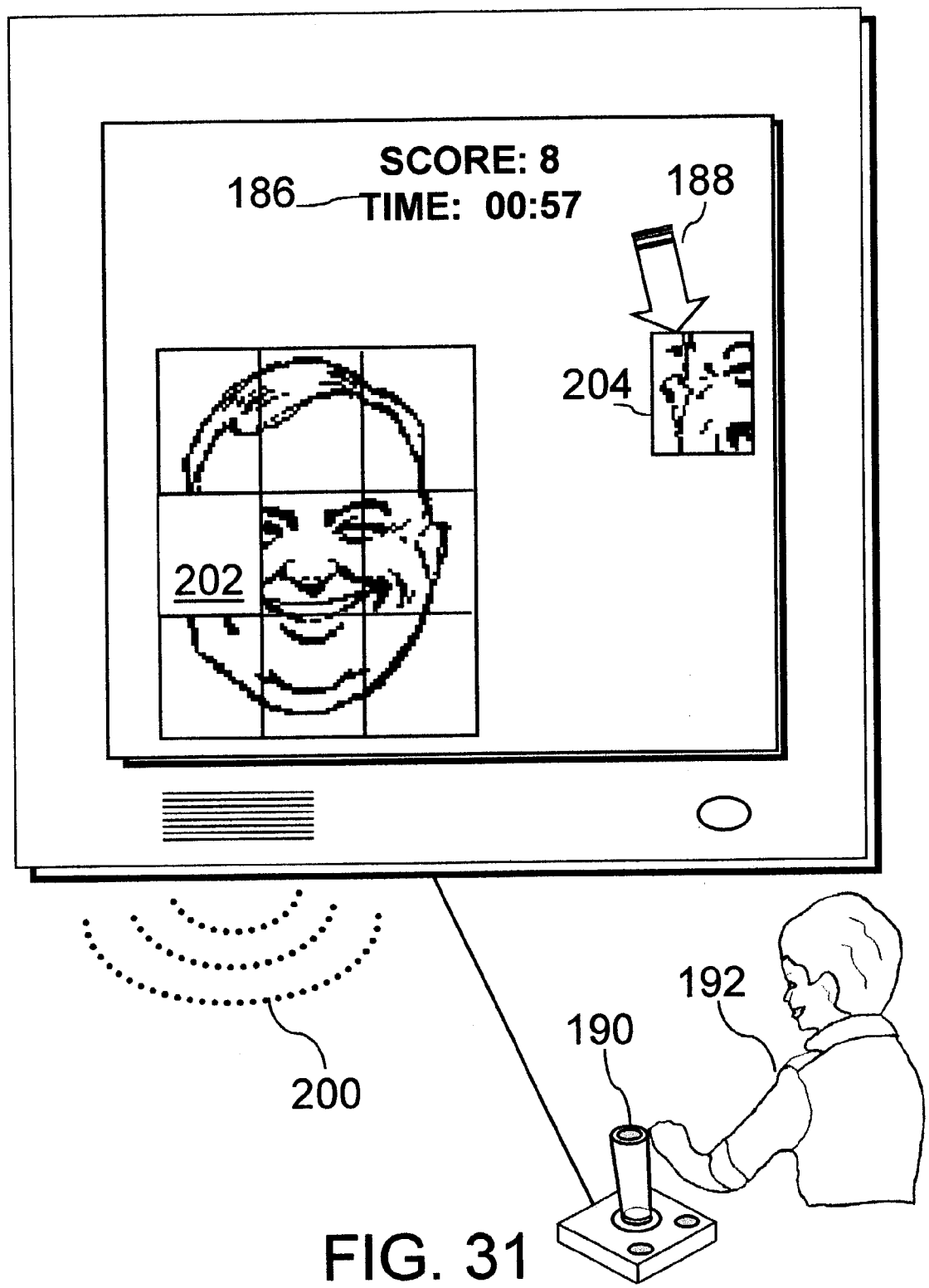
FIG. 31 is an additional depiction of the second embodiment comprising device presentation of a selected object with a negative nature requiring user input.
Figure 32:
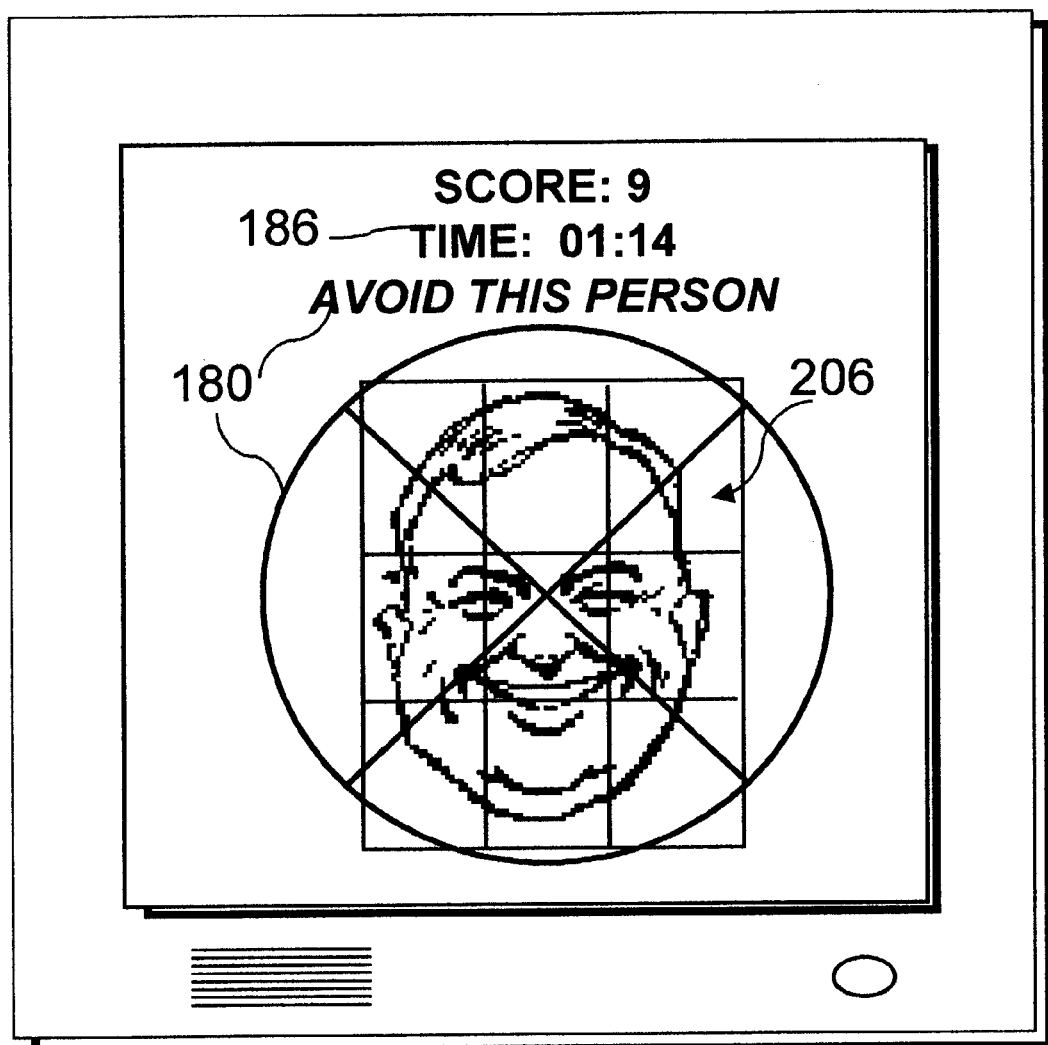
FIG. 32 is a further depiction of the second embodiment wherein the device presents aversive and cautionary visual and auditory data correlated to negative object nature.
Figure 32:
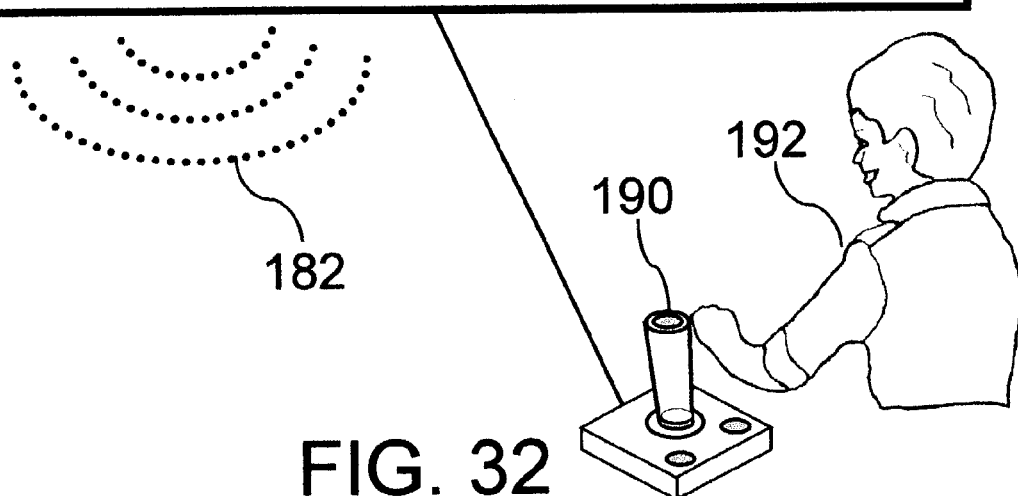

FIGS. 31 and 32 illustrate the second embodiment of the invention with a negative nature object. Again, the user must reconstruct the object image while being timed. Upon successful completion 206 of the object puzzle (FIG. 32), negative object presentation 180, 182 accompanies the completion of the game and the score and time 186 reflect that all nine separate pieces have been replaced in one minutes and fourteen seconds. The presentation comprises additional cautionary, aversive elements such as an "X" graphic superimposed over the image, advisory text, and audio samples and advisories.

FIG. 33 illustrates an alternative embodiment comprising a game apparatus 208 wherein users 192 rehearse object data presentation 210 to effect game advancement. The object card deck 212 comprises a plurality of hardcopy data and images. The user could recall object data or nature 214 in the game. The same data sources illustrated in FIGS. 2–10 would provide candidate objects for the game apparatus. FIGS. 17–18 illustrate the potential invention embodiment wherein hard copy 162 is used for intermediate data transfer. This alternative embodiment provides a means of achieving recognition learning consistent with the invention without reliance on information processing devices. For people who cannot afford a device like a computer or a personal digital assistant, the game apparatus provides a means of achieving the invention's objectives.

The game apparatus could be offered with a generic set of object cards. If the user chose, she could subscribe with the vendor to provide relevant object cards, such as sex offenders residing within a specified distance of her residence and others. Whenever the user desired, the vendor could send new, current object cards. This feature would keep the object data current as well as preventing boredom with the existing object cards.

Figure 34:
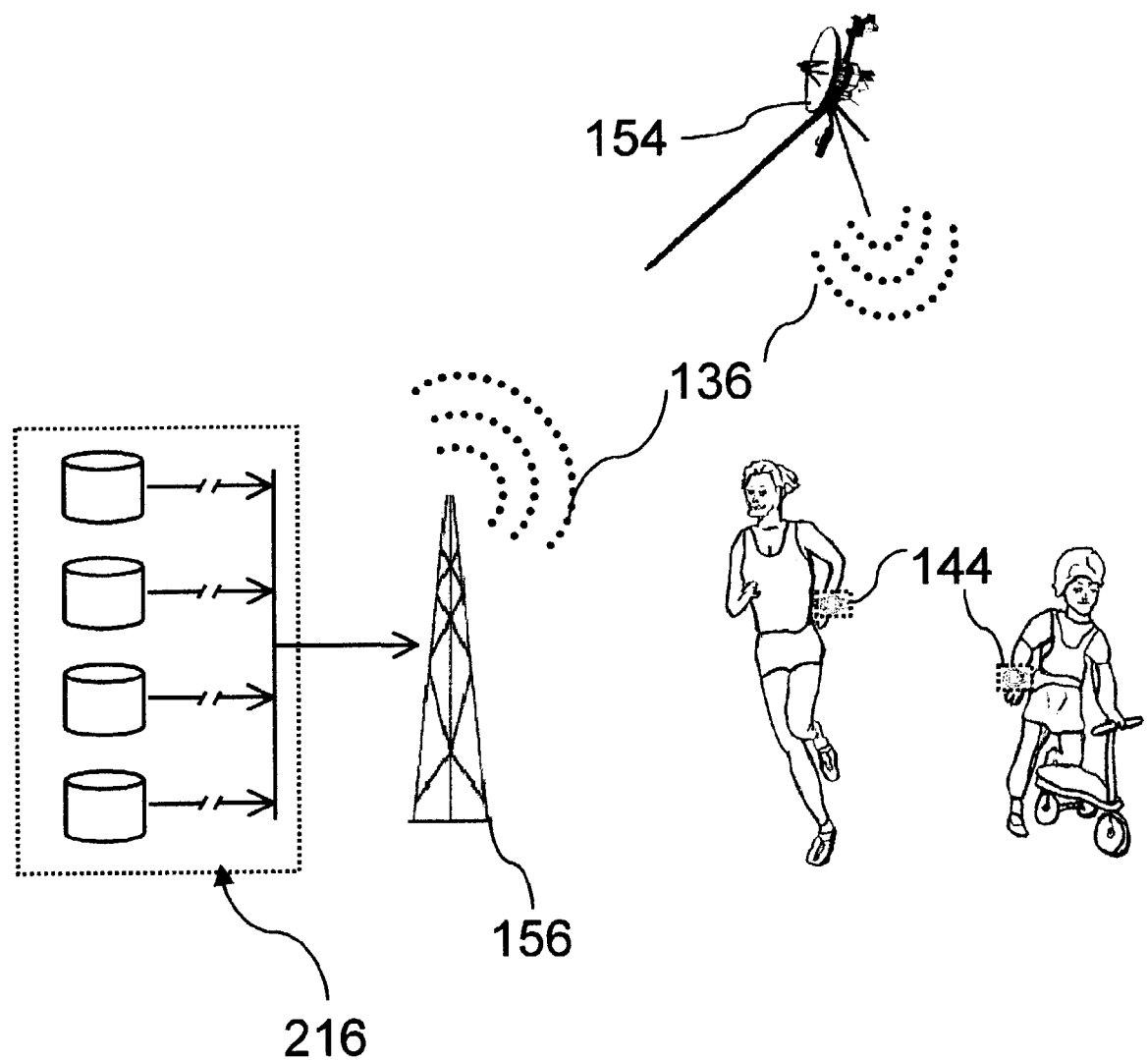
FIG. 34 illustrates the preferred embodiment comprising an integrated, comprehensive object data source transferred through appropriate means of transmission directly into portable information processing devices.

Preferred Embodiment—FIG. 34

FIG. 34 illustrates a preferred embodiment of the invention comprising an integrated, comprehensive object data source 216 transferred through wireless means of transmission 156, 136, 154 directly into portable information processing devices 144. The portable information processing device on one's person would maintain wireless contact with data sources. These data sources would be automatically accessed to keep object data current. The systems and methods of the invention comprising access, assignment, and presentation would all be achieved. The object data could be reviewed and the means of presentation available for enjoyment and learning at any time. If a person were waiting or idle, the methods of the invention would be available. This embodiment of the invention provides many features: affordable, automatic, novel, portable, timely, "pull" data, available, and reliable.

Operation of the Preferred Embodiment—FIGS. 35–39

Figure 35:
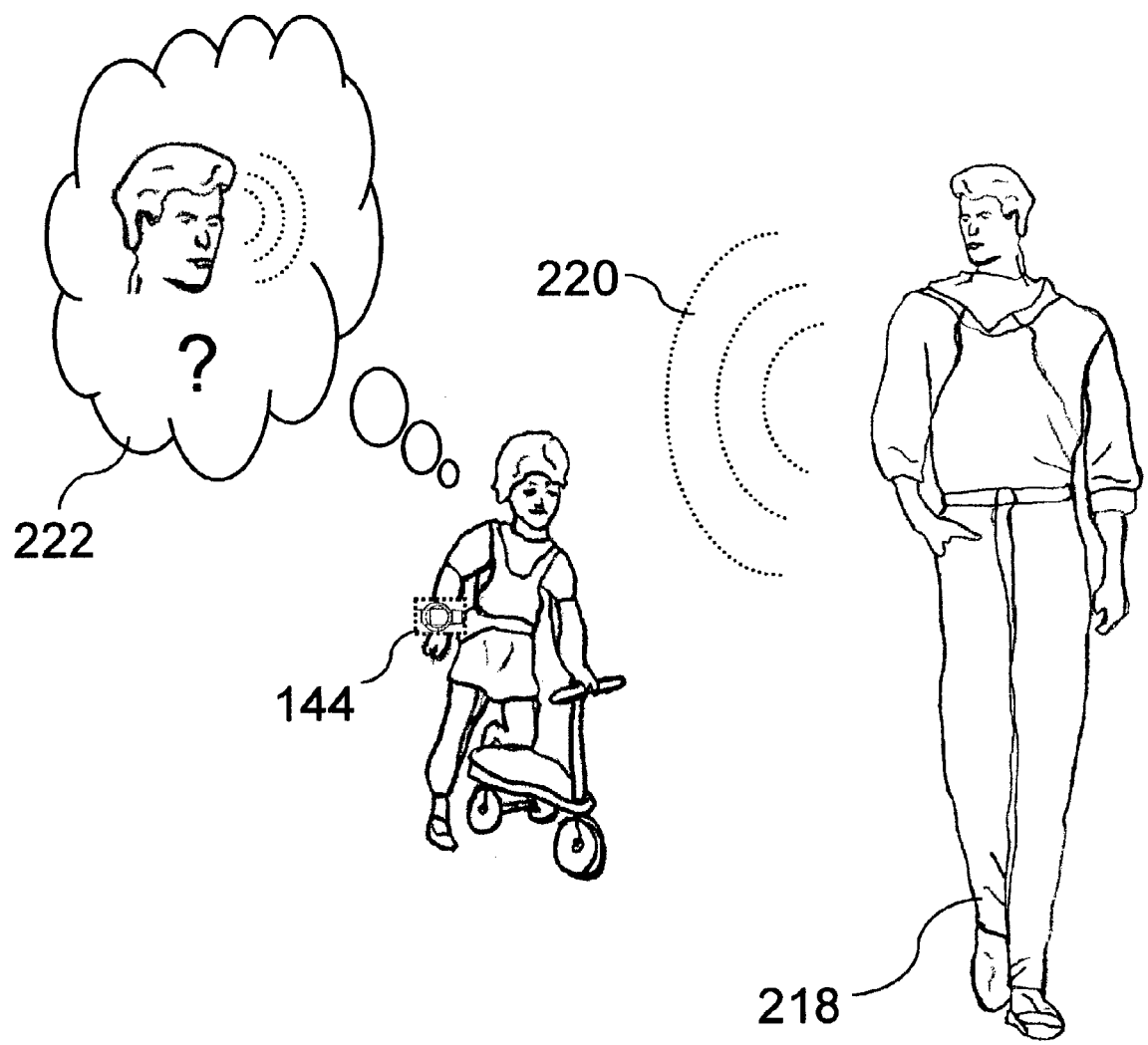
FIG. 35 illustrates the invention in practice, whereby a user potentially recognizes a real world negative nature object.

FIG. 35 illustrates the invention in operation, wherein a child observes an environmental object 218 and its auditory characteristics 220, then mentally compares 222 the environmental object to learned objects from the invention. This process of mental comparison to effect recognition may or may not be at a conscious level. Most people, when they recognize someone, do not process the recognition in the conscious mind. The portable information processing device 144 is available for confirmation of recognition if needed.

Figure 36:
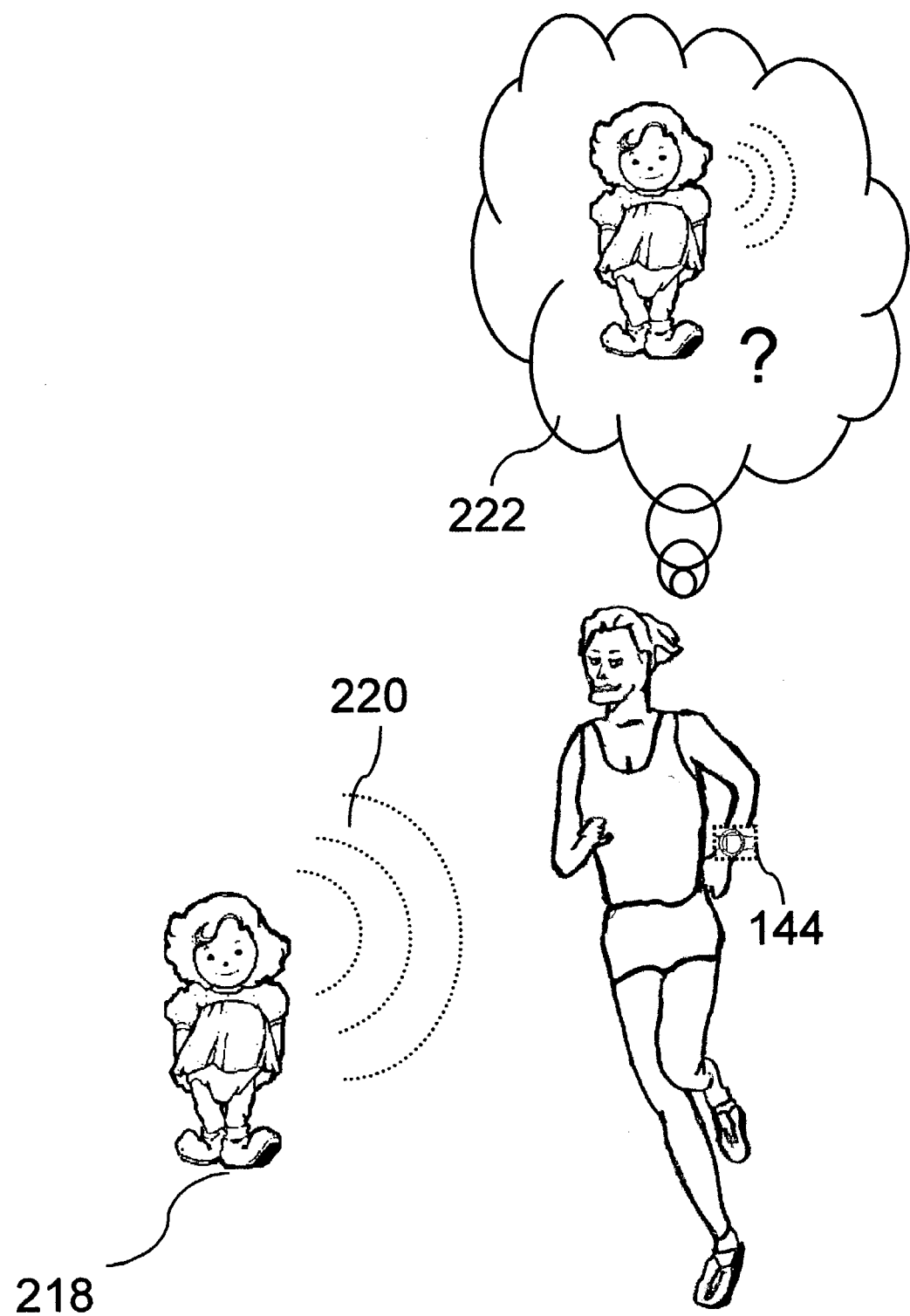
FIG. 36 illustrates the invention in practice, whereby a user potentially recognizes a real world positive nature object.

FIG. 36 further illustrates the operation of the invention. A woman observes an environmental object 218 and its auditory characteristics 220, then mentally compares 222 the environmental object to learned objects from the invention. The woman sees a child and wonders if she is the missing child that the systems and methods of the invention have presented to her. Is the learned recognition correct?

Figure 37:
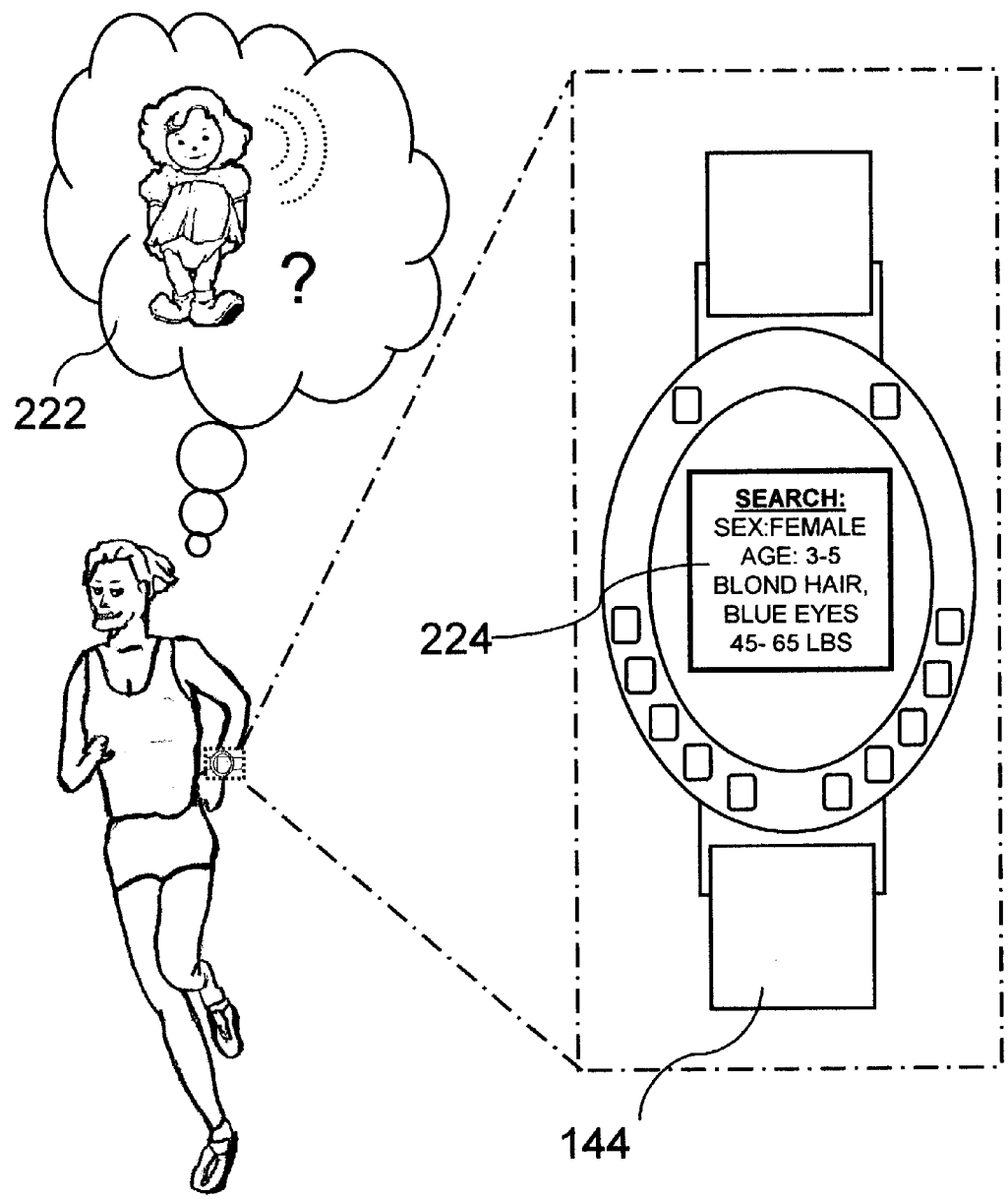
FIG. 37 further illustrates the invention in practice, whereby a user enters search criteria into her information processing device.

FIG. 37 illustrates the woman entering search criteria 224 into her information processing device 144, in accordance with systems and methods consistent with the invention. The search criteria 224 are a plurality of user selected characteristics of the observed object. In this example, the woman has observed a child and entered characteristics for a female, aged 3–5 years, blond hair, blue eyes, and 45–65 pounds. The device 144 has means of searching and selecting objects and associated data that match the entered search criteria.

Figure 38:
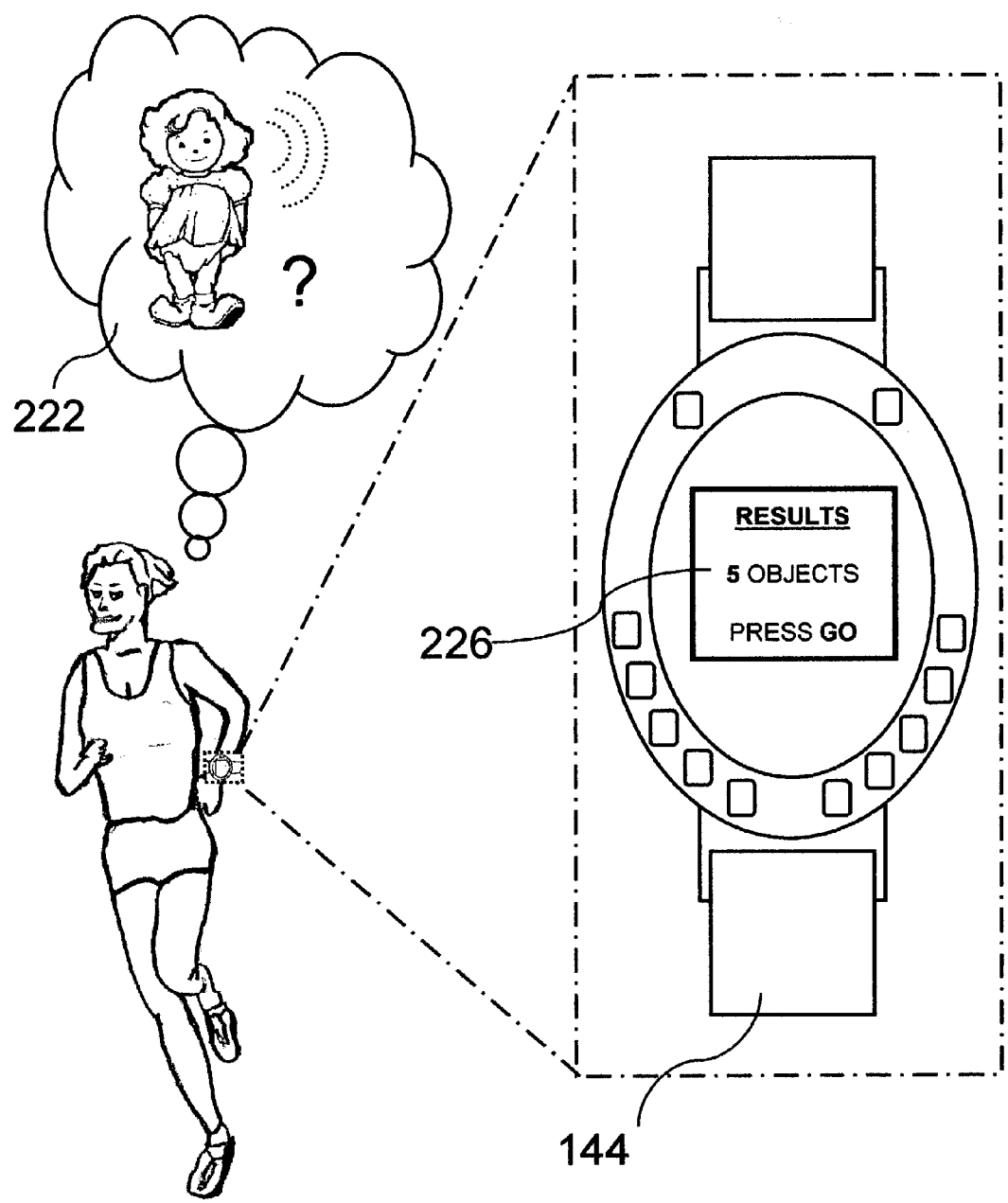
FIG. 38 portrays the possible results of the user search of object data on her information processing device.

FIG. 38 portrays possible results of the woman's search. The search results summary display 226 provides a means of display for objects that have met the search criteria and have characteristics within the parameters entered by the user. In this example, the display 226 shows that 5 objects in its database matched criteria and are potential matches for the observed object. The display 226 prompts the user to provide an input for review of the potential matches.

Figure 39:
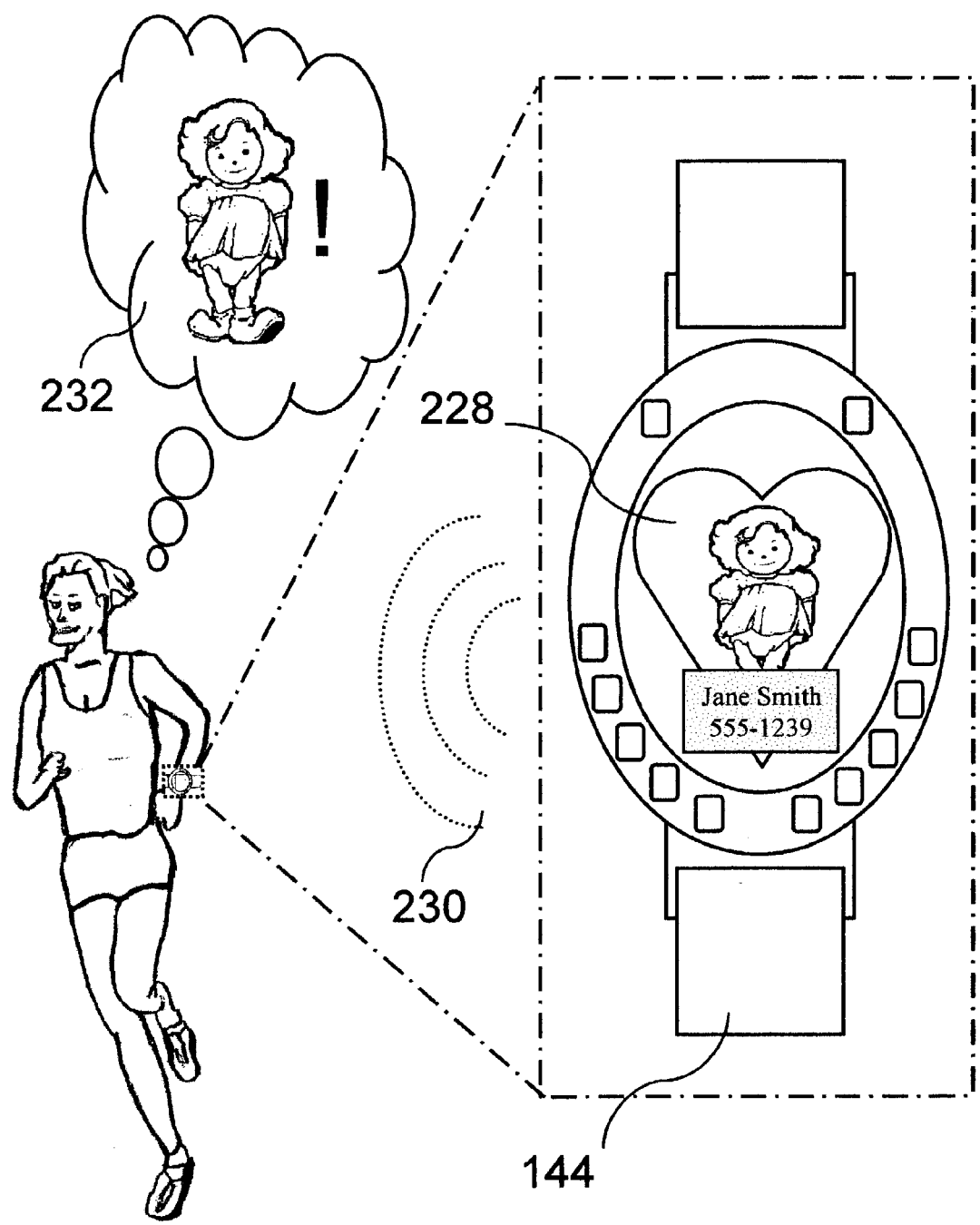
FIG. 39 portrays one fruition of the systems and methods of recognition learning wherein user recognition combined with data search and presentation on the information processing device have achieved identification of a missing child.

FIG. 39 illustrates one fruition of the systems and methods of recognition learning. User recognition combined with data search and presentation on the information processing device 144 have achieved identification of a missing child 232. The object data display 228 and object audio sample 230 provide means of direct comparison of the environmental object to stored data within the device. Additionally, the display 228 has name and contact information for proper authorities. In this example, the woman may simply ask the girl what her name is and call the proper people. A socially useful result has occurred.

Figure 40:
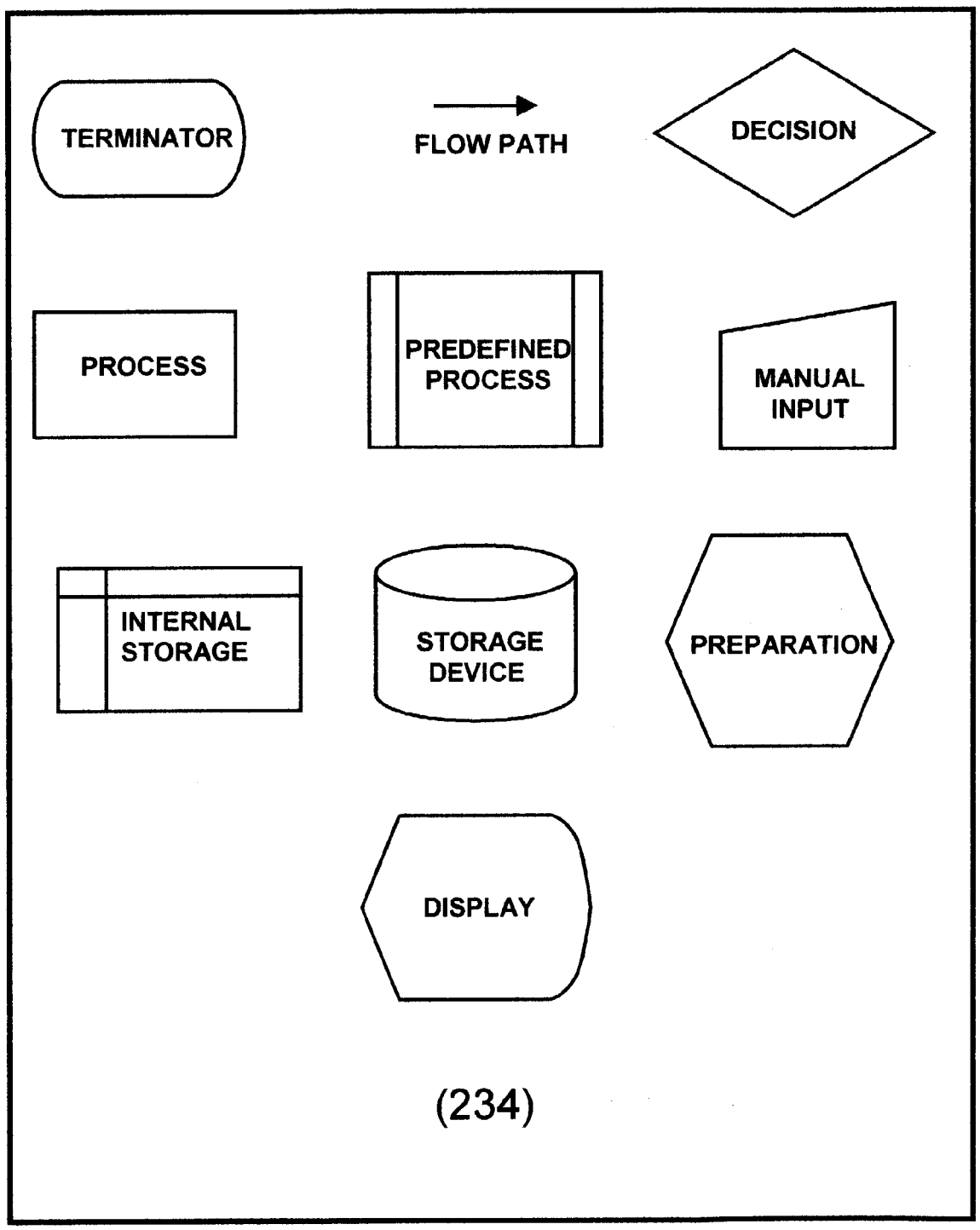
FIG. 40 illustrates the legend for subsequent flowcharts.
Figure 41:
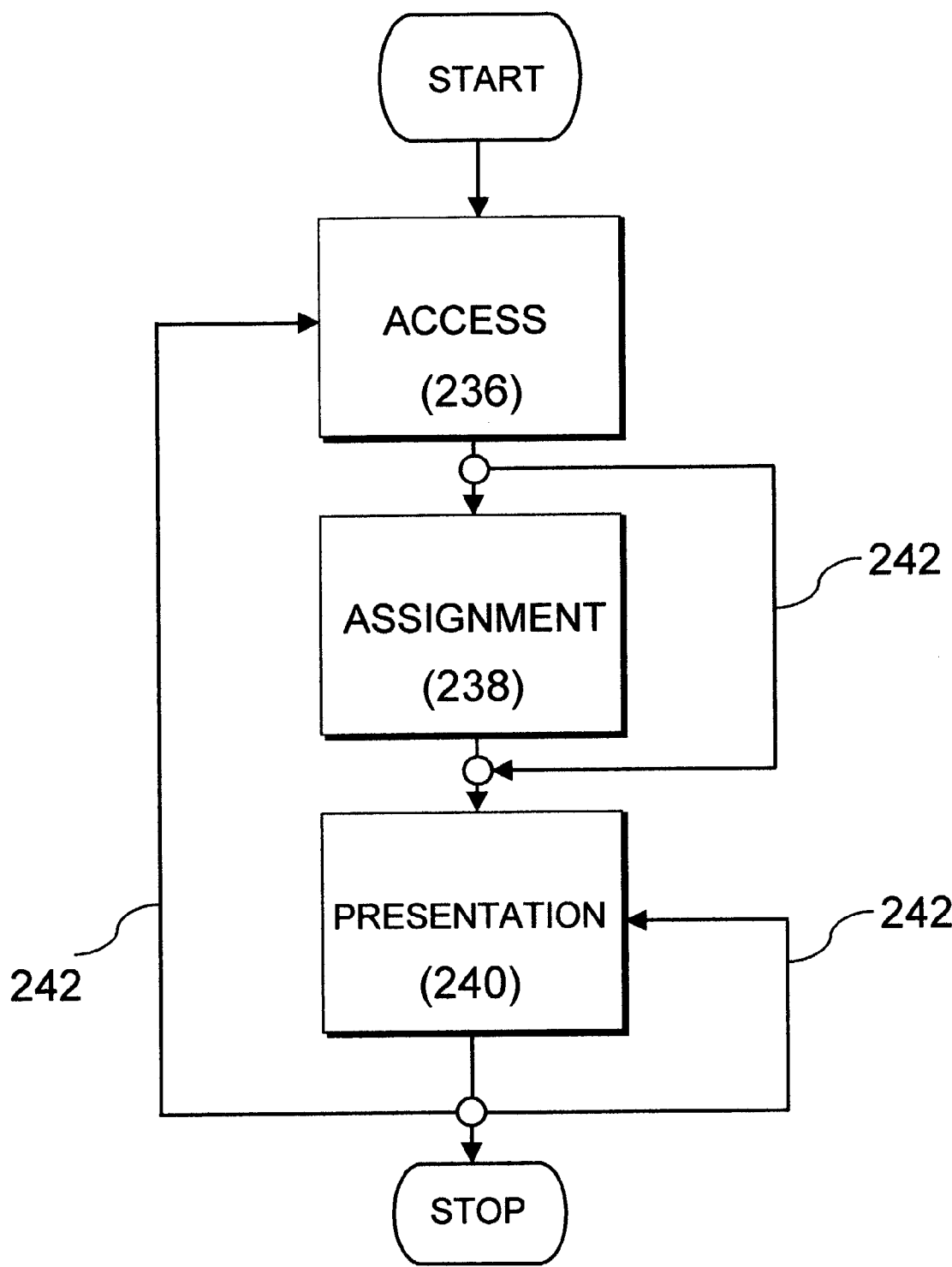
FIG. 41 illustrates the general overview flowchart for the systems and methods of recognition learning.

Details of Operation—FIGS. 40–41

FIGS. 40 through 44 illustrate flowchart details of the systems and methods of recognition learning. FIG. 40 illustrates a flowchart legend 234 for FIGS. 41–44. Graphical symbols were chosen consistent with process and programming flowchart standards in the United States. Any person skilled in the field of the invention should readily understand the processes and means illustrated.

FIG. 41 illustrates the general overview flowchart for the systems and methods of recognition learning. The three primary systems and methods are access, assignment, and presentation. Flow connectors 242 illustrate flexibility and looping between the primary systems and methods in the invention. The recognition learning invention may be implemented through an alternative embodiment of omitting the assignment element. This is illustrated by a flow connector in FIG. 41 which connects the access process 236 to the presentation process 240.

Means of data search illustrated in FIGS. 37–39 are readily apparent to those skilled in computer programming. Such means of data retrieval may be implemented with single commands in modern query languages.

Access Flowchart—FIG. 42

FIG. 42 illustrates the means of data access in accordance with the invention. The objective is efficient, automated access to a plurality of data sources.

Access may begin at specified times 244, by predefined events, or by the user 250. The first use of the system will prompt user input 246, 250. Such means of input will comprise user selection of data sources 252, parameters for selection of objects from said data sources, user's location of residence, access update frequency, event driven access, and various other parameters for customization.

"X" is defined as the current data source identifier. An example is the address for the internet web page of a state's sex offender registry. As described in FIGS. 17–18, means of connection 254 comprise any available means of data transfer. Examples of access connections comprise setting "X" to:

(a) a CD-ROM drive containing data on missing children;
(b) a phone number dialup for modem access to criminal data sources;
(c) a scanner device to upload sex offender hardcopy data;
(d) a video or audio input device for stolen items;
(e) a networked computer with data on missing pets;
(f) a keyboard for manual input of object data;
(g) a satellite transmission with data on terrorists.

Though the internet is prevalent as a current means of connectivity, it is but one of a great plurality of envisioned data sources.

The means of data access will systematically connect 254 to data source X 256 and select data from source X 258 based on user inputs. These will comprise objects that have spatial, temporal, or other significance to the user. An example would be any children missing within 100 miles during the last 2 years. Algorithms currently exist that can "mine" and filter a web page's data. These algorithms may be adapted as needed for the systems of the invention. Once the objects and associated data have been placed in internal storage 260 on the user's information processing device, filtering and sorting may be performed as well.

The means of data access perform a decision 262 to branch 264 for additional data sources. If another data source is desired ("LAST DATABASE?": "NO"), connection is made 254 and the process continues until all desired data has been placed in internal storage 260 and the system branches out of the loop at the decision node 262 ("LAST DATABASE?": "YES").

After all desired data has been accessed, the system may prompt the user to initiate ASSIGNMENT 266 (FIG. 43). If the system has just accessed data sources that were previously accessed and assigned, new objects may not require nature assignment. New objects from known data sources may be binned or assigned as the previous objects from these data sources were. By example, the system would know that a new sex offender object would be assigned a negative nature due to previous negative assignments from this known data source.

Initial user input 250 may have selected to set the assignment processes off. As illustrated in FIG. 41, nature assignment may be bypassed. Object presentation would still occur, but would omit negative or positive display features for objects without nature assignment.

The recently accessed object data is displayed 268 for the user and a decision is made to transfer data 270 based on user input. If "TRANSFER DATA?": "NO" the routine stops 272.

If "TRANSFER DATA?": "YES" the information processing device transfers the accessed data to media 274 and transmits the data 276 as selected by the user. These means of data transfer allow the user to download data to portable devices as needed (FIG. 18).

Assignment Flowchart—FIG. 43

The assignment process (FIG. 43) provides means for the user to associate a nature or connotation to objects. If the user selects assignment to be on, the following steps will occur consistent with the invention.

The new object data list 278 is accessed from internal storage (FIG. 42). The process performs a decision based on database and objects being known 280. If the objects are from known sources, the process branches to object nature assignment without need for user input. When data is from an unknown source or nature is unknown 282 the process branches to the user input of object nature, selected from the group consisting of negative, neutral, and, positive 284

A branching decision based on object nature 286 is performed, similar to a "case" statement in computer programming languages.

For Case 1, negative object assignment and routines 288 are performed to bin or tag the object data which is stored and correlated to the negative object database 294.

For Case 2, neutral object assignment and routines 290 are performed to bin or tag the object data which is stored and correlated to the neutral object database 296.

For Case 3, positive object assignment and routines 292 are performed to bin or tag the object data which is stored and correlated to the positive object database 298.

The user is given discretion to initiate the means of presentation 300 detailed in FIG. 44. If the user decides not to, the assignment process terminates and returns to control of the overall systems and methods of FIGS. 41–42.

Presentation Flowchart—FIG. 44

Means of access and assignment are the pillars that support presentation. The systems and methods for recognition learning culminate in means of presentation wherein the invention and user interact extensively.

If the user desires, the invention's recognition learning may comprise methods of presentation without relative nature assignment. Thereby, objects will be processed with automatic neutral nature assignment. Certain features may be turned off and the invention can effect objective, factual learning.

The flowchart in FIG. 44 illustrates the mechanics of the presentation process in FIG. 28 wherein the user moves a pointer to various objects and designates object nature in an entertaining, multimedia game environment.

The presentation process ("module") begins with initialization of module variables 302, followed by load of either randomized, comprehensive, recent, or user selected object data 304. The means of presentation may display as many or as few of the objects in memory as desired by the user inputs 306. These inputs may comprise which game or presentation means will be employed, which objects to select, and other parameters to enhance presentation.

The module selects the next object data 308 and displays said object data 310. Said object data may be any of the aforementioned visual, audio, or characteristic data, and object data may be integrated with other display data as needed. An example would be integrating object data with an adventure scenario involving other objects and entities.

Placing FIG. 28 alongside FIG. 44 will facilitate the following descriptions. In the simplified presentation of FIG. 28, the system displays four objects for the user to designate—two of which 194 (positive object), 196 (negative object) have been designated. The joystick 190 and the pointing icon 188 are the means of user input 312 (FIG. 44). At designation, the system decides if input is correct 314.

The system will branch if the user is incorrect 316 and display an error notification 318. Such a notification could comprise a visual display of graphical and text data stating that the user designation was incorrect combined with audio feedback. The system will subsequently loop to redisplay the object data 310 and repeat the process until user designation is correct.

When the user has designated the object properly, a branching decision based on object nature 320 is performed, similar to the "case" statements implemented in the nature assignment process of FIG. 43.

For Case 1, negative object 322 display and audio routines 328 are performed. This comprises feedback and reinforcement for the user. In FIG. 28, negative object designation 196 could be accompanied by the superimposed cross graphic, advisory text and audio.

For Case 2, neutral object 324 display and audio routines 330 are performed. Neutral objects may be considered neither good nor bad and may be used for object learning without connotation. Additionally, neutral objects may provide decoys and enhance thought process for the user.

For Case 3, positive object 326 display and audio routines 332 are performed. This comprises feedback and reinforcement for the user. In FIG. 28, positive object designation 194 could be accompanied by the superimposed heart graphic, reinforcing text and audio.

Following user input and presentation of an object, the process decides if this was the last object on the list 334 and branches when more objects remain 336. Time, score, and associated variables 338 are updated as the process loops to the next object 308. When all objects have been presented, the last object decision 334 will branch to terminate presentation and control returns to the overall systems and methods of FIG. 41.

The confines of this patent application do not suffice to convey the myriad of embodiments. These embodiments may be implemented through a full spectrum of processing devices. The preferred embodiments of the present invention are timely, challenging, multidimensional, and at the leading edge of entertainment technology.

Conclusion, Ramifications, and Scope

Thus the reader will see that the systems and methods for recognition learning provide a great improvement over the prior art. The invention provides comprehensive advantages of affordable, easily understood means of effecting automated recognition learning. The user selects which data is efficiently accessed and updated; thereafter, minimal access demands are made upon the user.

Nature assignment elevates the presentation process through selective connotation. Not only will the user learn to recognize objects, but also these objects will gain importance and utility. The learning of positive and negative natures may effect action of social value: missing children may be found, dangerous persons may be avoided, stolen items may be reclaimed, and so on.

Novel presentation methods provide learning in a motivational and enhanced environment. A person will use the invention repeatedly when desired (a "pull" system) because it is enjoyable, and this repeated use will galvanize recognition learning. This concept is absent from data sources currently—a "Have you seen us?" flyer of a missing person goes from the mailbox to the garbage.

Additionally, the invention will provide portable, timely, adaptable, and cost effective solutions to some of society's pressing needs such as security and reclamation of lost persons and items. Object data sources and types can be expanded to video, two or three dimensional graphical representations, detailed characteristic data, and audio samples. Public interest and demand for this comprehensive, current data will motivate government agencies which provide these data.

Information processing devices and varied communication links will enable many embodiments of the invention. Any device, from a wristwatch to a personal computer to devices still on the drawing boards, will be an invention candidate if it comprises data storage, information processing, and means of display. Any means of communication, from keyboard input to mailed hardcopy to instant satellite transmission, will be a potential method of data transfer. The preferred embodiment is a portable device of minimal size and weight with wireless communication capability. A person will be able to use this invention embodiment at any time or place, as well as being able to employ data search functions for recognition confirmation.

Public use of the invention will leverage the quality of quantity. Overworked police forces will gain many people trained in the methods of recognition learning. Subsequently, many government agencies such as law enforcement will benefit while individuals' civil rights will be protected. Everyone will win, except those who seek to evade law and challenge our security.

While it has been illustrated what is presently considered to be the preferred embodiment and methods of the invention, those skilled in the art will understand that various changes and modifications may be made, and equivalents may be substituted for elements thereof without departing from the true scope of the invention.

In addition, many modifications may be made to adapt a particular element, technique or, implementation to the present invention without departing from the central scope of the invention. Therefore, it is intended that this invention not be limited to the particular embodiment and methods disclosed herein, but that the invention includes all embodiments falling within the scope of the appended claims.

I claim:

1. A computer-based method for training a user to recall and identify objects in the real world comprising:

accessing data sources relevant to said objects wherein means of accessing said data sources comprise a computer with means of connectivity to said data sources;

storing, by said computer, data correlated to said objects comprising at least one of video, image, audio, descriptive, and characteristic data from accessed data sources;

notifying the user of a new object and displaying the object; prompting the user to assign a nature to the object based on the user's discretion; wherein the assigned nature is a negative, positive, or neutral nature assignment;

presenting through said computer said data by means of interactive games that train the user to observe the computer-generated presentation and interact by means of generating computerized variations in the presentation based on the assigned nature of the object;

whereby employing said method, recognition learning occurs and the user interacts with said data to enhance the user's recall of said data at a later time in the real world wherein said objects correlated to said data are present, and whereby specific missing, threatening, or relevant objects are identified.

2. The method according to claim 1, wherein said data sources comprise data relevant to at least one of:
    (a) terrorists,
    (b) sex offenders,
    (c) criminals,
    (d) missing objects,
    (e) missing pets,
    (f) missing persons,
    (g) trustworthy persons, and
    (h) any object of interest.

3. The method according to claim 2 wherein computer algorithms determine which data to filter or store based on means of user input to the computer, including at least one of the following:
    (a) user's location,
    (b) relevant databases to access as sources,
    (c) time and date windows of interest,
    (d) sex of persons,
    (e) age of persons,
    (f) location of persons and objects,
    (g) relative distance from the user to objects,
    (h) physical characteristics of objects, and
    (i) identifying characteristics of objects including name, date missing, type, manufacturer, color and model.

4. The method according to claim 3, further comprising means of automatically storing data through computer algorithms of data mining, wherein means of automatically storing said data are performed by the user's computer.

5. The method according to claim 2, wherein the computer automatically assigns automatically assigning the same nature to data on other objects accessed from the same data source that the user selected for the initial nature assignment.

6. The method according to claim 2 wherein computer generated variations in presentation comprise:

presenting negative nature data by aversive graphical and audio means; and presenting positive nature data by pleasant graphical and audio means.

7. The method according to claim 6, further comprising presenting neutral nature data as decoys within interactive computer games, wherein said decoys are incorporated into the presentation means without the cautionary, aversive elements of negative objects or the reinforcing, attractive elements of positive objects.

8. The method according to claim 6, further comprising the user selecting specific presentational graphics and audio for data with either negative or positive assigned natures; wherein the user, by using means of input to the computer, selects from a plurality of graphics and audio to refine the mechanics of computer presentation, mechanics of presentation for negative nature objects having different associated graphics and audio relative to positive nature objects.

9. The method according to claim 1, further comprising computer execution of algorithms to enhance stored data by means of at least one of image enhancement, composite image generation, age progression, and audio enhancement.

10. The method according to claim 9, further comprising computer composite image generation wherein image data of the object is integrated into a three-dimensional rendering of said object during interactive training, such rendering allowing the user to view a graphical, realistic computer rendering of said object from any vantage point or perspective.

11. The method according to claim 1, further comprising computer-generated representations of kinematic tags from the object, the kinematic tags representing clues to movement or mannerisms associated with said object.

12. The method of claim 1, further comprising an interactive computer-generated presentation wherein the user's objective is to match a plurality of correlated object data; wherein the user observes a computer-generated object without correlated graphic or audio clues connoting nature; and, by means of user input to the computer, designates object nature with the computer providing feedback means based on correct nature designation by the user.

13. The method of claim 1, further comprising an interactive computer-generated presentation puzzle wherein the user must correctly reconstruct a partitioned object image by means of input to the computer with the computer providing feedback means based on correct image reconstruction by the user.

14. The method of claim 1, further comprising an interactive computer-generated presentation wherein the user is trained within an adventure game with the objective of finding and identifying positive object representations while avoiding negative nature object representations.

15. A computer training system allowing a user to recall and identify objects in the real world by using interactive presentation, comprising:
  (a) a memory able to store data;
  (b) a means of display operatively connected to said memory;
  (c) a means of user input to the computer;
  (d) a means of connectivity with data sources; and
  (e) a means of data processing to perform the steps of
    (1) accessing data sources relevant to said objects by means of connectivity and based on user selection through means of user input,
    (2) storing data correlated to said objects comprising at least one of video, image, audio, descriptive and identifying data, notifying the user of a new object and displaying the object; prompting the user to assign a nature to the object based on the user's discretion; wherein the assigned nature is a negative, positive, or neutral nature assignment;
    (3) presenting said data by said means of display using interactive game algorithms that require a user to observe a computer-generated presentation and interact accordingly by means of user input to the computer generating computerized variations in the presentation based on the assigned nature of the object;
  whereby employing said system, the user interacts with said data to effect the user's recall of said data at a later time in the real world wherein said object correlated to said data is present; and
  whereby missing objects are reclaimed, threatening objects are avoided and the user's security is enhanced.

16. A computer-based method for training a user to recall and identify objects in the real world, comprising the steps of:
  selecting relevant object databases;
  selecting a specific data to filter and store from the object databases;
  notifying the user of a new object and displaying the object;
  prompting the user to assign a nature to the object based on the user's discretion; wherein the assigned nature is a negative, positive, or neutral nature assignment;
  generating a graphical and audio presentation of the object based on the assigned nature;
  wherein objects assigned with a negative nature are presented with aversive graphical and audio instructing the user to avoid the negative nature object; and wherein objects assigned with a positive nature are presented with pleasant graphical and audio instructing the user to attract the positive nature object; wherein the user recalls the presentation of objects and their associated user defined nature assignments at a later time in the real world to identify specific missing, threatening, or relevant objects.

17. The method of claim 16, further comprising a gateway means of presentation, wherein the method of claim 16 would be required for a specified time prior to the user engaging in other computer activities unrelated to said method.

* * * * *